US012158029B2

(12) United States Patent
Cumbo et al.

(10) Patent No.: US 12,158,029 B2
(45) Date of Patent: Dec. 3, 2024

(54) CLOSURE LATCH ASSEMBLY WITH DOUBLE PAWL MECHANISM

(71) Applicant: Magna Closures Inc., Newmarket (CA)

(72) Inventors: Francesco Cumbo, Newmarket (CA); Marco Taurasi, Newmarket (CA); Enrico Boeri, Newmarket (CA)

(73) Assignee: Magna Closures Inc., Newmarket (CA)

( * ) Notice: Subject to any disclaimer, the term of this patent is extended or adjusted under 35 U.S.C. 154(b) by 224 days.

(21) Appl. No.: 17/779,591

(22) PCT Filed: Dec. 2, 2020

(86) PCT No.: PCT/CA2020/051653

§ 371 (c)(1),
(2) Date: May 25, 2022

(87) PCT Pub. No.: WO2021/108907

PCT Pub. Date: Jun. 10, 2021

(65) Prior Publication Data

US 2023/0011282 A1 Jan. 12, 2023

Related U.S. Application Data

(60) Provisional application No. 62/943,073, filed on Dec. 3, 2019, provisional application No. 62/951,993, filed on Dec. 20, 2019.

(51) Int. Cl.
*E05B 81/14* (2014.01)
*E05B 83/36* (2014.01)
(Continued)

(52) U.S. Cl.
CPC .............. *E05B 81/14* (2013.01); *E05B 83/36* (2013.01); *E05B 85/243* (2013.01); *E05B 81/06* (2013.01); *E05B 81/34* (2013.01)

(58) Field of Classification Search
CPC ........ E05B 81/14; E05B 83/36; E05B 85/243; E05B 81/06; E05B 81/34
See application file for complete search history.

(56) References Cited

U.S. PATENT DOCUMENTS 8,596,694 B2 12/2013 Taurasi et al.
8,740,265 B2 6/2014 Gillis
(Continued)

FOREIGN PATENT DOCUMENTS

CN 102844513 A 12/2012
CN 107476685 A 12/2017
(Continued)

*Primary Examiner* — Mark A Williams
(74) *Attorney, Agent, or Firm* — Dickinson Wright PLLC

(57) ABSTRACT

A closure latch assembly for installation in a vehicle door and method of construction thereof is provided. The closure latch assembly has at least one ratchet, a primary pawl, and an auxiliary pawl. At least one ratchet is moveable between a striker capture position and a striker release position. The primary pawl is moveable between a closed position and an open position. The auxiliary pawl is moveable between a closed position and an open position. An auxiliary pawl release lever is moveable between a rest position, whereat the auxiliary pawl is located in its closed position and the primary pawl is located in its closed position, and an engaged position, whereat the auxiliary pawl is moved to its open position and the primary pawl is moved to its open position.

14 Claims, 51 Drawing Sheets

(51) Int. Cl.

| | |
|---|---|
| ***E05B 85/24*** | (2014.01) |
| *E05B 81/06* | (2014.01) |
| *E05B 81/34* | (2014.01) |

(56) References Cited

U.S. PATENT DOCUMENTS

| | | | | |
|---|---|---|---|---|
| 8,757,679 | B2 | 6/2014 | Torkowski et al. | |
| 8,764,075 | B2 * | 7/2014 | Taurasi | E05B 81/14<br>292/201 |
| 9,476,230 | B2 * | 10/2016 | Margheritti | E05B 81/06 |
| 9,512,651 | B2 | 12/2016 | Taurasi et al. | |
| 9,765,554 | B2 | 9/2017 | Cumbo et al. | |
| 10,352,070 | B2 * | 7/2019 | Margheritti | E05B 81/14 |
| 10,648,204 | B2 | 5/2020 | Cumbo et al. | |
| 2006/0006671 | A1 * | 1/2006 | Noel | E05B 77/28<br>292/216 |
| 2010/0052336 | A1 | 3/2010 | Bendel et al. | |
| 2010/0052341 | A1 | 3/2010 | Taurasi et al. | |
| 2011/0204660 | A1 | 8/2011 | Cumbo et al. | |
| 2011/0204690 | A1 | 8/2011 | Torkowski et al. | |
| 2012/0068480 | A1 * | 3/2012 | Bendel | E05B 85/26<br>292/195 |
| 2012/0313384 | A1 | 12/2012 | Cumbo et al. | |
| 2017/0067272 | A1 | 3/2017 | Margheritti | |
| 2018/0044950 | A1 * | 2/2018 | Distefano | E05B 85/26 |
| 2018/0355642 | A1 * | 12/2018 | Cumbo | E05B 83/36 |
| 2019/0161996 | A1 * | 5/2019 | Taurasi | E05B 81/36 |
| 2020/0190861 | A1 * | 6/2020 | Margheritti | E05B 85/26 |
| 2020/0231071 | A1 * | 7/2020 | Benedikt | B60N 2/2231 |

FOREIGN PATENT DOCUMENTS

| | | | |
|---|---|---|---|
| CN | 110130753 | A | 8/2019 |
| DE | 102007003948 | A1 | 5/2008 |
| EP | 2291568 | A1 | 3/2011 |
| EP | 2161398 | B1 | 12/2014 |
| WO | 2008061491 | A1 | 5/2008 |
| WO | 2009150225 | A2 | 12/2009 |
| WO | 2011094834 | A1 | 8/2011 |
| WO | 2013170363 | A1 | 11/2013 |
| WO | 2014000084 | A1 | 1/2014 |

* cited by examiner

FIG. 3A
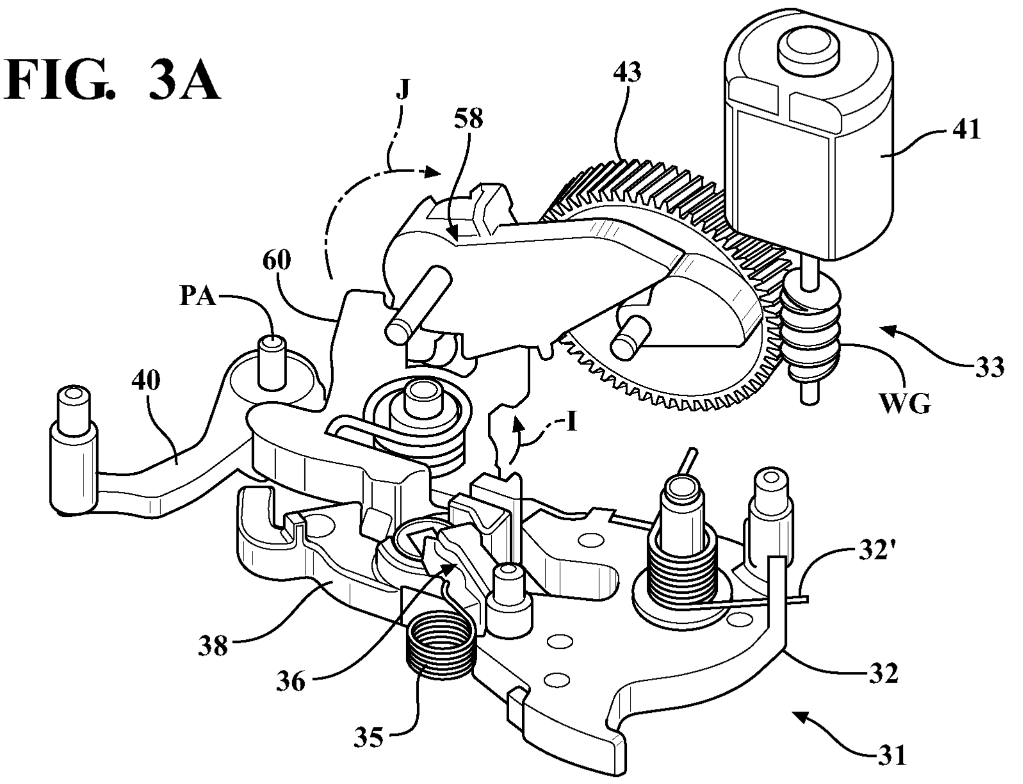
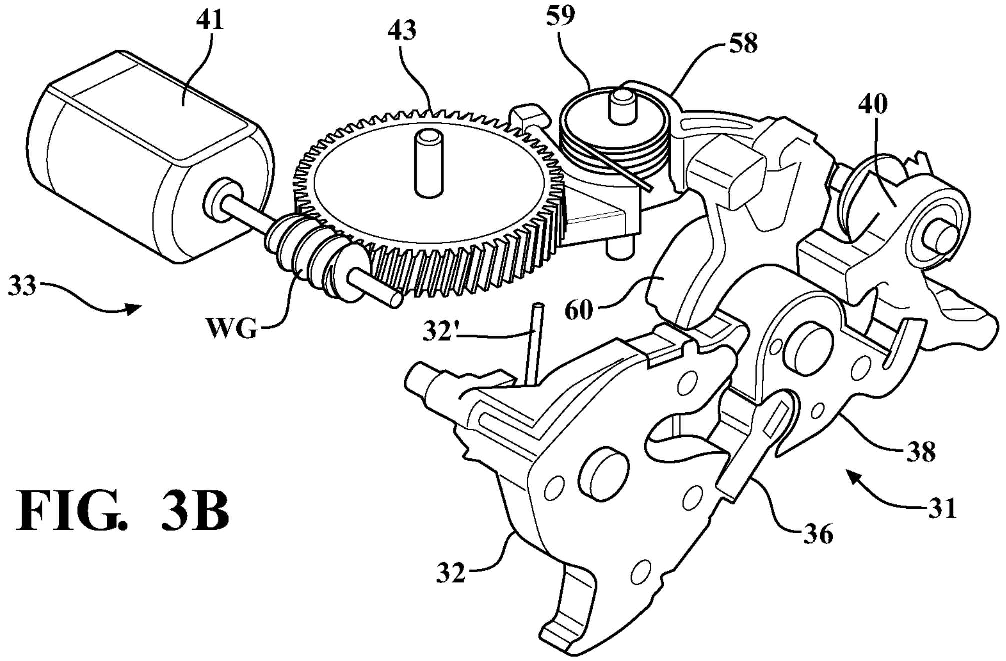
FIG. 3B

3000 providing a housing (29) and disposing double-pawl mechanism comprising a primary ratchet (32, 132), a primary pawl (36, 136), an auxiliary pawl (40, 140), and an auxiliary ratchet (38) in the housing (29);

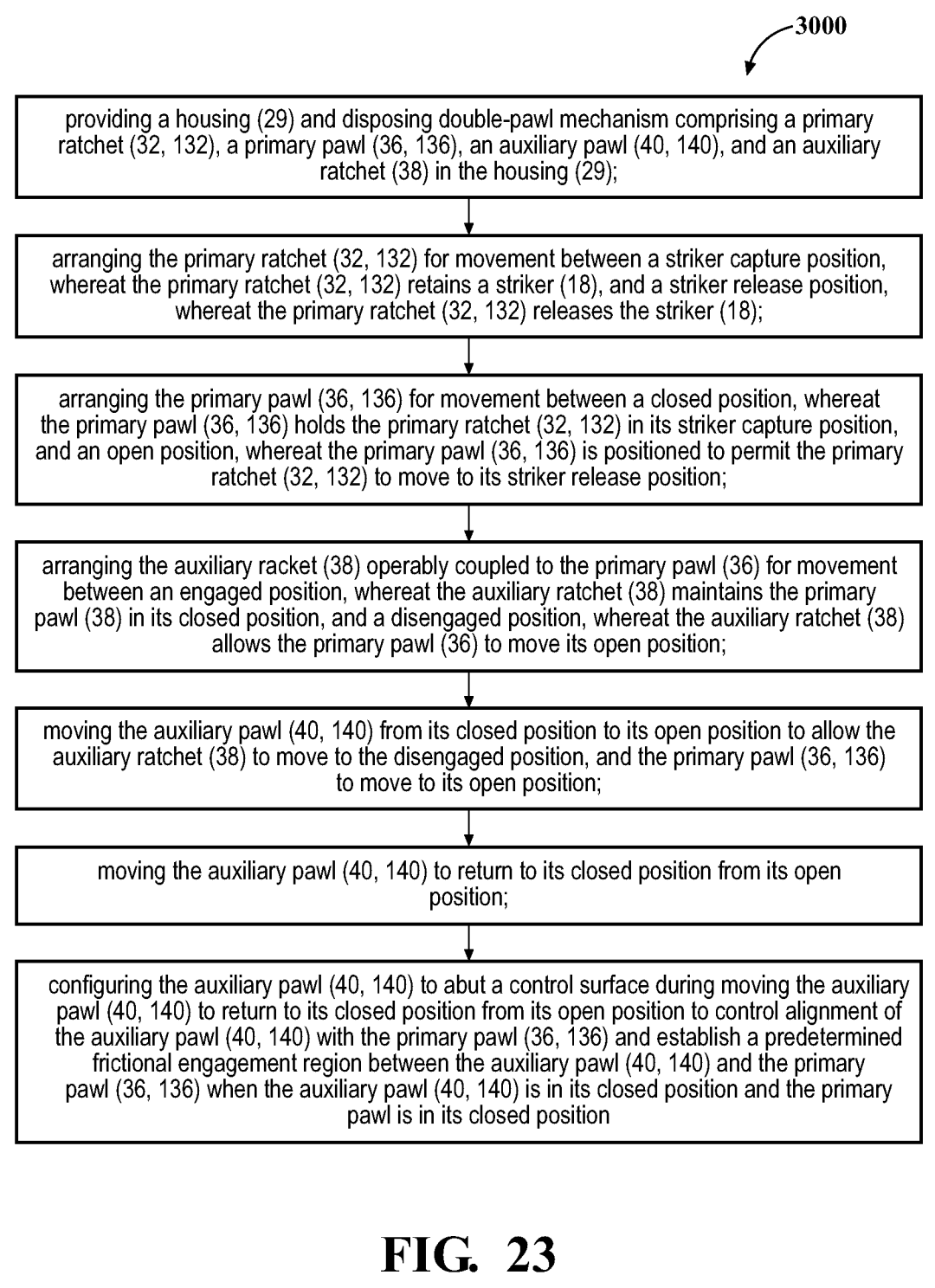

↓ arranging the primary ratchet (32, 132) for movement between a striker capture position, whereat the primary ratchet (32, 132) retains a striker (18), and a striker release position, whereat the primary ratchet (32, 132) releases the striker (18);

↓ arranging the primary pawl (36, 136) for movement between a closed position, whereat the primary pawl (36, 136) holds the primary ratchet (32, 132) in its striker capture position, and an open position, whereat the primary pawl (36, 136) is positioned to permit the primary ratchet (32, 132) to move to its striker release position;

↓ arranging the auxiliary racket (38) operably coupled to the primary pawl (36) for movement between an engaged position, whereat the auxiliary ratchet (38) maintains the primary pawl (38) in its closed position, and a disengaged position, whereat the auxiliary ratchet (38) allows the primary pawl (36) to move its open position;

↓ moving the auxiliary pawl (40, 140) from its closed position to its open position to allow the auxiliary ratchet (38) to move to the disengaged position, and the primary pawl (36, 136) to move to its open position;

↓ moving the auxiliary pawl (40, 140) to return to its closed position from its open position;

↓ configuring the auxiliary pawl (40, 140) to abut a control surface during moving the auxiliary pawl (40, 140) to return to its closed position from its open position to control alignment of the auxiliary pawl (40, 140) with the primary pawl (36, 136) and establish a predetermined frictional engagement region between the auxiliary pawl (40, 140) and the primary pawl (36, 136) when the auxiliary pawl (40, 140) is in its closed position and the primary pawl is in its closed position

FIG. 23

FIG. 25A
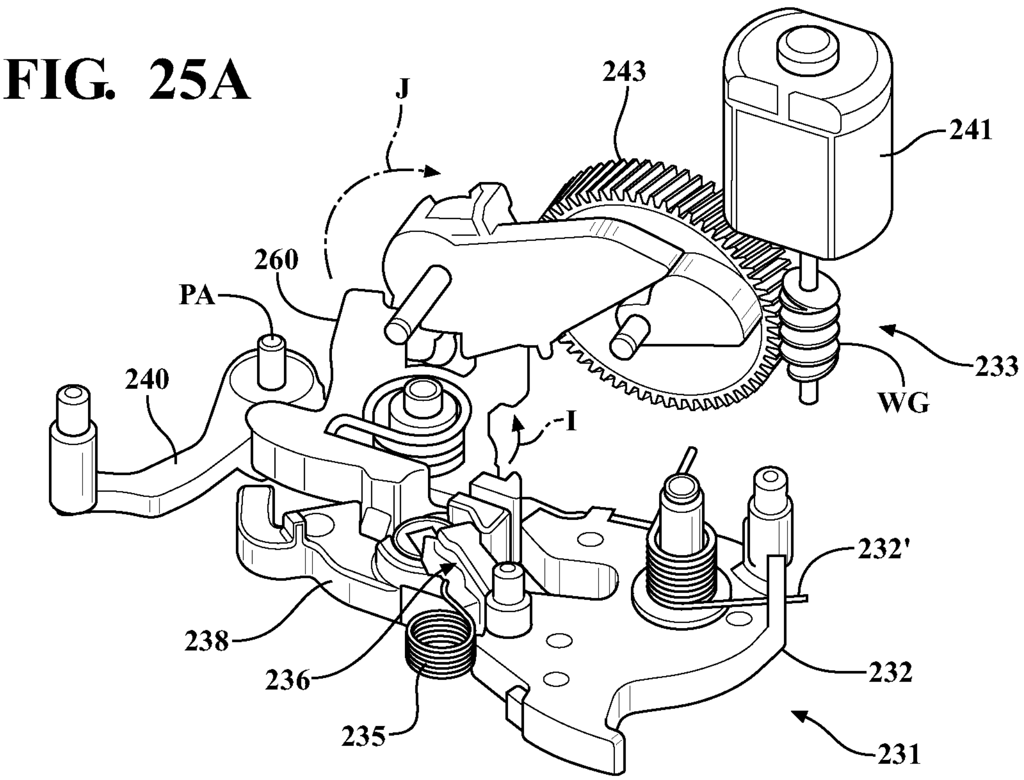
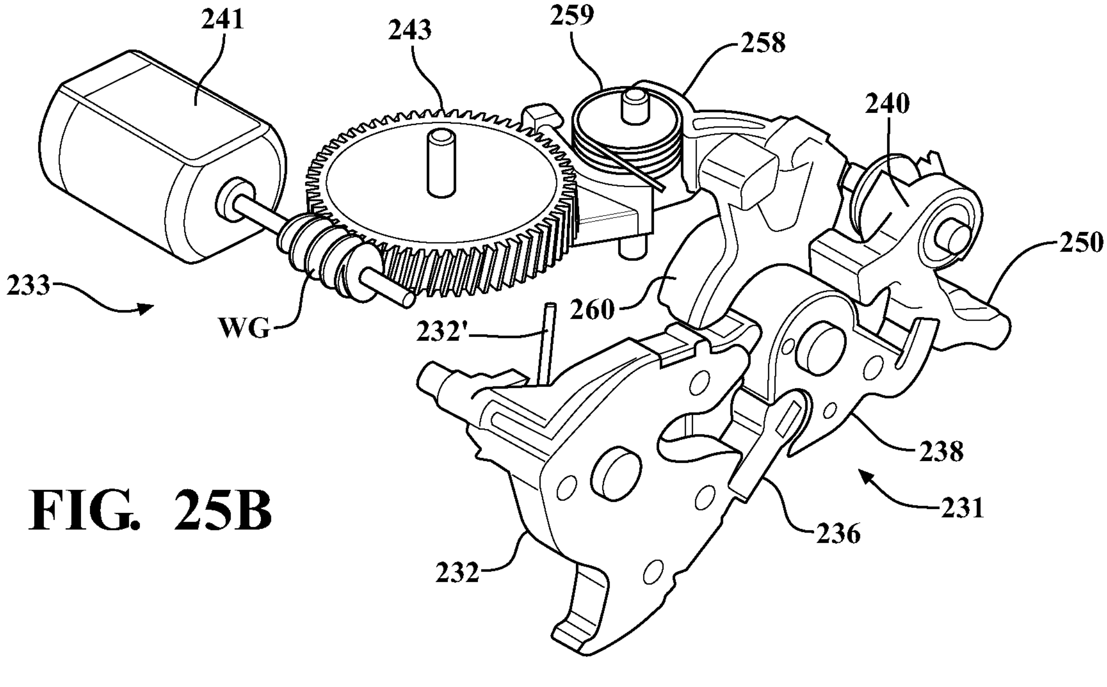
FIG. 25B

CLOSURE LATCH ASSEMBLY WITH DOUBLE PAWL MECHANISM

CROSS-REFERENCE TO RELATED APPLICATIONS

This application is a U.S. National Stage of International Patent Application No. PCT/CA2020/051653, filed on Dec. 2, 2020, which claims the benefit of U.S. Provisional Application Ser. No. 62/951,993, filed on Dec. 20, 2019, and of U.S. Provisional Application Ser. No. 62/943,073, filed on Dec. 3, 2019, which are both incorporated herein by reference in their entirety.

FIELD

The present disclosure relates generally to closure latch assemblies for use in motor vehicle closure systems. More specifically, the present disclosure is directed to a closure latch assembly for a vehicle door equipped with a latch mechanism having a primary pawl and an auxiliary pawl.

BACKGROUND

This section provides background information related to the present disclosure which is not necessarily prior art.

It is known to provide latch assemblies for vehicle closure panels having a primary pawl and a secondary pawl to reduce release efforts of a ratchet from a striker capture position to a striker release position. Typically, in such "double pawl" arrangements, clearance, also referred to as "play", is present between at least one of the primary pawl and a primary ratchet, between the auxiliary pawl and an auxiliary ratchet, and between the auxiliary pawl and a release lever, wherein lost motion is created by the play. With lost motion, the time-response for release of the ratchet from the striker capture position to the striker release position can be delayed, and further yet, the predictability for timing of release can diminished, such as by not knowing with certainty to what extent the respective members, such as the release lever, need to be moved to ensure release of the ratchet. Further yet, it is generally required that the secondary pawl be driven into engagement with the primary pawl to move the primary pawl to its open position, which can result in a "popping noise" from a sudden, abrupt release.

Accordingly, while commercially-available powered closure latch assemblies are satisfactory to meet all operational and regulatory requirements, a recognized need exists to advance the technology and provide powered closure latch assemblies having optimized, reliable and repeatable performance, reduced complexity and packaging while providing both the desired, timely power-operated functions and timely emergency release function.

SUMMARY

This section provides a general summary of the disclosure and is not intended to be interpreted as a comprehensive and exhaustive listing of its full scope or all of its aspects, features and structured configurations.

It is an aspect of the present disclosure to provide a closure latch assembly for a vehicle door having a latch mechanism including a double pawl mechanism, including a primary pawl and an auxiliary pawl, and a latch release mechanism.

It is a related aspect of the present disclosure to provide the latch mechanism having a primary ratchet and an auxiliary ratchet.

It is an aspect of the present disclosure to provide a closure latch assembly for a vehicle door having a latch mechanism including a double pawl and double ratchet mechanism, including a primary pawl, an auxiliary pawl, a primary ratchet, an auxiliary ratchet and a latch release mechanism.

It is a related aspect of the present disclosure to minimize play between operable components within the latch mechanism to provide repeatable, reliable and accurate predictability for the movement required of the operable components for release of primary ratchet from a striker capture position to a striker release position.

It is a related aspect of the present disclosure to minimize the number of operable components within a latch mechanism constructed in accordance with the disclosure.

It is a related aspect of the present disclosure to minimize the number of operable components within a double pawl and double ratchet closure latch assembly constructed in accordance with the disclosure to ensure the movement required of the operable components for release of the primary ratchet from a striker capture position to a striker release position.

It is a related aspect of the present disclosure to ensure the primary pawl moves to a primary ratchet release position, when intended, including when a latch release lever of the latch release mechanism is moved to an actuated position, to provide repeatable, reliable and accurate predictability for the movement required of the operable components for release of the primary ratchet from striker capture position to a striker release position.

In accordance with these and other aspects, a closure latch assembly for installation in a vehicle door is provided. The closure latch assembly includes a latch mechanism having a primary ratchet, a primary pawl, and an auxiliary pawl. The primary ratchet is moveable between a striker capture position, whereat the primary ratchet retains a striker to maintain the vehicle door in a closed position, and a striker release position, whereat the primary ratchet releases the striker to allow the vehicle door to move to an open position. The primary pawl is moveable between a closed position (also referred to as primary ratchet locking position), whereat the primary pawl holds the primary ratchet in its striker capture position, and an open position (also referred to as primary ratchet release position), whereat the primary pawl is positioned to permit the primary ratchet to move to its striker release position. The auxiliary pawl is moveable between a closed position (also referred to as auxiliary ratchet locking position), whereat the primary pawl is maintained in its closed position, and an open position (also referred to as auxiliary ratchet release position), whereat the primary pawl is permitted to move to its open position. The closure latch assembly further includes a latch release mechanism having an auxiliary pawl release lever coupled with the auxiliary pawl. The auxiliary pawl release lever is moveable between a rest position, whereat the auxiliary pawl is located in its closed position and the primary pawl is located in its closed position against a spring bias, and an engaged position (also referred to as actuation position), whereat the auxiliary pawl is moved to its open position and the primary pawl is moved to its open position under the spring bias.

In accordance with a further aspect, the closure latch assembly can further include an auxiliary ratchet operably coupled to the primary pawl. The auxiliary ratchet is moveable between an engaged position, whereat the auxiliary ratchet maintains the primary pawl in its closed position, and a disengaged position, whereat the auxiliary ratchet allows the primary pawl to move to its open position. The auxiliary ratchet is biased by the spring bias to move to its disengaged position when the auxiliary pawl is moved to its open position.

In accordance with a further aspect, the auxiliary pawl is biased by a spring member to its closed position into engagement with the auxiliary ratchet.

In accordance with a further aspect, the auxiliary pawl release lever engages the auxiliary pawl while in its rest position and the auxiliary pawl engages the auxiliary ratchet while in its closed position.

In accordance with a further aspect, the closure latch assembly can further include an actuator and an actuator release lever. The actuator release lever is configured in engagement with the auxiliary pawl release lever while the auxiliary pawl release lever is in its rest position and is moveable by selective, controlled movement of the actuator to move the auxiliary pawl release lever to its engaged position.

In accordance with a further aspect, the auxiliary pawl release lever is biased by a spring member into engagement with the actuator release lever.

In accordance with a further aspect, the auxiliary pawl is biased into engagement with the primary pawl by an auxiliary pawl spring member.

In accordance with a further aspect, the primary pawl is biased into engagement with the auxiliary pawl with a primary pawl spring member.

In accordance with a further aspect, the primary pawl spring member biases the primary pawl toward its open position.

In accordance with these and other aspects, a closure latch assembly for installation in a vehicle door is provided. The closure latch assembly includes a latch mechanism having a primary ratchet, a primary pawl, an auxiliary ratchet, and an auxiliary pawl. The primary ratchet is moveable between a striker capture position, whereat the primary ratchet retains a striker to maintain the vehicle door in a closed position, and a striker release position, whereat the primary ratchet releases the striker to allow the vehicle door to move to an open position. The primary pawl is moveable between a primary ratchet locking position, whereat the primary pawl holds the primary ratchet in its striker capture position, and a primary ratchet release position, whereat the primary pawl is positioned to permit the primary ratchet to move toward its striker release position. The auxiliary pawl is moveable between an auxiliary ratchet locking position, whereat the primary pawl is maintained in its primary ratchet locking position, and an auxiliary ratchet release position, whereat the primary pawl is permitted to move to its open position. A latch release lever is provided having an auxiliary pawl release leg coupled with the auxiliary pawl. One of the latch release lever or the auxiliary pawl has an interface leg. The latch release lever is moveable between a rest position, whereat the auxiliary pawl is located in its auxiliary ratchet locking position and the primary pawl is located in its primary ratchet locking position, a first actuation position, whereat the auxiliary pawl release leg causes the auxiliary pawl to move to its auxiliary ratchet release position, and a second actuation position, whereat the interface leg ensures the primary pawl is moved to its primary ratchet release position.

In accordance with another aspect of the disclosure, the primary pawl is intended to move to its open position under a spring bias when the latch release lever is located in the first actuation position.

In accordance with another aspect of the disclosure, the interface leg operably engages the primary pawl, while the latch release lever is located in the second actuation position, to ensure the primary pawl is moved to the primary ratchet release position.

In accordance with another aspect of the disclosure, the interface leg is disengaged from the primary pawl while the latch release lever is located in the first actuation position.

In accordance with another aspect of the disclosure, the interface leg has a drive member and the primary pawl has a driven member, whereat the drive member engages the driven member while the latch release lever is located in the second actuation position to ensure the primary pawl is moved to the primary ratchet release position, and whereat the drive member is spaced from the driven member while the latch release lever is located in the first actuation position.

In accordance with another aspect of the disclosure, the driven member extends laterally outwardly from a surface of the primary pawl in generally parallel relation with a pivot axis of the primary pawl.

In accordance with another aspect of the disclosure, the drive member can be formed as a monolithic piece of material with the latch release lever and extends radially away from a pivot axis of the latch release lever for engagement with the driven member while the latch release lever is located in the second actuation position.

In accordance with another aspect of the disclosure, the driven member is received in a recessed notch, adjacent the drive member, of the interface leg while the latch release lever is located in the first actuation position.

In accordance with another aspect of the disclosure, the latch release lever pivots within a first plane and the primary pawl pivots within a second plane, wherein the first and second planes are parallel with one another, such that the interface leg and the primary pawl pivot in overlying clearance relation relative with one another.

In accordance with another aspect of the disclosure, the auxiliary pawl release leg and the interface leg can extend radially outwardly from a pivot axis of the latch release lever in spaced relation from one another.

In accordance with another aspect of the disclosure, the interface leg can operably engage the auxiliary ratchet, while the latch release lever is located in the second actuation position, to move the primary pawl to the primary ratchet release position.

In accordance with another aspect of the disclosure, the interface leg remains disengaged from the auxiliary ratchet while the latch release lever is located in the first actuation position.

In accordance with another aspect of the disclosure, the interface leg has a drive member and the auxiliary ratchet can be provided having a driven member, whereat the drive member engages the driven member while the latch release lever is located in the second actuation position to move the auxiliary ratchet from an engaged position, whereat the auxiliary ratchet maintains the primary pawl in its closed position, to a disengaged position, whereat the auxiliary ratchet allows the primary pawl to move to its primary ratchet release position, and whereat the drive member is spaced from the driven member while the latch release lever is located in the first actuation position.

In accordance with another aspect of the disclosure, the interface leg can be formed as a monolithic piece of material with the latch release lever.

In accordance with another aspect of the disclosure, the interface leg can be formed as a monolithic piece of material with the auxiliary pawl.

In accordance with another aspect of the disclosure, a closure latch assembly for installation in a vehicle movable between an open position and a closed position, wherein a seal load is normally imparted on the closure latch assembly while the vehicle door is in its closed position, is provided. The closure latch assembly includes a latch mechanism having a primary ratchet, a primary pawl, and an auxiliary pawl. The primary ratchet is biased by a ratchet spring from a striker capture position, whereat the primary ratchet retains a striker, toward a striker release position, whereat the primary ratchet releases the striker. The primary pawl is biased by a pawl spring from an open position, whereat the primary pawl is positioned to permit the primary ratchet to move to its striker release position, toward a closed position, whereat the primary pawl holds the primary ratchet in its striker capture position. The auxiliary pawl is moveable between a closed position, whereat the primary pawl is maintained in its closed position, and an open position, whereat the primary pawl moves to its open position. A power latch release mechanism is operably coupled with the auxiliary pawl to move the auxiliary pawl from its closed position to its open position to allow the primary pawl to move to its open position without the auxiliary pawl imparting a bias force on the primary pawl.

In accordance with another aspect of the disclosure, a combined bias imparted by the seal load and the ratchet spring is intended to overcome the bias imparted by the pawl spring in normal operation (normal operation means herein the closure latch assembly is functioning as intended under powered operation without need of assistance from mechanical actuation) to allow the primary pawl to be moved by the combined bias to its open position upon the auxiliary pawl being moved to its open position by the power latch release mechanism.

In accordance with another aspect of the disclosure, at least one mechanical latch release mechanism is operably coupled with the auxiliary pawl to move the auxiliary pawl into engagement with the primary pawl to forcibly bias the primary pawl from its closed position to its open position (this is used in a condition where the power operation fails to cause the primary pawl to move to its open position, such as may be due to excess friction and/or power failure, for example).

In accordance with another aspect of the disclosure, the at least one mechanical latch release mechanism includes at least one of an outside mechanical release mechanism connected to an outside door handle and/or an inside mechanical release mechanism connected to an inside door handle.

In accordance with another aspect of the disclosure, the power latch release mechanism includes a power release gear having a drive cam fixed thereto, with the power release gear being configured for power driven movement by an electric motor to rotate the drive cam against an actuator release lever to an actuated position to pivot the actuator release lever over a first length, such as a first arc length (defined by degrees of pivotal movement) to move the auxiliary pawl from its closed position to its open position to allow the primary pawl to move to its open position without the auxiliary pawl imparting a bias force on the primary pawl.

In accordance with another aspect of the disclosure, selective actuation of the at least one mechanical latch release mechanism causes the actuator release lever to pivot over a second length, such as a second arc length, (defined by degrees of pivotal movement) greater than the first arc length to move the auxiliary pawl into engagement with the primary pawl to forcibly bias the primary pawl from its closed position to its open position.

In accordance with another aspect of the disclosure, the actuator release lever moves out from engagement with the drive cam during selective actuation of the at least one mechanical latch release mechanism.

In accordance with another aspect of the disclosure, a method of operating a closure latch assembly having double-pawl mechanism for opening a vehicle door is provided. The method includes actuating an electric motor to drive a power release gear having a drive cam fixed thereto and moving the drive cam against an actuator release lever to pivot the actuator release lever over a first arc length to an actuated position to move an auxiliary pawl from a closed position to an open position to allow a primary pawl to move to an open position against a bias of a pawl spring tending to bias the primary pawl toward its closed position without the auxiliary pawl imparting a bias force on the primary pawl, thereby allowing a ratchet to move under a bias of a ratchet spring to a striker release position to allow the vehicle door to be opened when the primary pawl is moved to its open position. In a related aspect, the closure latch assembly may have a double-pawl single ratchet mechanism, or a double-pawl, double ratchet mechanism.

In accordance with another aspect of the disclosure, the method can further include imparting a combined bias, including a bias from a seal load from the vehicle door while in a closed position and a bias from the ratchet spring, on the primary pawl to pivot the primary pawl to its open position against the bias imparted by the pawl spring.

In accordance with another aspect of the disclosure, the method further includes, in the event the combined bias fails to pivot the primary pawl to its open position upon moving the auxiliary pawl to its open position, selectively actuating at least one mechanical latch release mechanism to pivot the actuator release lever over a second arc length greater than the first arc length to move the auxiliary pawl into engagement with the primary pawl to forcibly bias the primary pawl from its closed position to its open position.

In accordance with another aspect of the disclosure, the method further includes moving the actuator release lever out from engagement with the drive cam during selective actuation of the at least one mechanical latch release mechanism.

In accordance with another aspect of the disclosure, the method can further include selectively actuating the at least one mechanical latch release mechanism via at least one of an outside door handle and/or an inside door handle.

In accordance with yet a further aspect, a method of constructing a closure latch assembly for installation in a vehicle door is provided. The method includes providing a housing and disposing a primary ratchet, a primary pawl, an auxiliary pawl in the housing. Further, arranging the primary ratchet for movement between a striker capture position, whereat the primary ratchet retains a striker, and a striker release position, whereat the primary ratchet releases the striker. Further, arranging the primary pawl for movement between a closed position, whereat the primary pawl holds the primary ratchet in its striker capture position, and an open position, whereat the primary pawl is positioned to permit the primary ratchet to move to its striker release position. Further, arranging the auxiliary pawl for movement between a closed position, whereat the primary pawl is maintained in its closed position, and an open position, whereat the primary pawl moves to its open position. Further yet, disposing an auxiliary pawl release lever in coupled relation with the auxiliary pawl and arranging the auxiliary pawl release lever for movement between a rest position, whereat the auxiliary pawl is located in its closed position and the primary pawl is located in its closed position against a spring bias, and an engaged position, whereat the auxiliary pawl is moved to its open position and the primary pawl is moved to its open position under the spring bias.

In accordance with a further aspect, the method can further include operably coupling an auxiliary ratchet to the primary pawl and arranging the auxiliary ratchet for movement between an engaged position, whereat the auxiliary ratchet maintains the primary pawl in its closed position, and a disengaged position, whereat the auxiliary ratchet allows the primary pawl to move to its open position, and arranging the auxiliary ratchet to be biased by the spring bias for movement to its disengaged position when the auxiliary pawl is moved to its open position.

In accordance with a further aspect, the method can further include biasing the auxiliary pawl to its closed position, into engagement with the auxiliary ratchet, with a spring member.

In accordance with a further aspect, the method can further include arranging the auxiliary pawl release lever to engage the auxiliary pawl while in its rest position and arranging the auxiliary pawl to engage the auxiliary ratchet while in its closed position.

In accordance with a further aspect, the method can further include providing an actuator and an actuator release lever and arranging the actuator release lever for engagement with the auxiliary pawl release lever while the auxiliary pawl release lever is in its rest position and arranging the actuator release lever for movement by the actuator to move the auxiliary pawl release lever to its engaged position.

In accordance with a further aspect, the method can further include biasing the auxiliary pawl release lever and the actuator release lever into engagement with one another with a spring member.

In accordance with a further aspect, the method can further include biasing the auxiliary pawl into engagement with the primary pawl with an auxiliary pawl spring member.

In accordance with a further aspect, the method can further include biasing the primary pawl into engagement with the auxiliary pawl with a primary pawl spring member.

In accordance with a further aspect, the method can further include arranging the primary pawl spring member to bias the primary pawl to its open position when the auxiliary pawl is biased to its open position by movement of the auxiliary pawl release lever to its engaged position.

In accordance with a further aspect, the method can further include providing the auxiliary pawl with a first arm biased into engagement with the primary pawl while in its closed position and arranging the auxiliary pawl to be moveable to its open position via engagement of the auxiliary pawl release lever with the first arm of the auxiliary pawl.

In accordance with a further aspect, the method can further include providing the auxiliary pawl with a second arm spaced from the first arm and arranging the primary pawl in biased engagement with the second arm while in its closed position.

In accordance with a further aspect, the method can further include arranging the auxiliary pawl release lever to only engage the auxiliary pawl and not the primary pawl.

In accordance with a further aspect, the method can further include arranging the auxiliary pawl to remain in constant engagement with the auxiliary pawl release lever to minimize play within the closure latch assembly.

In accordance with another aspect of the disclosure, a method of constructing a closure latch assembly for a vehicle closure panel, having latch release lever, a primary ratchet, a primary pawl, an auxiliary ratchet, and an auxiliary pawl, is provided. The method includes a step of providing the latch release lever having an auxiliary pawl release leg. The method further includes a step of providing one of the latch release lever and the auxiliary pawl having an interface leg. The method further yet includes a step of configuring the latch release lever for movement between a rest position, whereat the auxiliary pawl is located in its auxiliary ratchet locking position and the primary pawl is located in its primary ratchet locking position, a first actuation position, whereat the auxiliary pawl release leg engages the auxiliary pawl to move the auxiliary pawl to its auxiliary ratchet release position, and a second actuation position, whereat the interface leg ensures the primary pawl is moved to its primary ratchet release position.

The method of construction can further include a step of configuring the primary pawl to move to its open position under a spring bias when the latch release lever is located in the first actuation position.

The method of construction can further include a step of providing the interface leg having a drive member and providing the primary pawl having a driven member, and configuring the drive member to engage the driven member while the latch release lever is moved to the second actuation position to move the primary pawl to the primary ratchet release position, and configuring the drive member to remain spaced from the driven member while the latch release lever is located in the first actuation position.

The method of construction can further include a step of providing the interface leg being formed as a monolithic piece of material with the latch release lever.

The method of construction can further include a step of configuring the interface leg to engage the auxiliary ratchet, while the latch release lever is located in the second actuation position, to move the primary pawl to the primary ratchet release position.

The method of construction can further include a step of providing the interface leg being formed as a monolithic piece of material with the auxiliary pawl.

In accordance with another aspect of the disclosure, a method of causing a closure latch assembly, having a latch release lever, a primary ratchet, a primary pawl, an auxiliary ratchet, and an auxiliary pawl, of a vehicle closure panel to move from a latched position to an unlatched position is provided. The method includes: providing the latch release lever having an auxiliary pawl release leg coupled with the auxiliary pawl. Further, providing one of the latch release lever and the auxiliary pawl having an interface leg. Further yet, configuring the latch release lever for movement between a rest position, whereat the auxiliary pawl is located in its auxiliary ratchet locking position and the primary pawl is located in its primary ratchet locking position, a first actuation position, whereat the auxiliary pawl release leg causes the auxiliary pawl to move to its auxiliary ratchet release position, and a second actuation position, whereat the interface leg causes the primary pawl to move to its primary ratchet release position.

In accordance with another aspect of the disclosure, the method can further include configuring the primary pawl to move to its open position under a spring bias when the latch release lever is located in the first actuation position.

In accordance with another aspect of the disclosure, the method can further include configuring the interface leg to engage the primary pawl while the latch release lever is located in the second actuation position to move the primary pawl to the primary ratchet release position.

In accordance with another aspect of the disclosure, the method can further include configuring the interface leg to remain disengaged from the primary pawl while the latch release lever is located in the first actuation position.

In accordance with another aspect of the disclosure, the method can further include providing the interface leg having a drive member and providing the primary pawl having a driven member, and configuring the drive member to engage the driven member while the latch release lever is located in the second actuation position to move the primary pawl to the primary ratchet release position, and configuring the drive member to remain spaced from the driven member while the latch release lever is located in the first actuation position.

In accordance with another aspect of the disclosure, the method can further include providing the interface leg being formed as a monolithic piece of material with the latch release lever.

In accordance with another aspect of the disclosure, the method can further include configuring the interface leg to engage the auxiliary ratchet, while the latch release lever is located in the second actuation position, to move the primary pawl to the primary ratchet release position.

In accordance with another aspect of the disclosure, the method can further include providing the interface leg being formed as a monolithic piece of material with the latch release lever.

In accordance with another aspect of the disclosure, the method can further include providing the interface leg being formed as a monolithic piece of material with the auxiliary pawl.

In accordance with another aspect of the disclosure, a closure latch assembly for installation in a vehicle door movable between an open position and a closed position is described, the latch including a latch mechanism having a primary ratchet, and a primary pawl, the primary ratchet having a striker capture position, wherein the primary ratchet in the striker capture position retains a striker, and a striker release position, wherein the primary ratchet in the striker capture position releases the striker, the primary pawl having an open position, wherein the primary pawl in the open position is positioned to permit the primary ratchet to move to its striker release position, toward a closed position, wherein the primary pawl in the closed position holds the primary ratchet in its striker capture position, a release lever operably coupled to the primary pawl, a power latch release mechanism for operably moving the release lever over a first range of travel to cause the primary pawl to move from its closed position to its open position, and at least one mechanical latch release mechanism for operably moving the release lever over a second range of travel greater than the first range of travel, wherein the second range of travel forcibly biases the primary pawl from its closed position to its open position.

In accordance with another aspect of the disclosure, a method of operating a closure latch assembly having double-pawl, single ratchet mechanism for opening a vehicle door is described having the steps of actuating a power latch release mechanism to move an auxiliary pawl from a closed position to an open position to allow a primary pawl to move to an open position without imparting a bias force on the primary pawl towards its open position, thereby allowing a ratchet to move under a bias of a ratchet spring to a striker release position to allow the vehicle door to be opened when the primary pawl is moved to its open position.

In accordance with another aspect of the disclosure, there is described a method of operating a closure latch assembly having double-pawl, single ratchet mechanism for opening a vehicle door, including the steps of actuating a power latch release mechanism to move an auxiliary pawl from a closed position to an open position to allow a primary pawl to move to an open position, actuating at least one mechanical latch release mechanism to move an auxiliary pawl from a closed position to an open position and to impart a force against the primary pawl to urge the primary pawl move to the open position. In accordance with another aspect of the disclosure, there is provided a closure latch assembly (10, 110) for installation in a vehicle door, having a latch mechanism having a primary ratchet, a primary pawl, and an auxiliary pawl, the primary ratchet being moveable between a striker capture position, whereat the primary ratchet retains a striker, and a striker release position, whereat the primary ratchet releases the striker, the primary pawl being moveable between a closed position whereat the primary pawl holds the primary ratchet in its striker capture position and an open position whereat the primary pawl is positioned to permit the primary ratchet to move to its striker release position, the auxiliary pawl being moveable between a closed position whereat the primary pawl is maintained in its closed position by contact of the auxiliary pawl with the primary pawl at a primary contact region and an open position whereat the primary pawl moves to its open position and wherein the auxiliary pawl is positioned in its closed position by contact of the auxiliary pawl with the primary pawl at a secondary contact region.

In accordance with yet another aspect of the present disclosure, there is provided a closure latch assembly for installation in a vehicle door movable between an open position and a closed position, including a latch mechanism having a primary ratchet, a primary pawl, and an auxiliary pawl, the primary ratchet being biased by a ratchet spring from a striker capture position, wherein the primary ratchet in the striker capture position retains a striker, toward a striker release position, wherein the primary ratchet in the striker capture position releases the striker, the primary pawl being biased by a pawl spring from an open position, wherein the primary pawl in the open position is positioned to permit the primary ratchet to move to its striker release position, toward a closed position, wherein the primary pawl in the closed position holds the primary ratchet in its striker capture position, the auxiliary pawl being moveable between a closed position, wherein the auxiliary pawl in the closed position maintains the primary pawl in its closed position, and an open position, wherein the auxiliary pawl in its open position allows the primary pawl to move to its open position, a release lever, wherein the release lever is moveable during non-powered actuation by over a first range of travel to cause the auxiliary pawl to move from its closed position to its open position, and wherein the release lever is moveable by over a second range of travel for operably moving the release lever over a second range of travel greater than the first range, wherein the second range of travel forcibly biases the primary pawl from its closed position to its open position.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 3A is a rear-side isometric view showing a release mechanism and some internal components of a latch mechanism of the closure latch assembly of FIG. 2 shown in a Latched mode;

FIG. 3B is a front-side isometric view of the release mechanism and latch mechanism of FIG. 3A;

FIGS. 21 and 21-1 illustrate a flow diagram for a method of constructing a closure latch assembly for installation in a vehicle door in accordance with an aspect of the disclosure;

FIGS. 22 and 23 illustrate respectively flow diagrams for methods of operating a double pawl single ratchet mechanism for a closure latch assembly and a double pawl double ratchet mechanism for a closure latch assembly, in accordance with further aspects of the disclosure;

FIG. 25A is a rear-side isometric view showing a portion of a release mechanism and some internal components of a latch mechanism of the closure latch assembly shown in FIG. 24 in a Latched mode;

FIG. 25B is a front-side isometric view of the release mechanism and latch mechanism shown in FIG. 25A;

Corresponding reference numerals are used throughout all of the drawings to identity common components.

DETAILED DESCRIPTION OF EXAMPLE EMBODIMENTS

Figure 1:
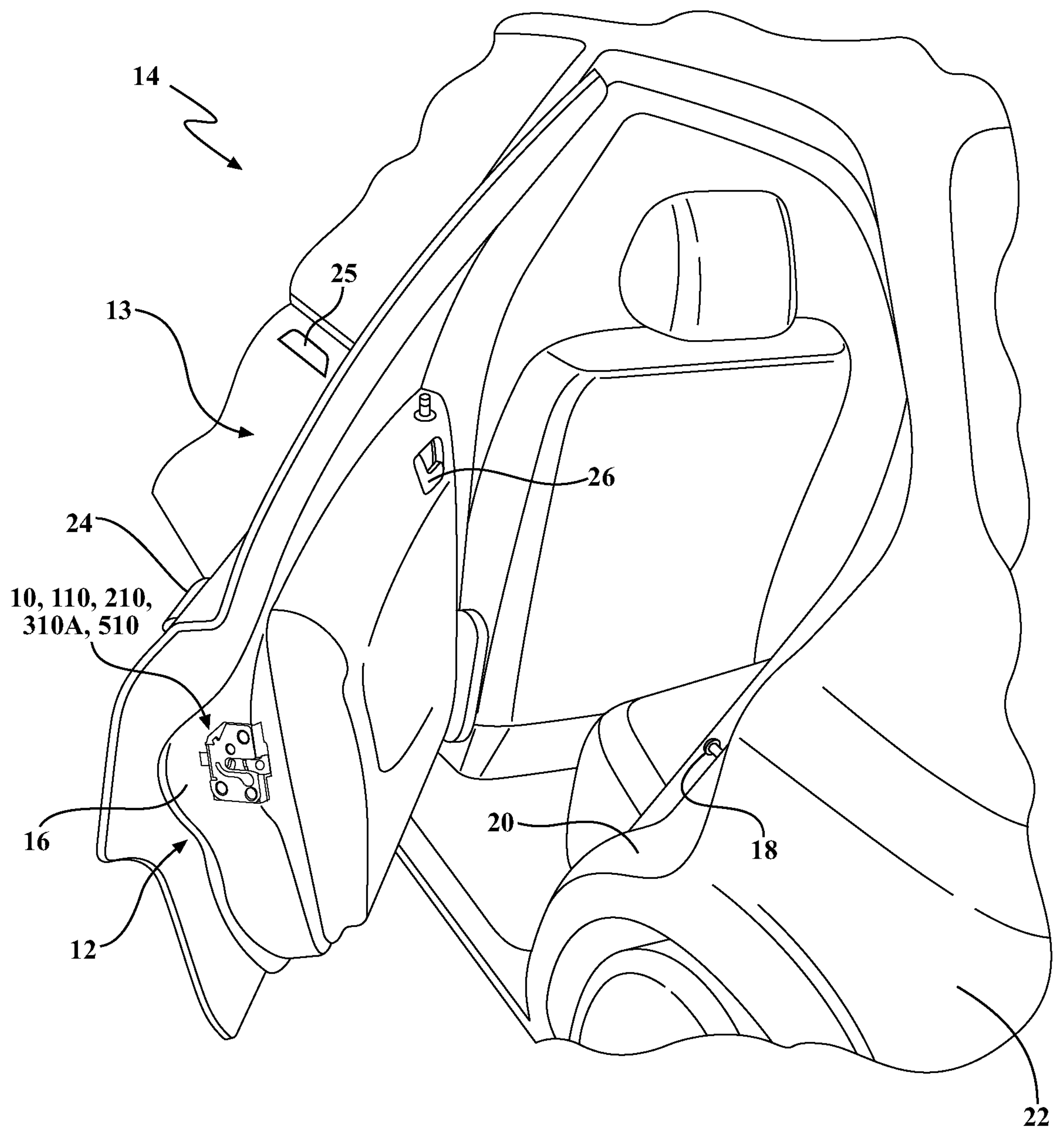
FIG. 1 is an isometric view of a motor vehicle having vehicle door equipped with a closure latch assembly constructed in accordance with multiple aspects of the disclosure.
Figure 2:
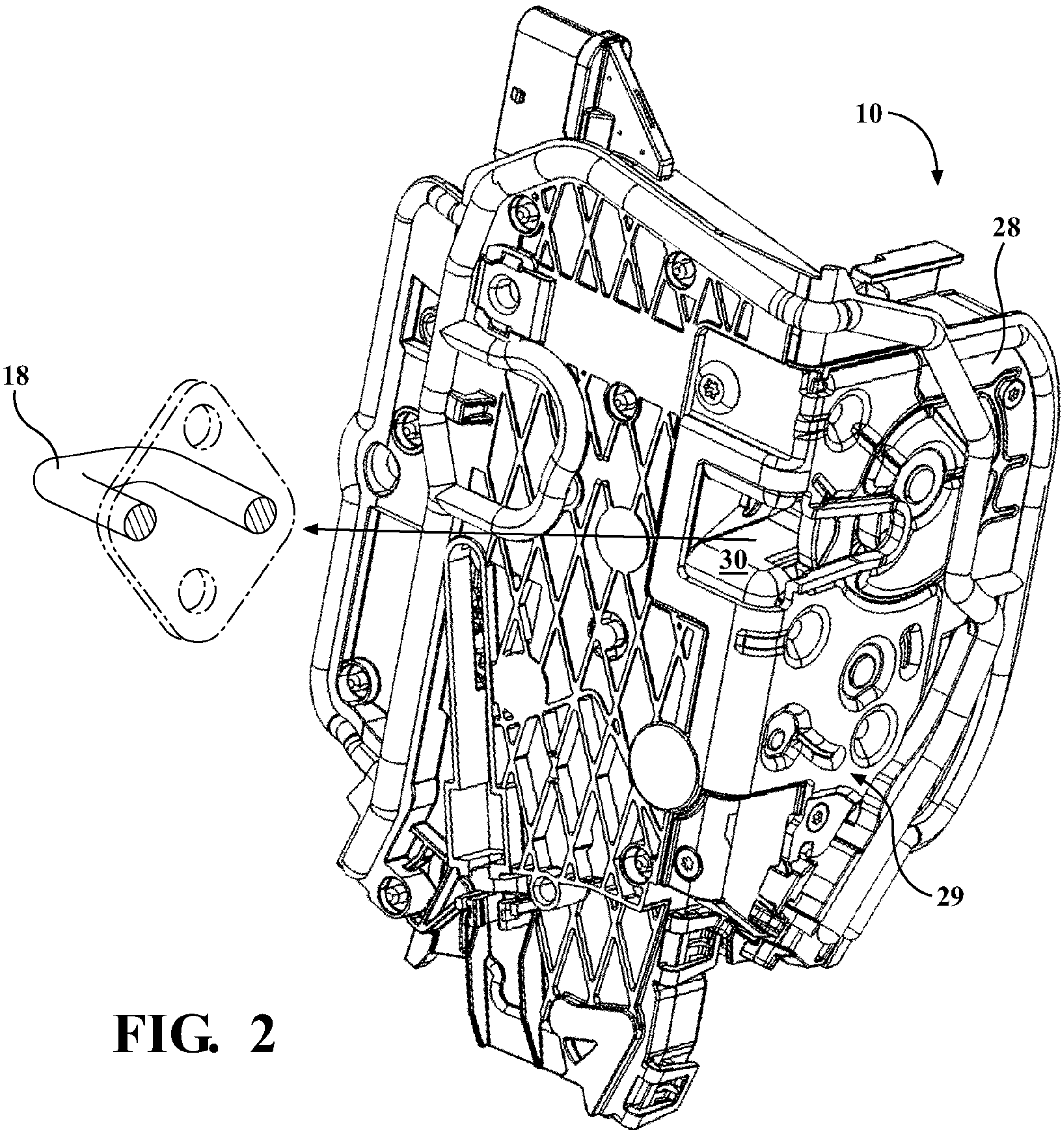
FIG. 2 is an isometric view of a closure latch assembly constructed in accordance with one aspect of the disclosure for use in the vehicle door shown in FIG. 1 shown arranged for receipt of a striker therein.

In general, example embodiments of a closure latch for use in motor vehicle door closure systems constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, a closure latch assembly 10 for a door, shown as a rear door 12, by way of example and without limitation, of a motor vehicle 14 is shown positioned along a shut face portion 16 of door 12 and is configured to releasably engage and capture a striker 18 secured within a door opening 20 formed in a vehicle body 22 in response to movement of door 12 from an open position to a closed position. Door 12 is shown to include an outside door handle 24 and an inside door handle 26, both of which are operatively connected (i.e., electrically and/or mechanically) to closure latch assembly 10. While not shown, it is understood that a similar closure latch assembly is provided in association with a front door 13 of vehicle 14 shown to include its own outside door handle 25.

Figure 4A:
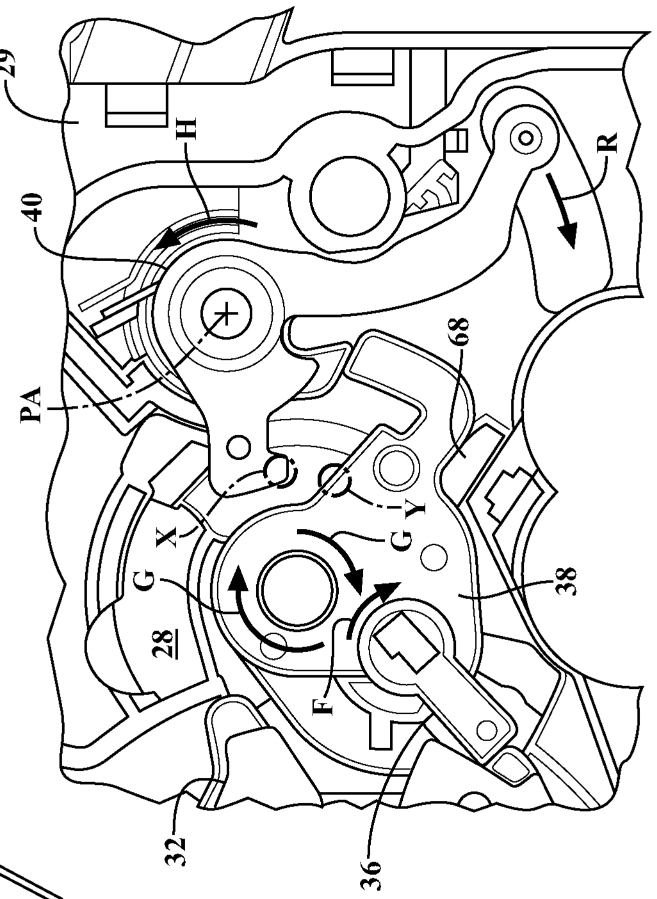
FIG. 4A is an enlarged view illustrating a portion of the closure latch assembly of FIG. 4.
Figure 4:
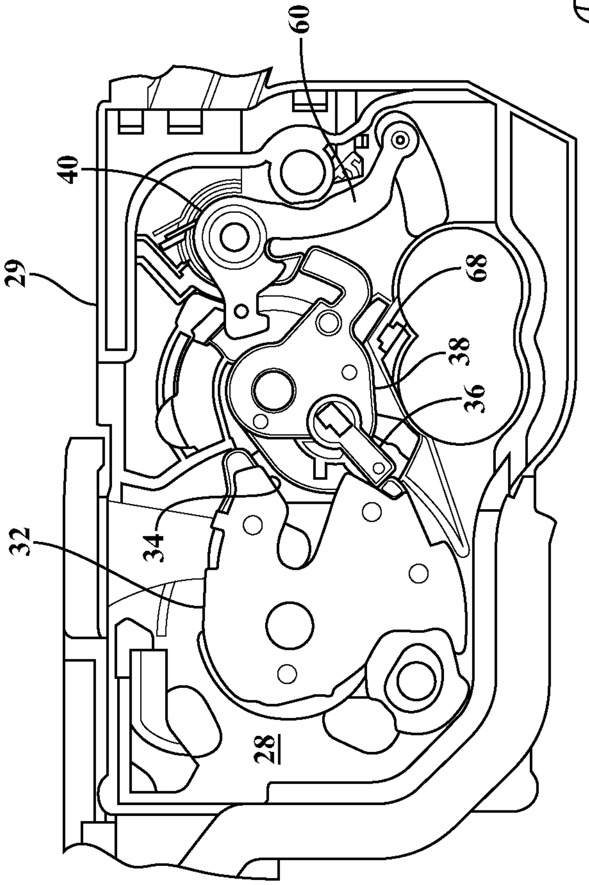
FIG. 4 is a plan view of the closure latch assembly of FIG. 2 with a cover removed showing some of the internal components of the latch mechanism in the Latched mode.
Figure 6:
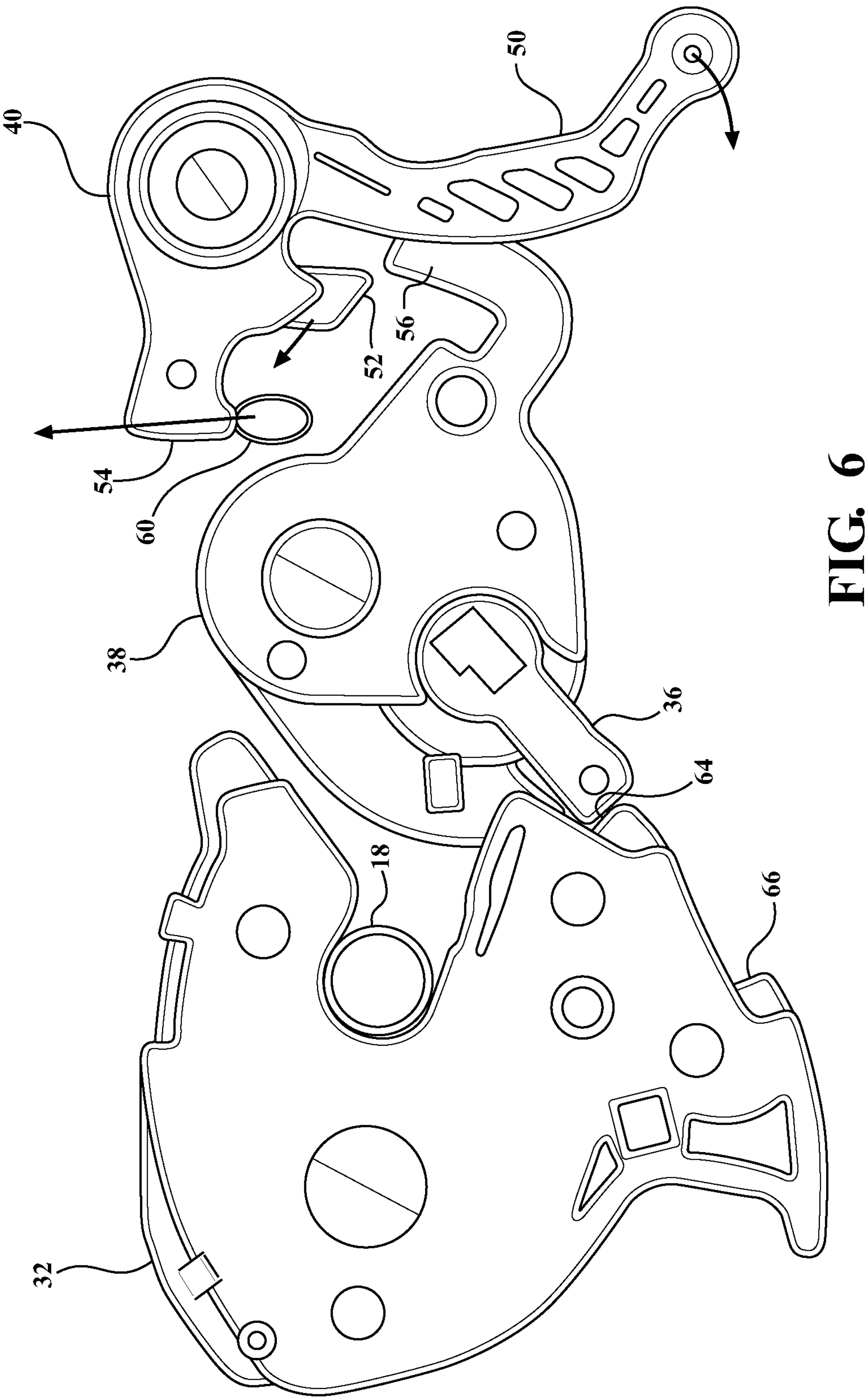
FIG. 6 is a view similar to FIG. 5 illustrating continued movement of the auxiliary pawl toward the open position with the lock lug segment of the auxiliary pawl being disengaged from the drive lug of the auxiliary ratchet.
Figure 7:
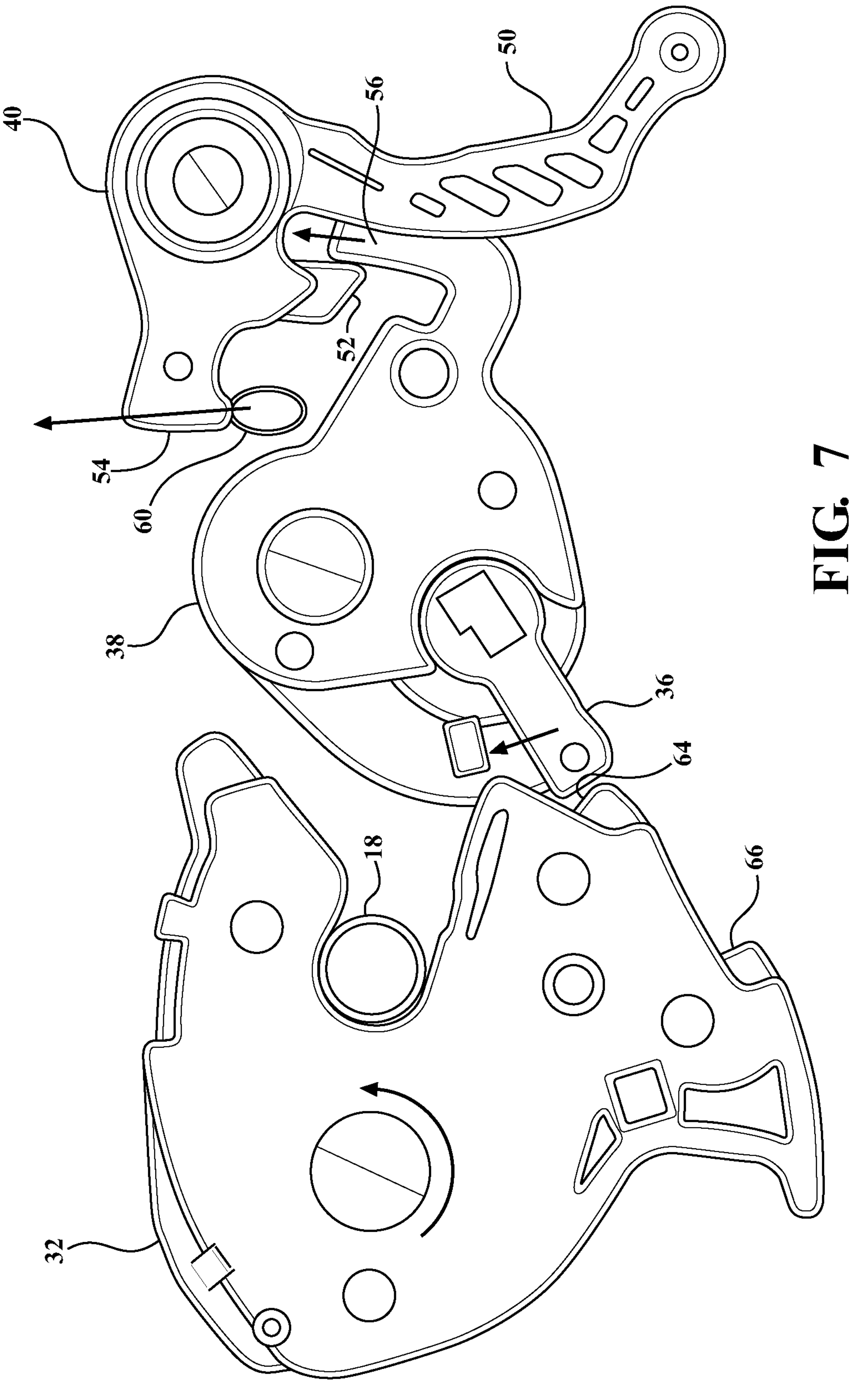
FIG. 7 is a view similar to FIG. 6 illustrating continued movement of the auxiliary pawl to the open position with the auxiliary ratchet being biased in a counterclockwise direction by a spring member.
Figure 8:
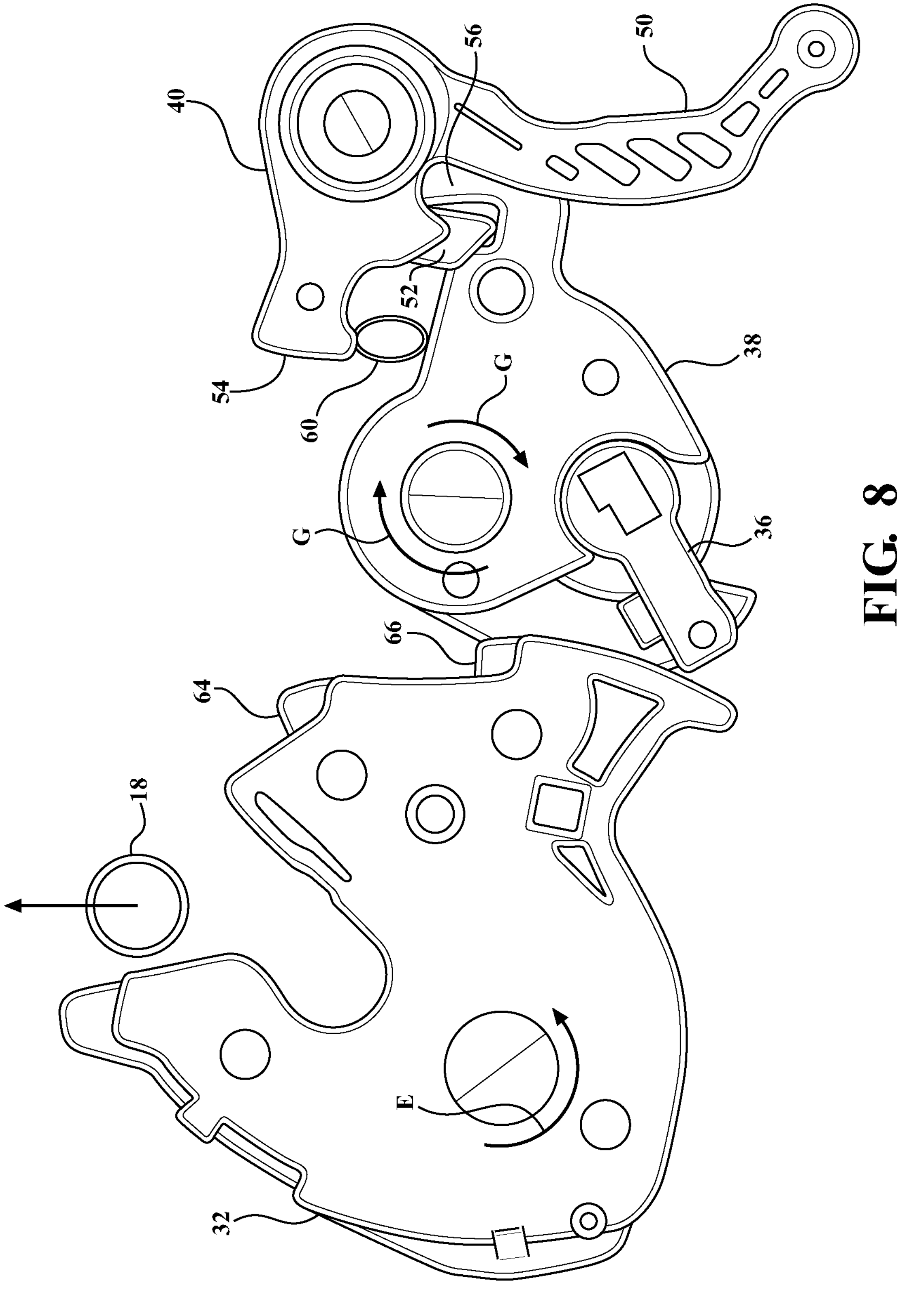
FIG. 8 is a view similar to FIG. 7 illustrating continued biased movement of the auxiliary ratchet in the counterclockwise direction with a primary pawl being moved from a closed position to an open position to release a primary ratchet from a striker capture position to a striker release position.

Referring now to FIGS. 2-11, a non-limiting example embodiment of closure latch assembly 10 and internal components thereof is shown to generally include a latch mechanism 31 and a power latch release mechanism, referred to hereafter simply as latch release mechanism 33 (FIGS. 3A and 3B). Latch mechanism 31 is shown as a double pawl-double ratchet configuration, by way of example and without limitation, having a primary ratchet, also referred to as main ratchet 32, a primary pawl, also referred to as main pawl 36, a secondary ratchet, also referred to as auxiliary ratchet 38, and a secondary pawl, also referred to as auxiliary pawl 40. Primary ratchet 32 is pivotably mounted to a plate segment 28 of a latch housing 29 and has a ratchet slot 34 alignable with a fishmouth slot 30 formed in latch housing 29. Primary ratchet 32 is moveable between a primary closed or "striker capture" position (FIGS. 4-7 and 11) whereat striker 18 is held within fishmouth slot 30 by ratchet slot 34, and an open or "striker release" position (FIGS. 8-10) whereat striker 18 is released from ratchet slot 34 and fishmouth slot 30. Primary ratchet 32 is biased by a primary ratchet spring 32' (FIGS. 3A and 3B) toward its striker release position, as indicated by arrow "E" (FIG. 8). Primary pawl 36 is pivotably supported by secondary ratchet 38 for movement between a secured, primary ratchet locking position or "closed" position (FIGS. 3-7) whereat primary pawl 36 locates and holds primary ratchet 32 in its striker capture position, and an unsecured, primary ratchet release position or "open" position (FIG. 8), whereat primary pawl 36 is positioned to permit primary ratchet 32 to move to its striker release position. A primary pawl biasing spring (not shown) is operable to normally bias primary pawl 36 toward its open position, as indicated by arrow "F" in FIGS. 4A and 5. Secondary ratchet 38 is pivotably mounted to plate segment 28 of latch housing 29 for movement between a first or "engaged" position (FIGS. 3-7) whereat secondary ratchet 38 holds primary pawl 36 in its closed position and a second or "disengaged" position (FIG. 8) whereat secondary ratchet 38 allows primary pawl 36 to be biased to its open position. A secondary ratchet biasing member (such as a spring member, not shown) is provided for normally biasing secondary ratchet 38 toward its engaged position, as indicated by arrow "G" in FIG. 8. Finally, secondary pawl 40 is pivotably mounted to plate segment 28 about pivot axis PA for movement between an auxiliary ratchet locking position, also referred to as first or "closed" position (FIGS. 3-5), whereat secondary pawl 40 holds secondary ratchet 38 in its engaged position, and an auxiliary ratchet release position, also referred to as a second or "open" position (FIG. 6-8), whereat secondary pawl 40 is positioned to permit secondary ratchet 38 to move to its disengaged position. A secondary pawl biasing member, indicated by arrow "H" in FIG. 4A, is provided for normally biasing secondary pawl 40 toward its closed into engagement, or into a blocking positioning, with auxiliary ratchet 38.

Secondary pawl 40 is shown to include a pivot segment 50, a lock lug segment 52, and an engagement segment 54. With secondary pawl 40 located in its closed position, lock lug segment 52 engages a drive lug 56 on secondary ratchet 38 and holds secondary ratchet 38 in its engaged position. In contrast, movement of secondary pawl 40 to its open position as indicated by arrow "R", in a direction opposite to arrow "H", functions to release its lock lug segment 52 from engagement with drive lug 56 on secondary ratchet 38, thereby permitting secondary ratchet 38 to move automatically to its disengaged position, for example as caused by main pawl 36 being allowed to move in response to lock lug segment 52 disengagement from drive lug 56, the main pawl 36 allowed to move due to rotation of ratchet 32 under the bias E of primary ratchet spring 32' acting on ratchet 38 and/or door seal loads acting on ratchet 38 imparted via striker 18, acting on main pawl 36 to rotate secondary ratchet 38 in a direction opposite arrow "G".

Latch release mechanism 33 is best shown in FIGS. 3A and 3B to include an actuator, shown as an electric motor 41, shown as including a motor shaft with a worm gear WG fixed thereto, and a power release gear 43 driven by worm gear WG of electric motor 41 which functions to drive an actuator release lever 58, which in turn functions to drive a latch release lever, also referred to as release lever or auxiliary pawl release lever 60, which in turn moves secondary pawl 40 from its closed position to its open position to provide a power releasing function of latch mechanism 31. Rotation of power release gear 43 in a first or "releasing" direction results in release of latch mechanism 31 and rotation in an opposite or "resetting" direction results in resetting of latch mechanism 31. The actuator release lever 58 is in engagement with the auxiliary pawl release lever 60 while the auxiliary pawl release lever 60 is in a rest position and is moveable by the actuator 41 to move the auxiliary pawl release lever 60 to an engaged position. As is well known, a key fob or actuation of a switch on door handle 25 on door 13 provides a signal to an ECU associated with closure latch assembly 10 indicating a request to release latch mechanism 31. Accordingly, the ECU controls operation of motor 41 to rotate power release gear 43.

Auxiliary pawl release lever 60 is coupled with the auxiliary pawl 40, and is shown illustratively as being biased into direct engagement (at contact point "X" of FIG. 4A) with auxiliary pawl 40 via counteracting biasing members, represented by arrow H acting on auxiliary pawl 40 (FIG. 4A) and auxiliary pawl release lever 60 is coupled with the auxiliary ratchet 38, and is shown as being biased into direct engagement (at contact point "Y" of FIG. 4A) with auxiliary ratchet 38 via counteracting biasing members, represented by arrow I acting on auxiliary pawl release lever 60 (FIG. 3A). A bumper 68 provided on housing 29 provides a hard stop against further clockwise rotation as viewed in FIG. 4A undergoes is provided. Auxiliary pawl release lever 60 is further biased in addition to spring member I by the engagement of the actuator release lever 58 under bias indicated by arrow "J" shown in FIG. 3A of actuator release lever bias spring 59. Auxiliary pawl release lever 60 is moveable between a rest position (FIGS. 4 and 11), whereat the auxiliary pawl 40 is located in its closed position and the primary pawl 36 is located in its closed position, and a fully engaged position (FIG. 6), whereat the auxiliary pawl 40 is moved to its open position and the primary pawl 36 is moved to its open position (FIG. 8) under the spring bias, indicated by arrow F, acting on primary pawl 36.

Auxiliary ratchet 38 is operably coupled to the primary pawl 36, wherein primary pawl 36 is shown retained for pivot movement in a cylindrical pocket 62 of auxiliary ratchet 38. Auxiliary ratchet 38 is moveable between its engaged position, whereat the auxiliary ratchet 38 maintains the primary pawl 36 in its closed position, and its disengaged position, whereat the auxiliary ratchet 38 moves the primary pawl 36 to its open position, as discussed above. Auxiliary ratchet 38 is moved to its disengaged position against bias of spring bias indicated by arrow G the auxiliary pawl 40 is forcibly moved to its open position against the spring bias H under the driving influence of auxiliary pawl release lever 60 and actuator release lever 58, that is due to the driving influence of actuator release lever 58 moved against spring bias J and acting on auxiliary pawl release lever 60 when power release gear 43 is rotated to a release position.

Figure 11:
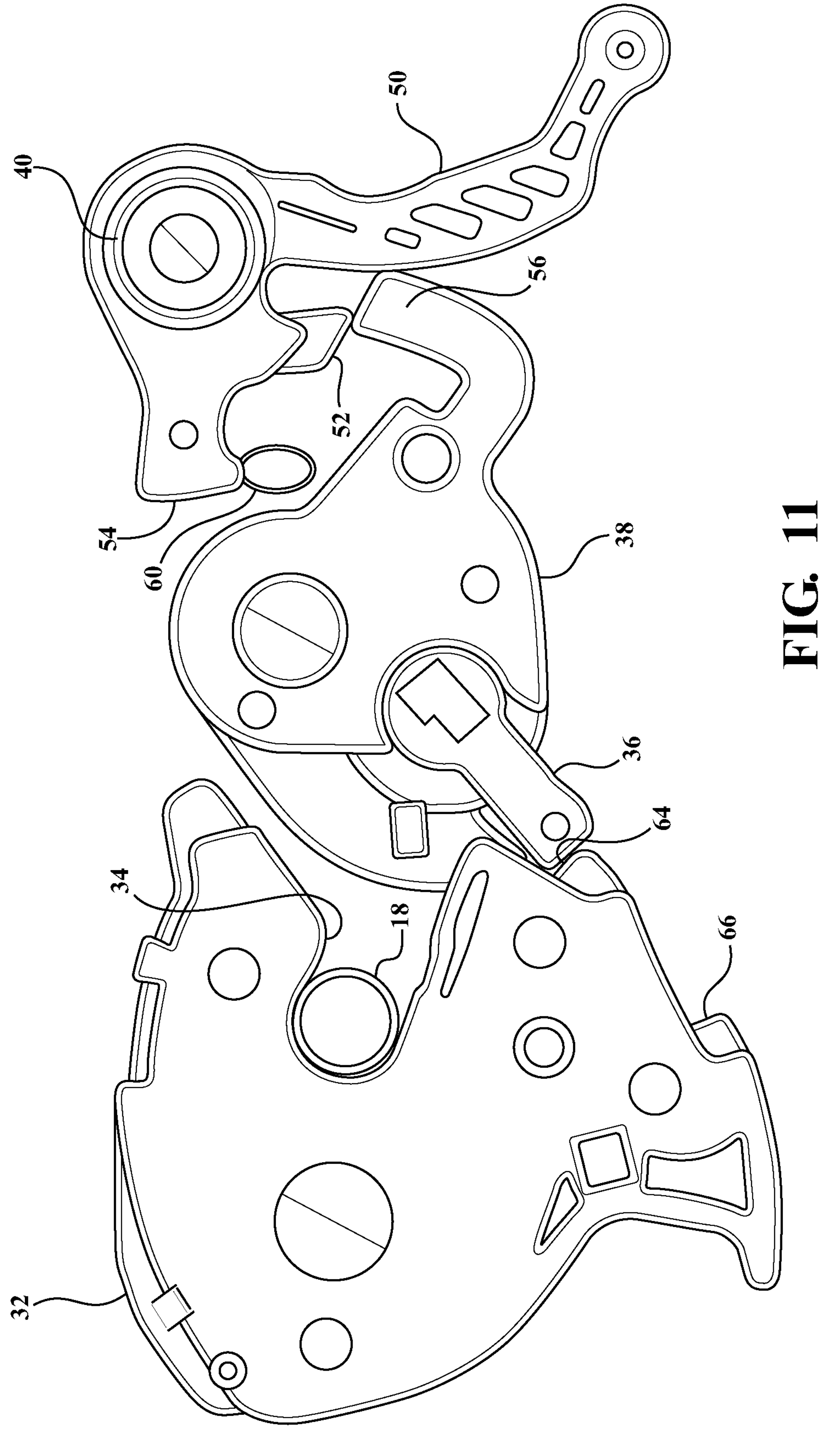
FIG. 11 is a view similar to FIG. 10 illustrating the primary ratchet returned to the striker capture position by the striker being disposed within a ratchet slot thereof and with the primary pawl returned to the closed position within a primary closing notch of the primary ratchet.

In FIGS. 5-10, a sequence of releasing closure latch assembly 10 to its open position is shown, and in FIG. 11, closure latch assembly 10 is reset to its closed position via disposing striker 18 into the primary ratchet striker capture position.

Figure 5:
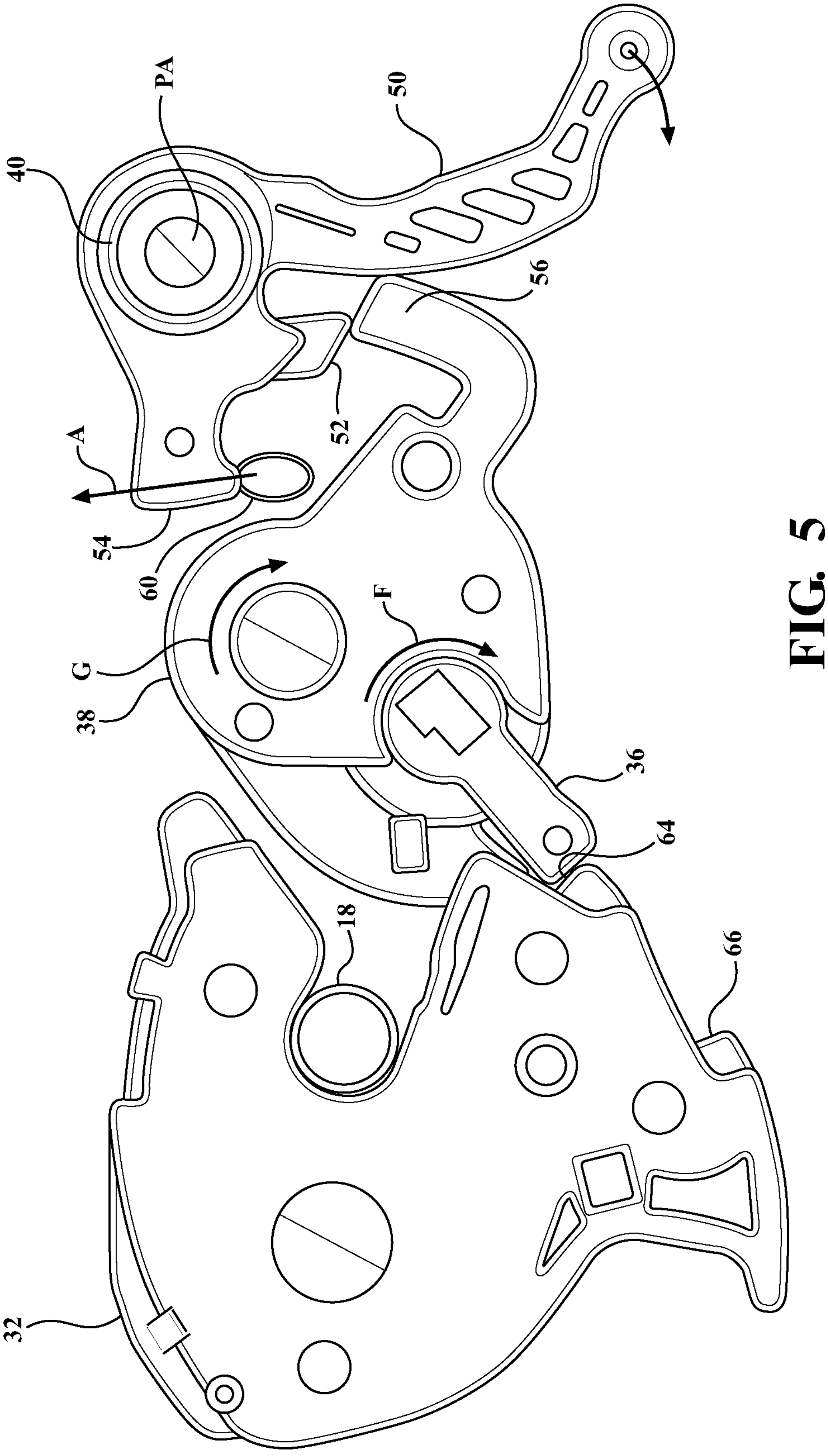
FIG. 5 is a plan view illustrating the auxiliary pawl of the latch mechanism being moved from a closed position toward an open position by an auxiliary pawl release lever to initiate movement of the latch mechanism of the closure latch assembly from the Latched mode of FIG. 4 to an Open mode.

In FIG. 5, an initial stage of releasing closure latch assembly 10 is shown, wherein electric motor 41 is energized to drive power release gear 43, whereupon actuator release lever 58 is moved to cause concurrent movement of auxiliary pawl release lever 60 from its rest position to its engaged position in engagement with auxiliary pawl 40. As shown in the initial stage, an arm extension forming engagement segment 54 of auxiliary pawl 40 begins movement upwardly in the direction of arrow A such that auxiliary pawl 40 is pivoted in a clockwise direction about pivot axis PA against the bias H of biasing member.

In FIG. 6, further movement of auxiliary pawl 40 in the clockwise direction about pivot axis PA is shown, whereupon lock lug segment 52 of auxiliary pawl 40 is moved out of engagement with a leg extension forming drive lug 56 of auxiliary ratchet 38. With lock lug segment 52 being displaced out of engagement from drive lug 56, or in other words lock lug segment 52 being moved from a blocking relationship with drive lug 56 to an unblocking relationship with drive lug 56, auxiliary ratchet 38 is free to move under the urging of primary pawl 36 also now free to move under influence of rotation of ratchet 32 against biasing member G in a counterclockwise direction, as shown in FIG. 7. As auxiliary ratchet 38 is pivoted counterclockwise, primary pawl 36 is allowed to rotate to thereby at least one of being pulled or being rolled from its primary locking position out of locking engagement with a primary locking notch 64 of primary ratchet 32 to allow primary ratchet 32 to move under the bias of biasing spring member 32' and/or seal loading pulling striker 18 in a counterclockwise direction to move to one of its partially open or fully open, striker release position, as shown in FIG. 8. It will be recognized that primary pawl 36 can be configured for receipt within a secondary locking notch 66 to locate primary ratchet 32 in the partially open position (not shown).

Figure 9:
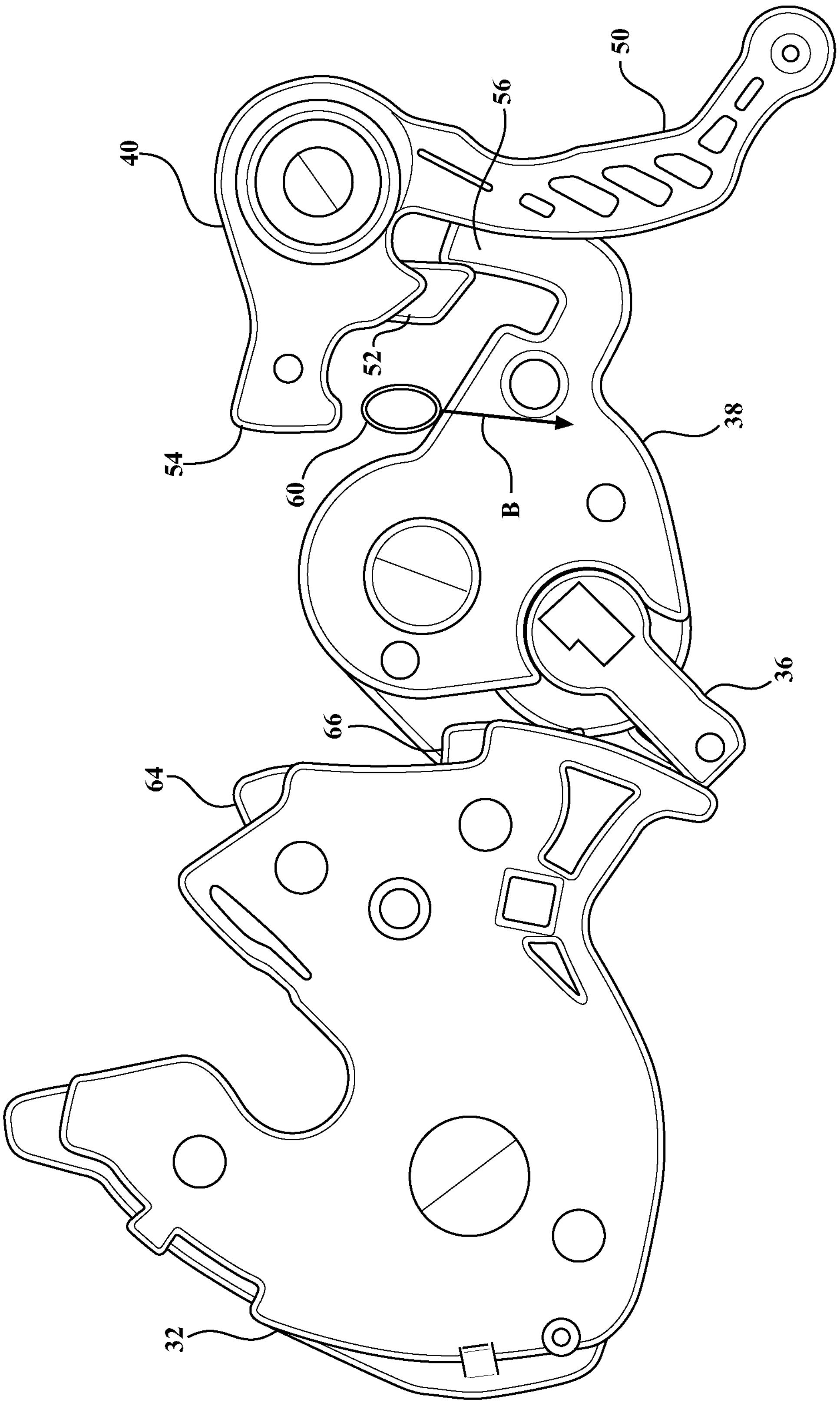
FIG. 9 is a view similar to FIG. 8 illustrating the auxiliary pawl in the open position and the auxiliary ratchet being returned toward a rest position by the auxiliary pawl release lever with the primary ratchet located in the striker release position.
Figure 10:
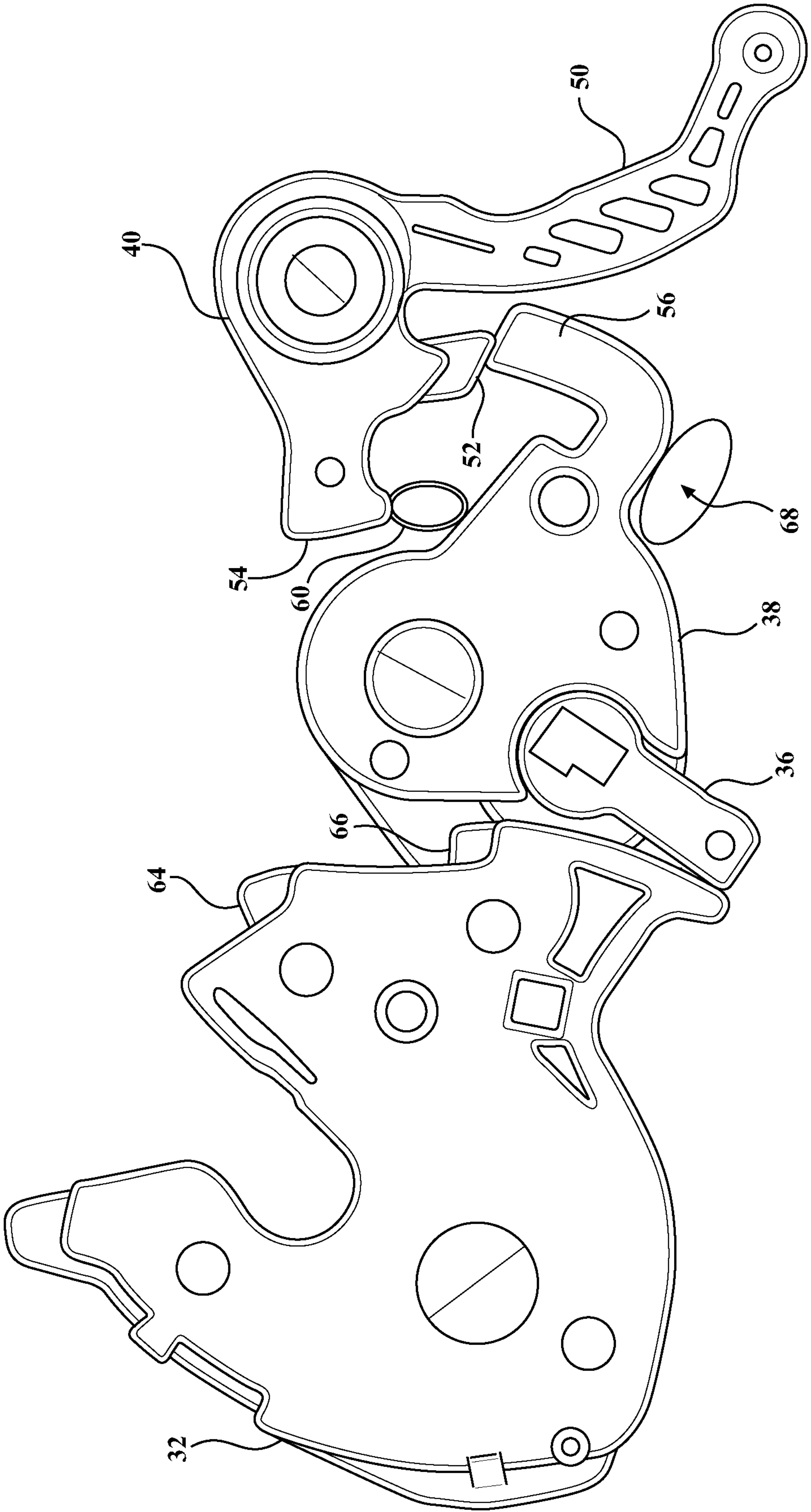
FIG. 10 is a view similar to FIG. 9 illustrating the auxiliary ratchet returned to the rest position against a hard stop by the auxiliary pawl release lever with the primary ratchet located in the striker release position and the auxiliary pawl returned to the closed position with the lock lug segment of the auxiliary pawl being engaged with the drive lug of an auxiliary ratchet.

In FIG. 9, electric motor 41 is reversed to drive power release gear 43 in an opposite direction to that for movement of auxiliary pawl release lever 60 shown in FIGS. 5-8, whereupon actuator release lever 58 is moved to cause concurrent movement of auxiliary pawl release lever 60 from its engaged position downwardly along the direction of arrow B (FIG. 9) back toward its rest position. As such, auxiliary ratchet 38 is driven in the clockwise direction until it is brought into abutment with a hard stop member 68. Upon auxiliary ratchet reaching hard stop member 68, drive lug 56 is moved sufficiently to allow lock lug segment 52 to pivot back into engagement therewith (FIG. 10) under the bias of spring member H. Direct engagement (at contact point "X" of FIG. 4A) between auxiliary pawl 40 and auxiliary pawl release lever 60 and direct engagement (at contact point "Y" of FIG. 4A) with auxiliary ratchet 38 and auxiliary pawl release lever 60 are established in this reset position, and therefore no gaps may be established between at least one of the auxiliary pawl 40 and auxiliary pawl release lever 60 and/or auxiliary ratchet 38. Stable and repeatable precise positioning of the auxiliary ratchet 38, the auxiliary pawl release lever 60, and the auxiliary pawl 40 relative to one another is achieved. Release travel efforts and travel are therefore consistent for each releasing operation as will be described herein below. With drive lug 56 of auxiliary ratchet 38 positioned in abutment with lock lug segment 52, auxiliary ratchet 38 holds primary pawl 36 in position to restore primary ratchet 32 in its striker capture position upon disposing striker 18 fully within ratchet slot 34 of primary ratchet 32 (FIG. 11). Upon restoring primary ratchet 32 in its striker capture position and with drive lug 56 of auxiliary ratchet 38 positioned in abutment with lock lug segment 52, auxiliary ratchet 38 is prevented from rotating due to blocking positioning of lock lug segment 52 in the path of drive lug 56 and as such primary pawl 36 is prevented from movement due to ratchet 32 being urged to move away from its striker capture position under influence of spring 32' and or seal loading between the vehicle door and vehicle body tending to move striker 18 out of the fishmouth slot 30.

Figure 4C:
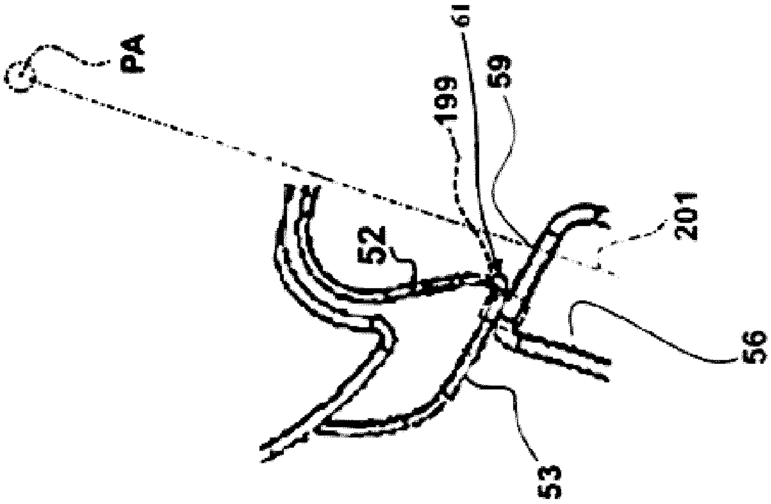
FIG. 4C is an enlarged diagrammatic view of a portion of FIG. 4B illustrating an engagement positioning and contact surfaces of the lock lug segment of the auxiliary pawl with the drive lug of the auxiliary ratchet, in accordance with an illustrative example.
Figure 4B:
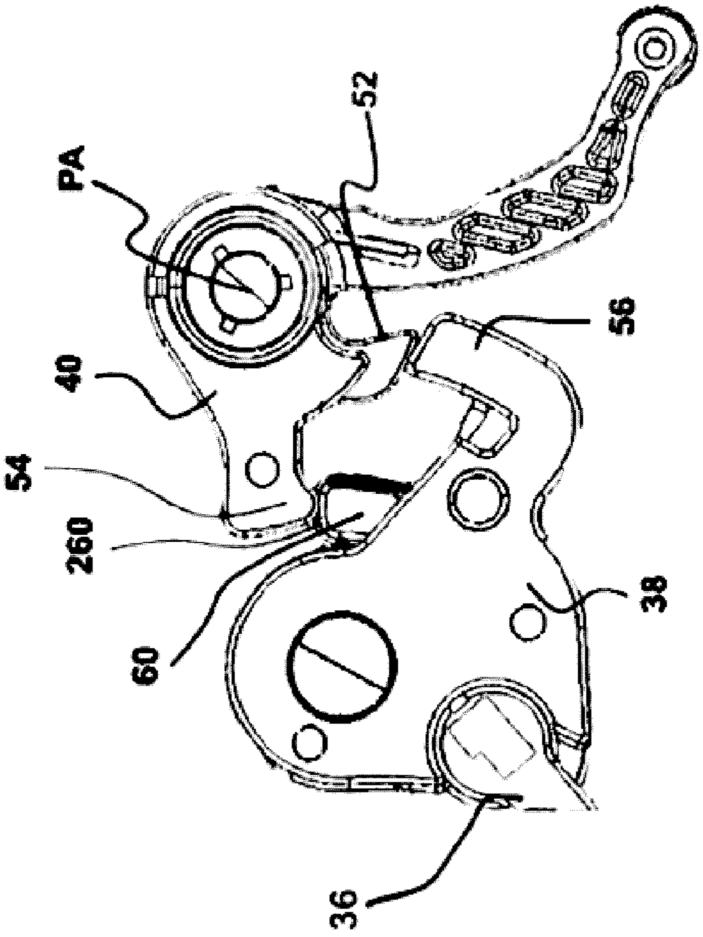
FIG. 4B is an enlarged view illustrating an engagement positioning of a lock lug segment of an auxiliary pawl with a drive lug of an auxiliary ratchet of the closure latch assembly of FIG. 4, in accordance with an illustrative example.
Figure 15:
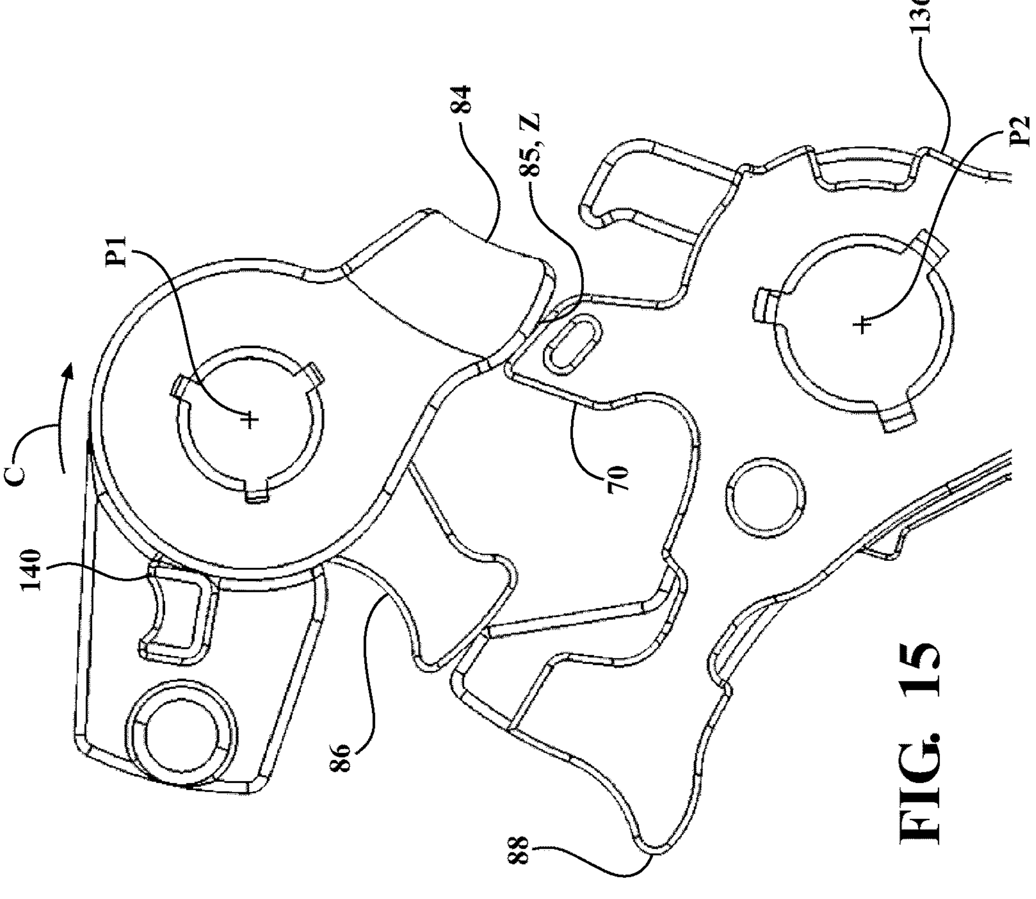
FIG. 15 is an enlarged view illustrating a portion of the closure latch assembly of FIG. 13.
Figure 17:
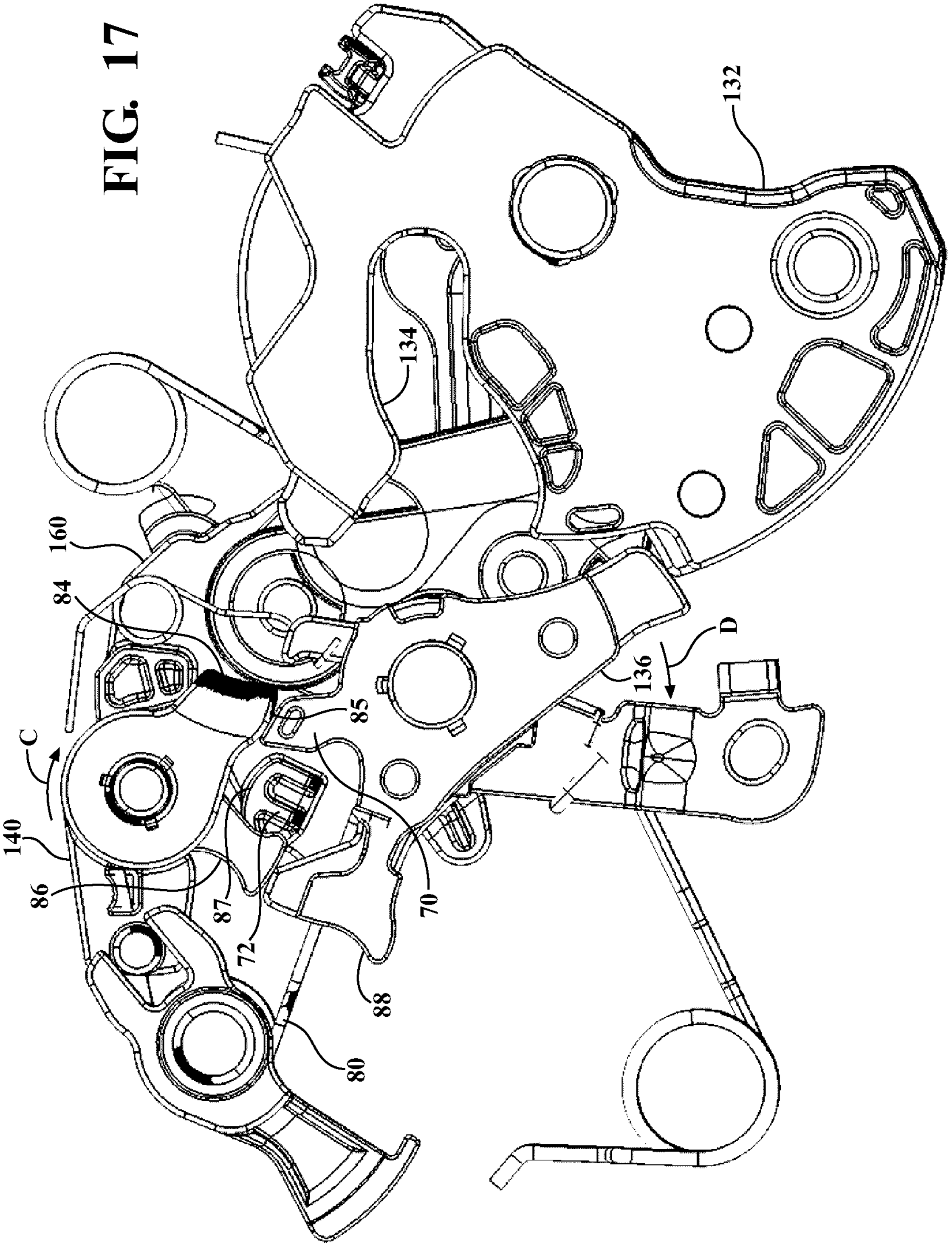
FIG. 17 is a view similar to FIG. 13 illustrating a front-side plan view of the release mechanism and latch mechanism shown in FIG. 12 in a Latched mode.
Figure 18:
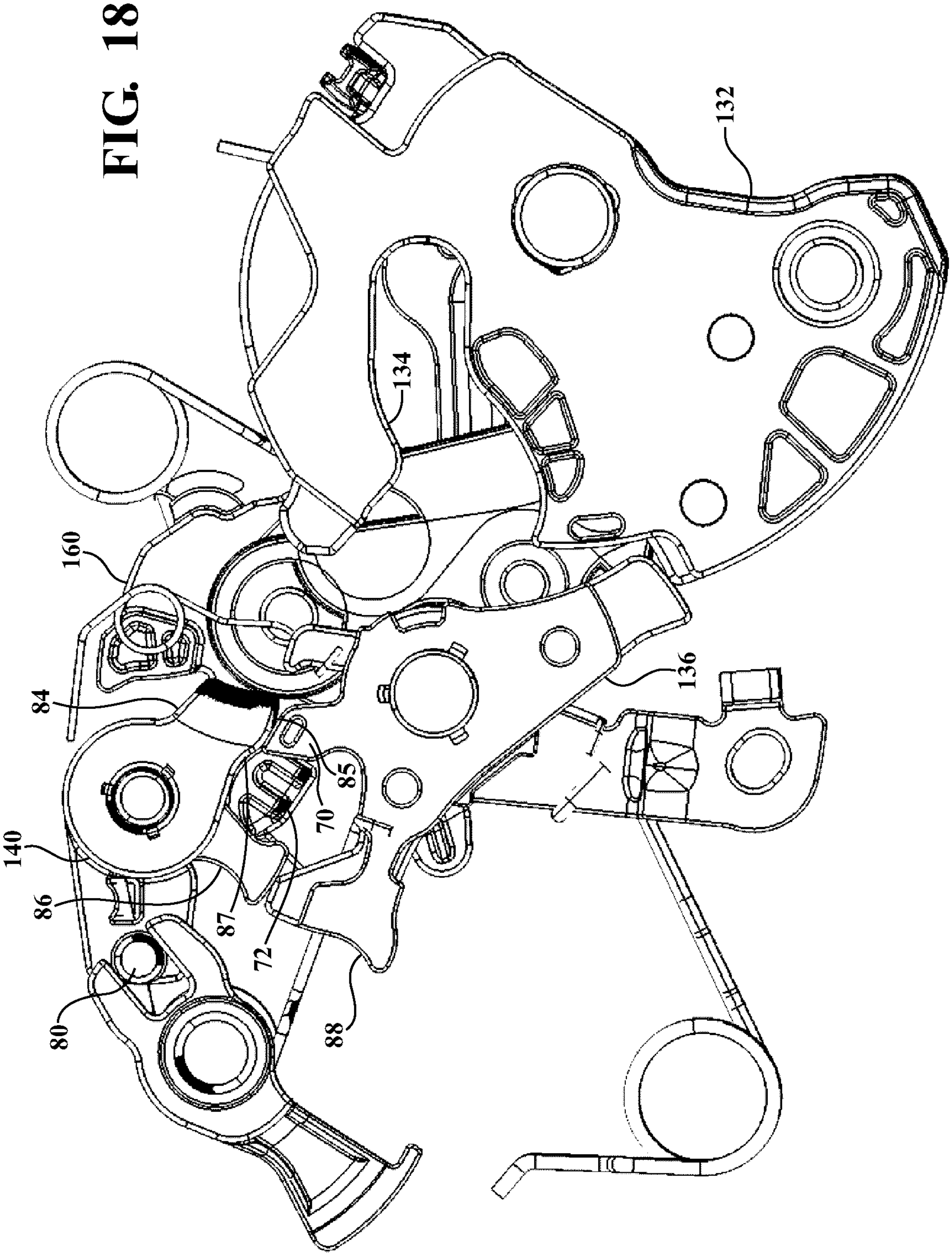
FIG. 18 is a plan view of the illustrating the auxiliary pawl of the latch mechanism of FIG. 17 being moved from a closed position toward an open position by an auxiliary pawl release lever to initiate movement of the latch mechanism of the closure latch assembly from the Latched mode of FIG. 12 to an Open mode.
Figure 19A:
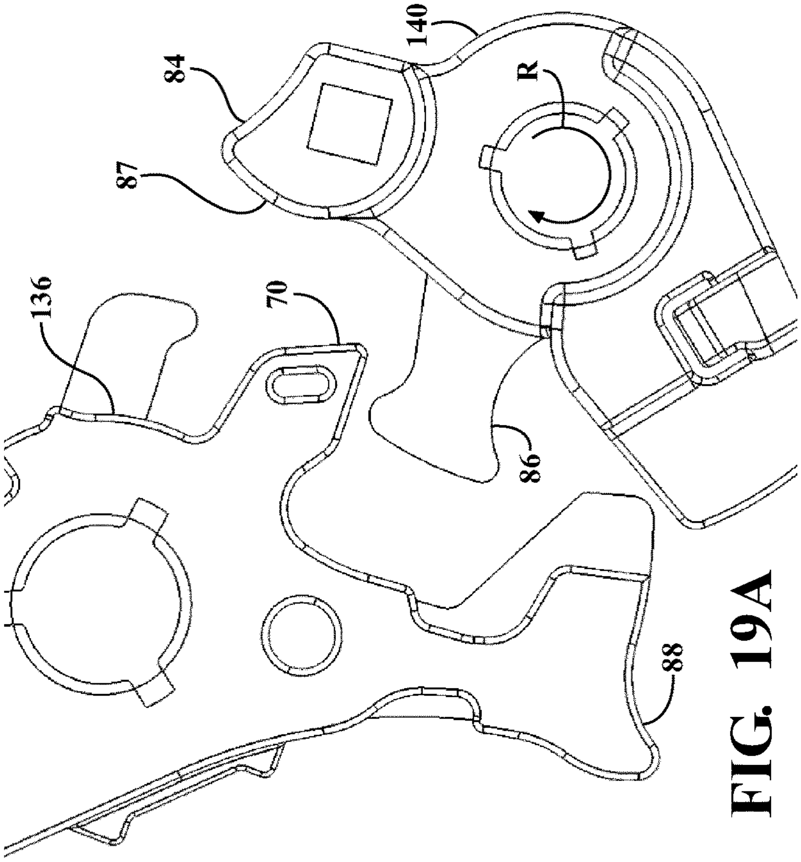
FIG. 19A is an enlarged view of a portion of the latch mechanism of FIG. 19.
Figure 18A:
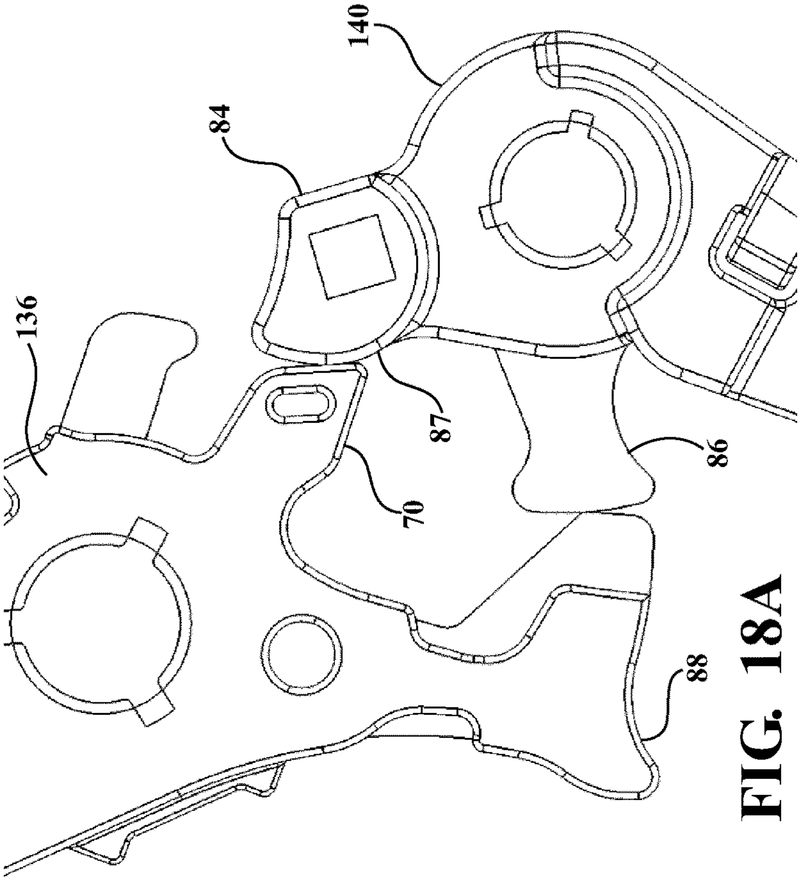
FIG. 18A is an enlarged view of a portion of the latch mechanism of FIG. 18.
Figure 19:
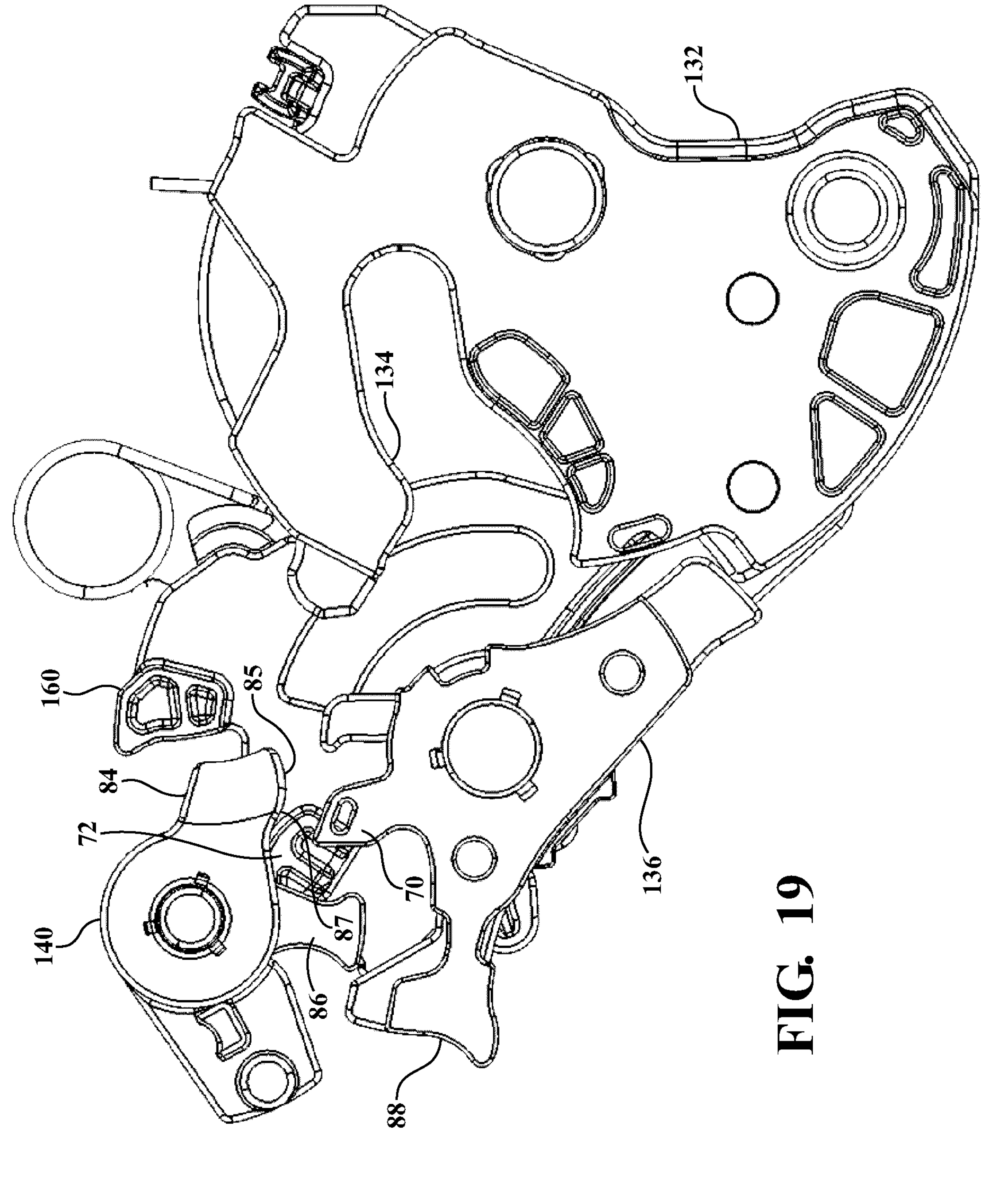
FIG. 19 is a view similar to FIG. 18 illustrating continued movement of the auxiliary pawl toward the open position with an arm of the auxiliary pawl being disengaged from an arm of the primary pawl.
Figure 20:
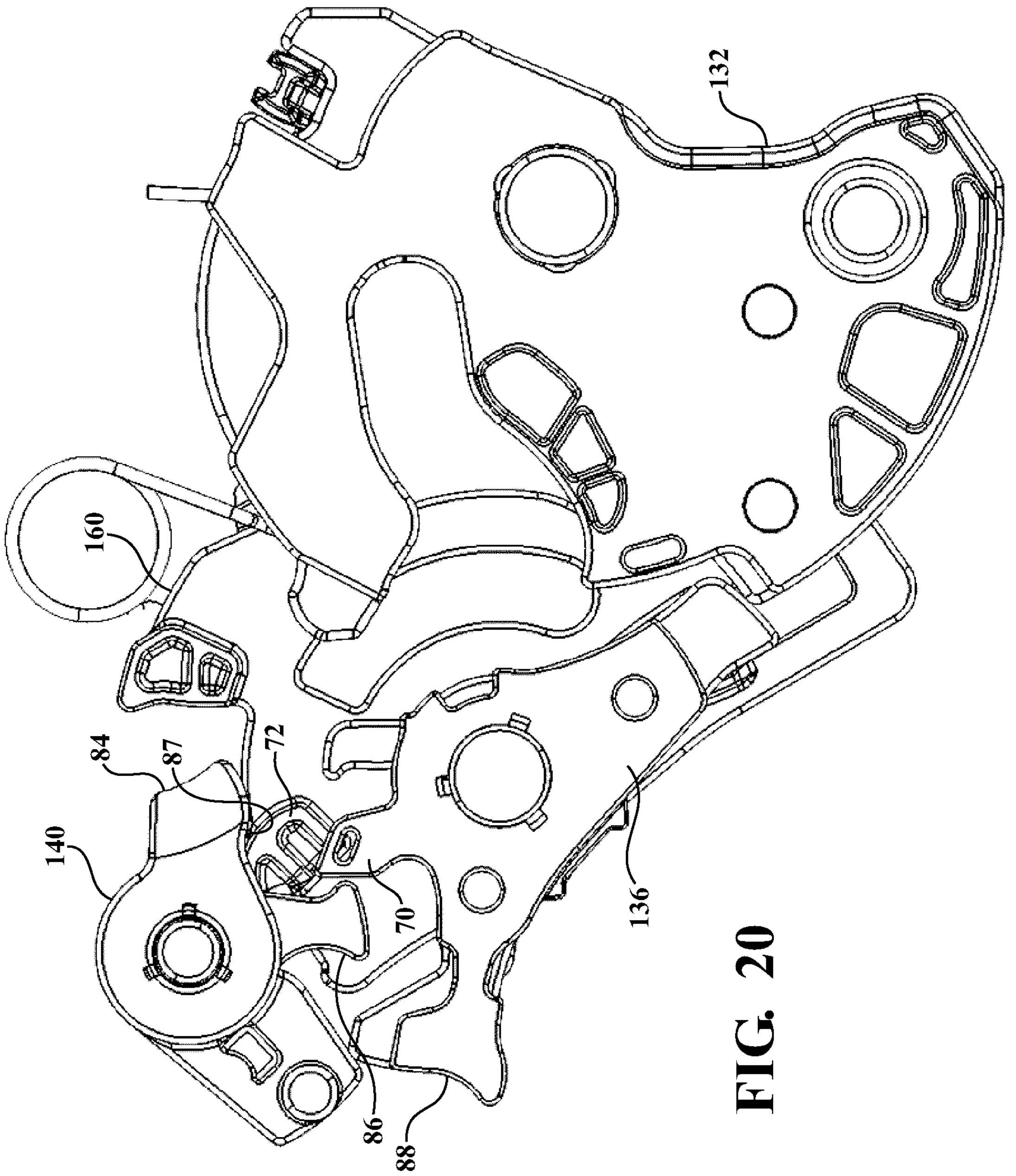
FIG. 20 is a view similar to FIG. 19 illustrating continued movement of the auxiliary pawl to the open position.
Figure 20A:
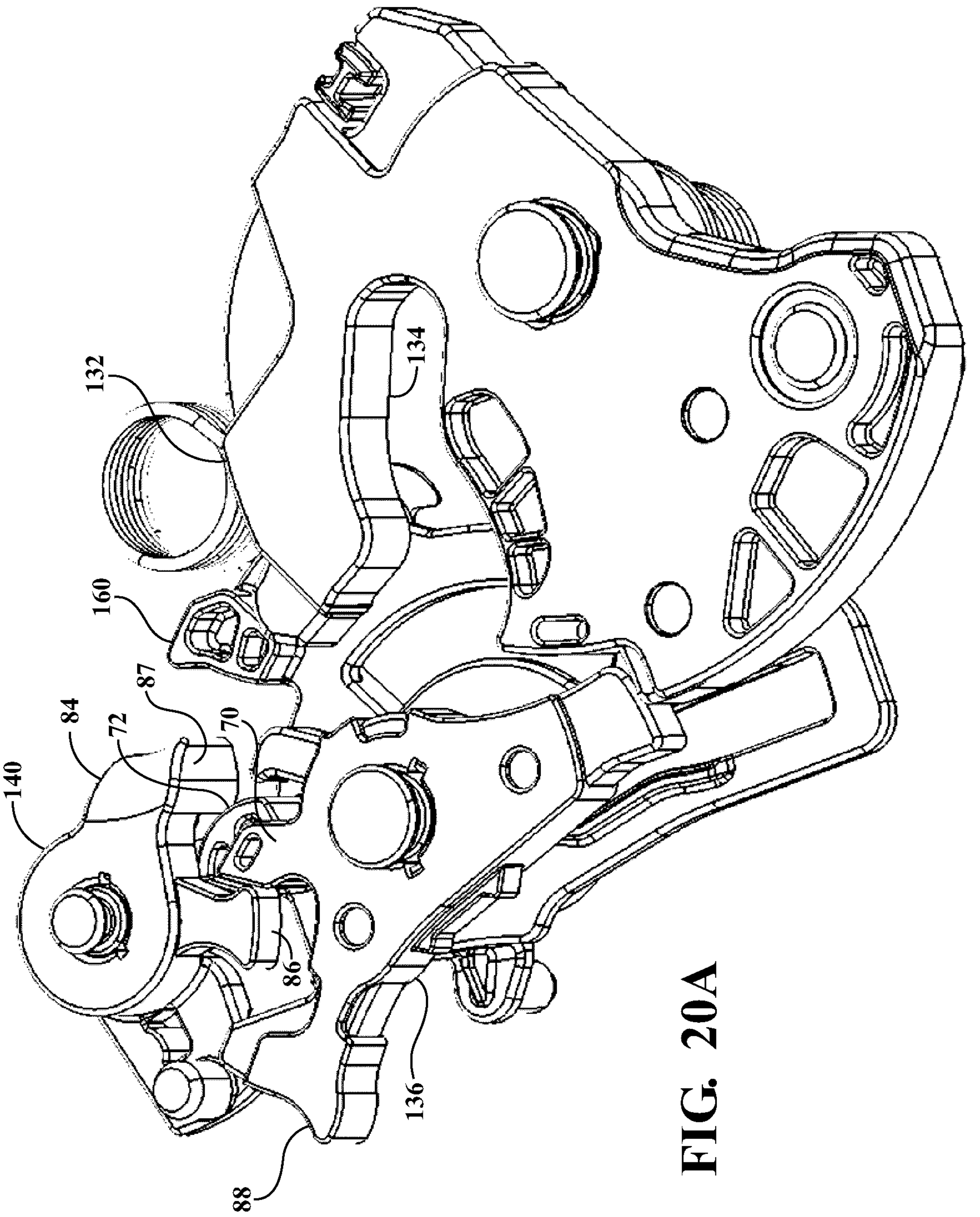
FIG. 20A is an isometric view of FIG. 20.
Figure 20B:
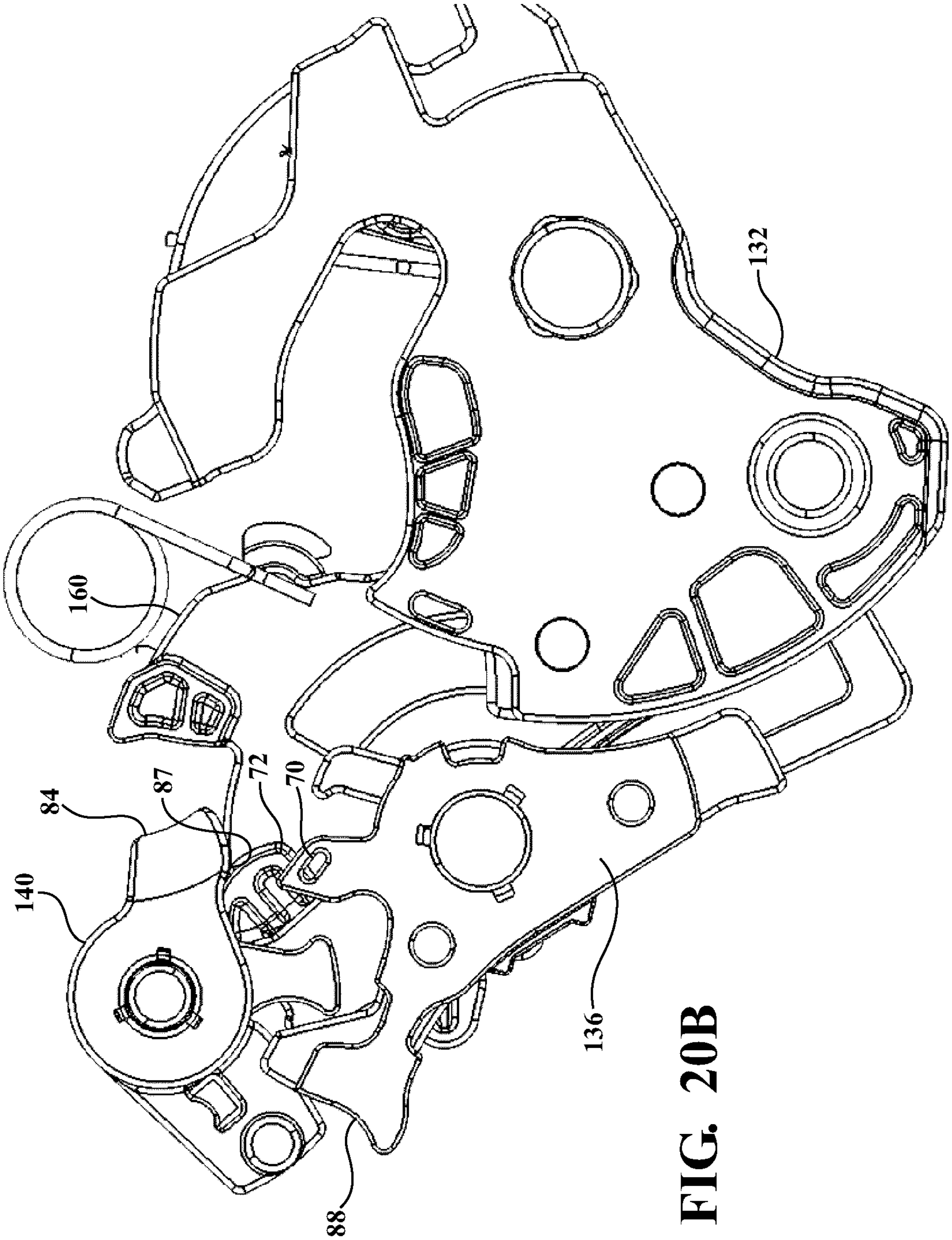
FIG. 20B is a view similar to FIG. 19 but illustrating the auxiliary pawl in the open position.

Referring to FIGS. 4B and 4C, upon auxiliary pawl 40 returning from its open position to its closed position e.g. moving in the counter clockwise direction about pivot axis PA, whereat lock lug segment 52 of auxiliary pawl 40 is moved into its blocking position for engagement with leg extension forming drive lug 56 of auxiliary ratchet 38 at a contact region referred to as a primary contact region, at least a portion of the lock lug segment surface 53 will be positioned adjacent at least a portion of drive lug surface 59, and for example a contact region 199 defined by the areas in engagement of both the at least a portion of the lock lug segment surface 53 and at least a portion of drive lug surface 59 is established with drive lug 56 of auxiliary ratchet 38 positioned in abutment with lock lug segment 52. A coefficient of friction (e.g. as a result of the amount of surface contact being established between drive lug surface 59 and lock lug segment surface 53) may influence the release efforts required to slide the drive lug surface 59 and lock lug segment surface 53 away from and out of engagement with each other a during release operation e.g. activation of auxiliary pawl release lever 60 as described herein above. As a result of being able to precisely establish the contact region 199 during each reset operation, for example upon auxiliary pawl 40 returning from its open position to its closed position, by controlling the positioning e.g. stop position 201 of the lock lug segment 52 by controlling the stop position of engagement segment 54, either for example against a control surface 260 illustratively shown as another latch component such as auxiliary pawl release lever 60, referred to as a secondary contact region, which is illustratively shown as located at a position between the auxiliary pawl 40 and auxiliary ratchet 38 different than the primary contact region between the lock lug segment 52 and the drive lug segment 56, the coefficient of friction (e.g. as a result of the amount of surface contact between being established between lock lug segment 52 and drive lug 56 at contact region 199 will be the same for each subsequent release operation and as a result consistent release travels, release efforts, and release timings are achieved for each release operations. As a result of the reset position of the auxiliary pawl 40 being controlled by an abutment with another high tolerance manufactured component of the release chain, (and not with a low tolerance manufactured component such as a rubber or resilient bumper formed, such as by overmolding, on the housing of the latch) such as for example direct abutment with the primary pawl 136 or indirect abutment such as with the auxiliary ratchet 38 via the auxiliary pawl release lever 60, the amount of surface contact between being established between lock lug segment 52 and drive lug 56 at contact region 199 will be the same for each subsequent release operation and can be designed and implemented without variation of contact region 199 occurring due to manufacture resulting in manufacturing tolerances affecting the controlled reset position. Furthermore, providing either a direct abutment of the auxiliary pawl 40 with a high tolerance component such as with the primary pawl 136, or with only a high tolerance intermediary component such as the auxiliary pawl release lever 60 reduces the accumulation of tolerance stack up between the control surface and the primary pawl 136. Therefore, no separate bumper formed on the housing of the latch, such as an overmolded stop surface, manufactured to low-tolerance precision, acts to stop and control the reset or home position of the primary pawl 136. The position of the auxiliary pawl 40, 540 is not controlled by abutment with a dedicated stop formed on the housing. Secondary contact region between the auxiliary pawl 40 and auxiliary ratchet 38 is shown as an indirect contact region between auxiliary pawl 40 and auxiliary ratchet 38 through an intermediary element as the auxiliary pawl release lever 60, as illustratively shown in FIG. 8. Secondary contact region between the auxiliary pawl 40 and auxiliary ratchet 38 is shown as a direct contact region between auxiliary pawl 140 and primary pawl 136, as illustratively shown in FIG. 15. Such examples of a secondary contact region with the secondary pawl 40, 540 is illustrative of a position control feature as a control surface on the secondary pawl 40, 540 which is not acting as a blocking surface for preventing release of the latch 31, 110, but rather is operable during a latch reset operation following a release so as to repeatedly and precisely control the primary contact region affecting the release characteristic (such as the friction acting on the of the surfaces of lock lug segment 52 and the second arm 86 of secondary pawl 40, 540 in engagement with the drive lug 56 and end of an arm 88, respectively). Furthermore, strength of the components can be enhanced since misalignment of weaker regions of lock lug segment 52 relative to leg extension forming drive lug 56 are avoided. An example of a case of such misalignment without a control stop positioning (e.g. without control surface 260 illustratively shown as auxiliary pawl release lever 60 provided for engagement segment 54) is shown in FIG. 4C, illustrating a weaker tip portion 61 of lock lug segment 52 being aligned with engagement segment 54, e.g. weaker tip portion 61 is not positioned up to stop position 201 of FIG. 4B and also a smaller contact region 199 reducing the contact area size between drive lug surface 59 and lock lug segment surface 53 and thus the coefficient of friction. As a result, either weaker tip portion 61 of lock lug segment 52 may be damaged during an upward motion of drive lug 56 therefore allowing further upward motion of drive lug 56 and release of the latch e.g. during a crash, or auxiliary pawl 40 may be subject to some free play movement and due to the lower coefficient of friction due to a smaller contact area 199 resulting in lower releasing efforts, auxiliary pawl 40 may be more susceptible to unintentional moving to an unblocking position with drive lug 56 during a non-releasing operation, such as a result of inertia forces acting on auxiliary pawl 40 during a crash.

Figure 13:
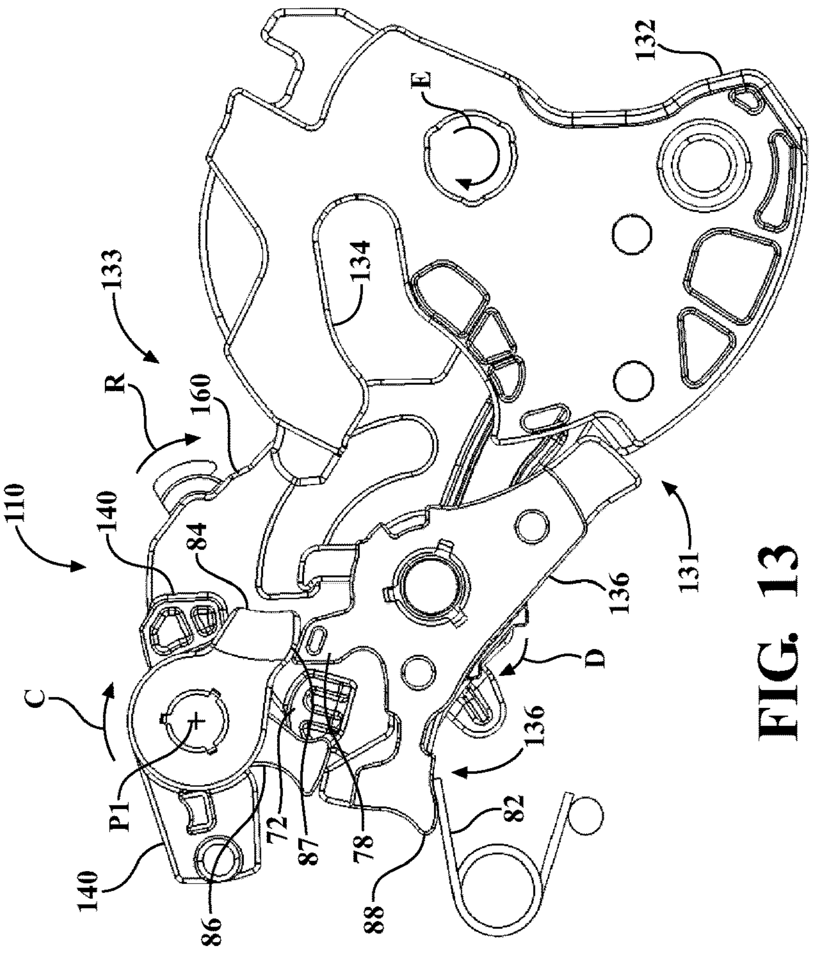
FIG. 13 is a front-side plan view of the release mechanism and latch mechanism of FIG. 12.
Figure 12:
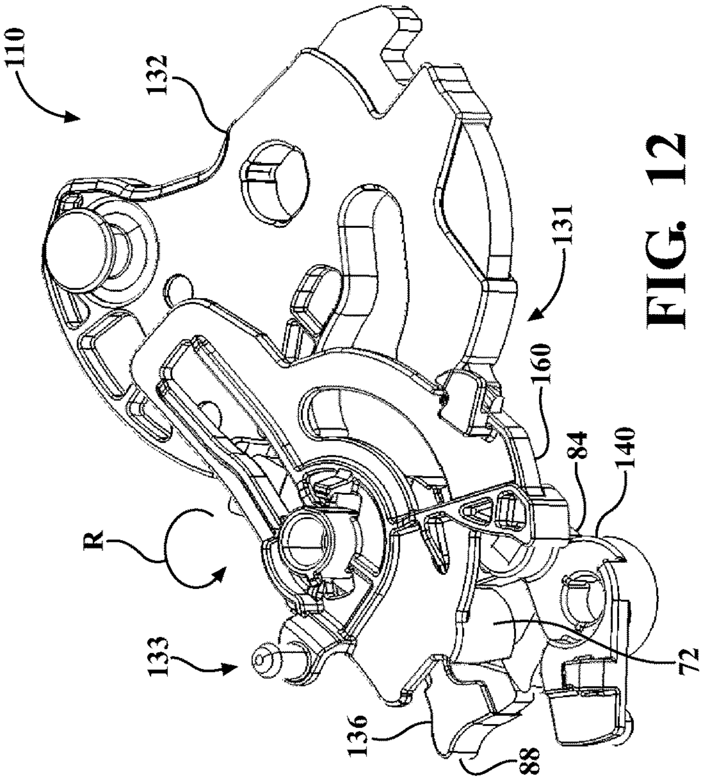
FIG. 12 is a rear-side isometric view showing a release mechanism and some internal components of a latch mechanism of a closure latch assembly constructed in accordance with another aspect of the disclosure in a Latched mode.
Figure 14:
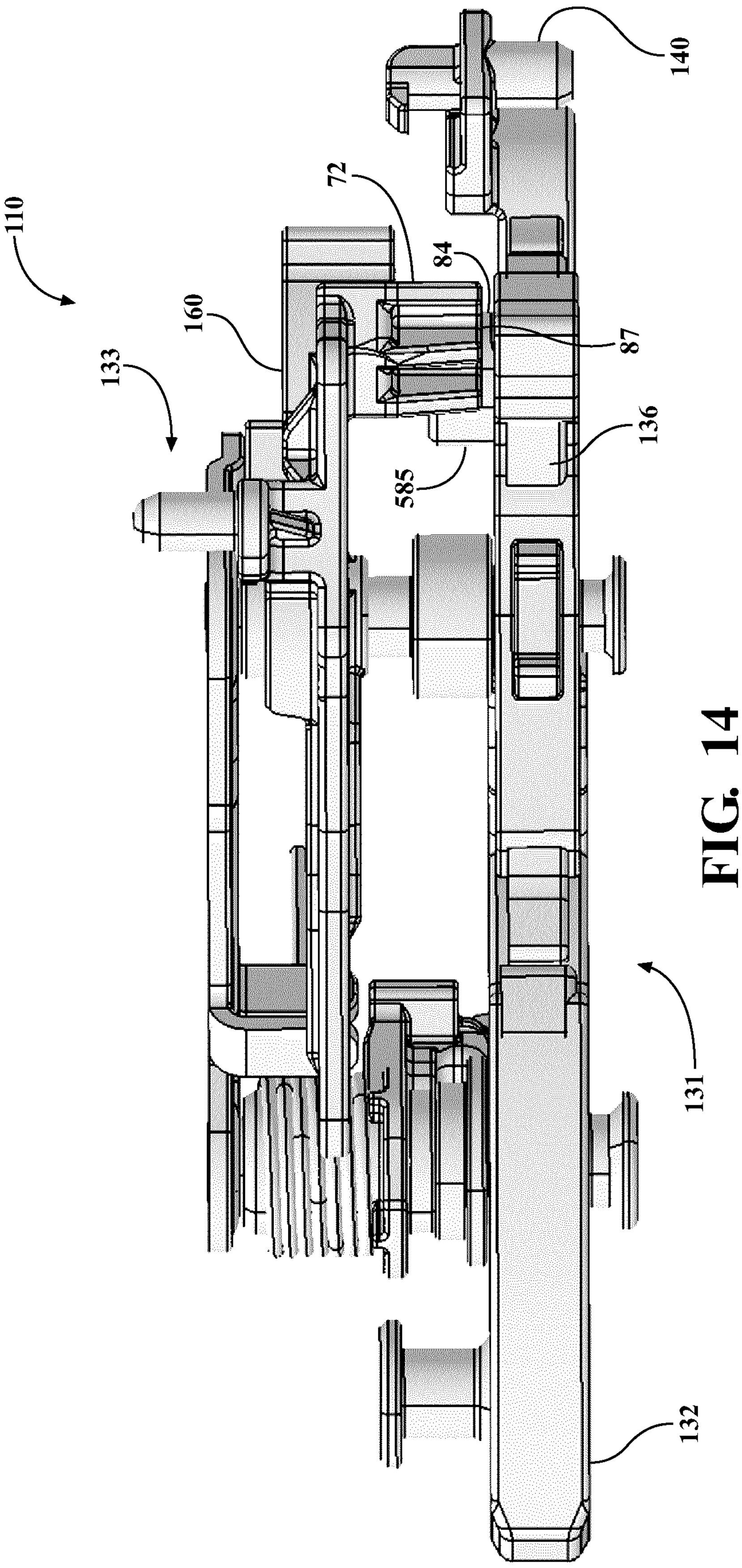
FIG. 14 is a side elevation view of the release mechanism and latch mechanism of FIG. 12.
Figure 16:
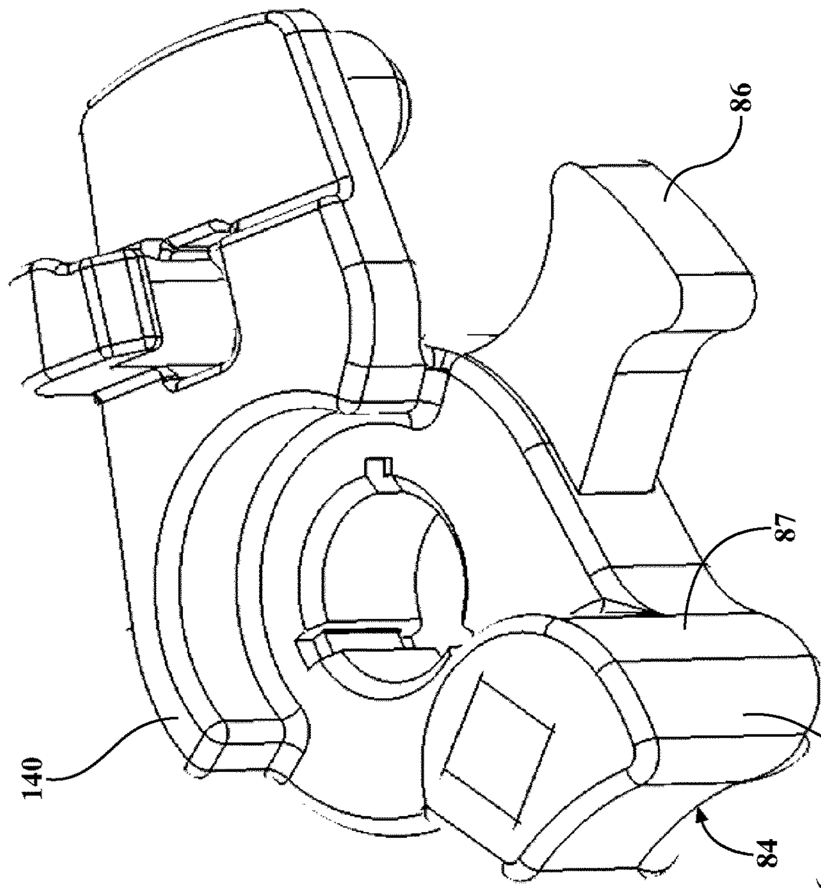
FIG. 16 is an isometric view of an auxiliary pawl of the closure latch assembly of FIG. 12.

In FIGS. 12-14, a non-limiting example embodiment of closure latch assembly 110 and internal components thereof is shown, wherein the same reference numerals as used above, offset by a factor of 100, are used to identify like features. Closure latch assembly 110 includes a latch mechanism 131 and a power latch release mechanism, referred to hereafter simply as latch release mechanism 133. Latch mechanism 131 is shown as a double pawl-single ratchet configuration, by way of example and without limitation, having a primary ratchet, also referred to as main ratchet 132, a primary pawl, also referred to as main pawl 136, and a secondary pawl, also referred to as auxiliary pawl 140. Primary ratchet 132 is pivotably mounted to a plate segment of a latch housing (not shown) and has a ratchet slot 134 configured for captured receipt of a striker 18, as discussed above for ratchet slot 34 of primary ratchet 32. Primary ratchet 132 is moveable between a primary closed or "striker capture" position (FIGS. 12-14, 17, 18, 20 and 20A) whereat striker 18 is held within fishmouth slot 30 by ratchet slot 134, and an open or "striker release" position whereat striker 18 is released from ratchet slot 134 and fishmouth slot 30. Primary ratchet 132 is biased by a primary ratchet spring 132' toward its striker release position, as indicated by arrow "E" (FIG. 13).

The auxiliary pawl 140 is biased into engagement with the primary pawl 136 by an auxiliary pawl spring member 80, such that auxiliary pawl 140 is biased in a direction of arrow C (FIGS. 13 and 17), and the primary pawl 136 is biased into engagement with the auxiliary pawl 140 with a primary pawl spring member 82, such that primary pawl 136 is biased in a direction of arrow D (FIGS. 13 and 17), wherein the primary pawl spring member 82 biases the primary pawl 136 from its closed position toward its open position.

The auxiliary pawl 140 has a first arm 84 presenting a first engagement surface 85 biased into engagement with a protrusion 70 extending outwardly from a pivot axis P2 of the primary pawl 136 while the primary pawl 136 is in its closed position, thereby maintaining the auxiliary pawl 140 in its rest position. The auxiliary pawl 140 is moveable to its open position via engagement of a drive lug 72, extending laterally outwardly from the auxiliary pawl release lever 160, with a second engagement surface 87 of the first arm 84 of the auxiliary pawl 140. Accordingly, the first arm 84 of the auxiliary pawl 140 acts as a stop for the auxiliary pawl 140 against the primary pawl 136, while also acting as a driven surface engaged by the auxiliary pawl release lever 160 to move the auxiliary pawl 140 from its closed position to it open position.

The auxiliary pawl 140 has a second arm 86 spaced from the first arm 84, with the first arm 84 and the second arm 86 shown as extending in oblique directions from a pivot axis P1 (FIG. 13) of auxiliary pawl 140 from one another. An end of an arm 88 of the primary pawl 136 is biased into engagement with the second arm 86 of the auxiliary pawl 140 to maintain the primary pawl 136 in its closed position, in other words, the second arm 86 of the auxiliary pawl 140, when in its closed position as shown for example in FIG. 13, blocks rotation, and for example a clockwise rotation, with reference to FIG. 13, of the end of an arm 88 of the primary pawl 136 to prevent primary pawl 136 from moving from its closed position toward its open position. Accordingly, the primary pawl 136 acts as a positive stop to the auxiliary pawl 140 to locate the auxiliary pawl 140 in its rest position, while the auxiliary pawl 140 acts as a positive stop to the primary pawl 136 to maintain the primary pawl 136 in its closed position. During release, for example during rotation R of the auxiliary pawl release lever 160 as shown in FIGS. 12 and 13, of the closure latch assembly 110, the auxiliary pawl release lever 160 may only engage the auxiliary pawl 140 via the drive lug 72 interacting with the second engagement surface 87 of auxiliary pawl 140, while remaining out of engagement with the primary pawl 136, such that the auxiliary pawl 140 does not act on or otherwise bias the primary pawl 136 toward its open position. Rather, the primary pawl 136 is solely acted on by biasing member D to move to its open position. Direct engagement (at contact point "Z" viewed in FIG. 15) between auxiliary pawl 140 and primary pawl 136 is established when primary pawl 136 is in its closed position, and in other words, no gap may be established between the auxiliary pawl 140 and primary pawl 136. Stable and repeatable positioning of second arm 86 relative to end of the arm 88 is achieved. Therefore the force necessary to move the second arm 86 along the end of the arm 88 during release to overcome the coefficient of friction (e.g. as a result of the same amount of surface contact at area 199' between being established between second arm 86 along the end of the arm 88) will be consistent for each release operation due to the repeatable similar positioning of the arm 86 relative to end of the arm 88 when the primary pawl 136 returns from its open position to its closed position and auxiliary pawl 140 when in its closed position.

Figure 21:
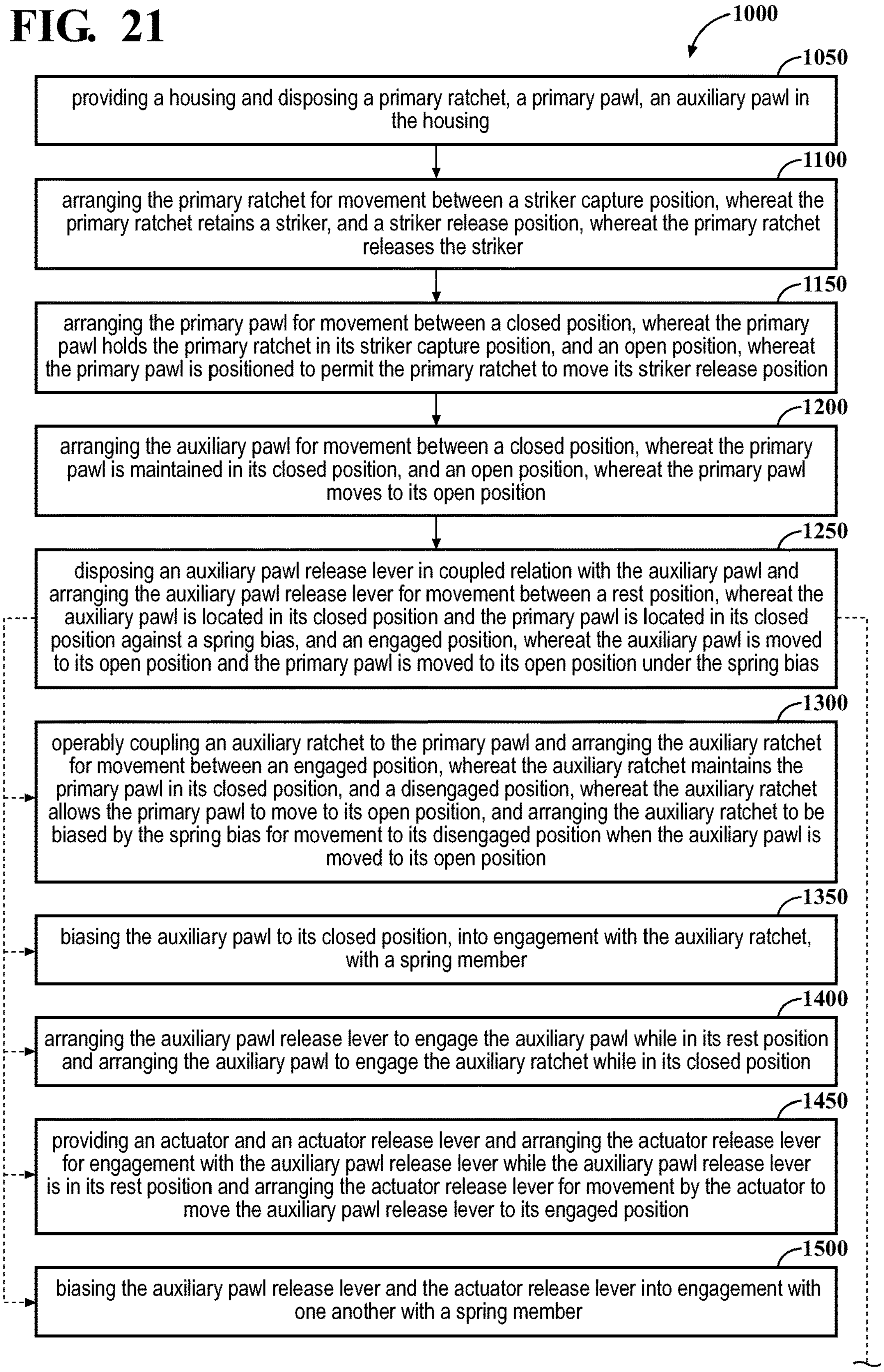
Figures 1, 21:
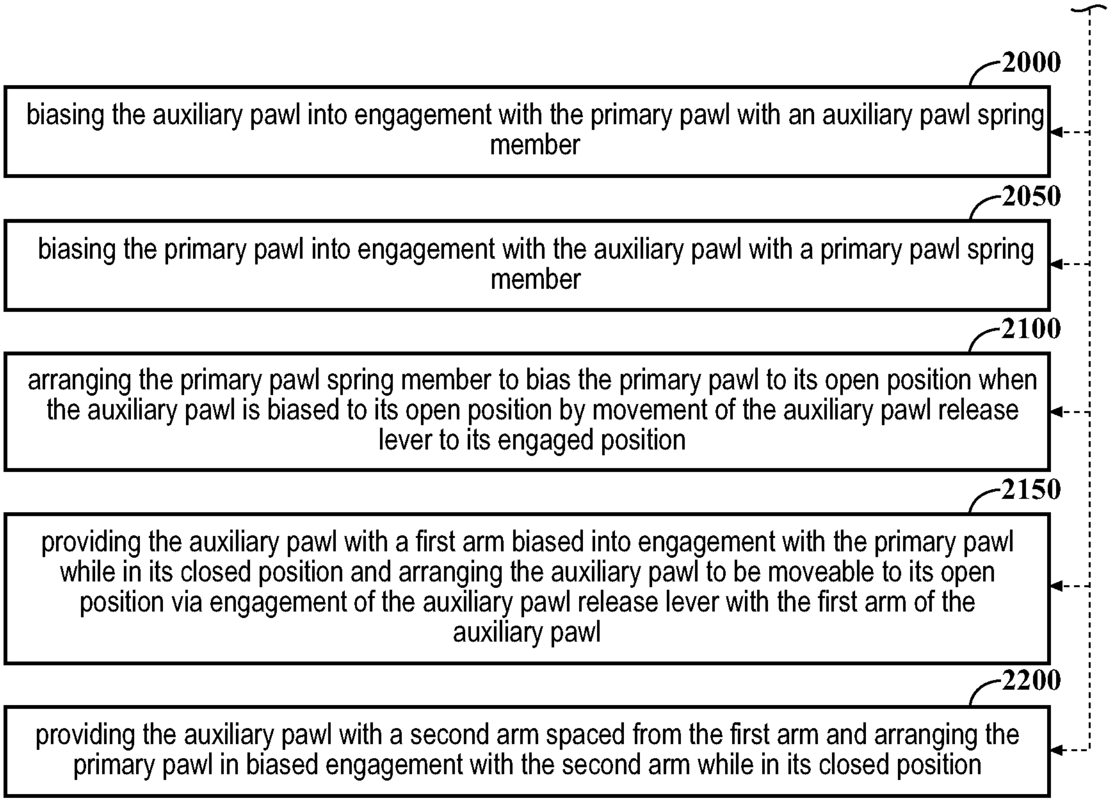

In accordance with another aspect of the disclosure, as shown in FIGS. 21 and 21-1, a method 1000 of constructing a closure latch assembly 10, 110 for installation in a vehicle door 12, 13 is provided. The method 1000 includes a step 1050 of providing a housing 29 and disposing a primary ratchet 32, 132, a primary pawl 36, 136, an auxiliary pawl 40, 140 in the housing 29. Further, a step 1100 of arranging the primary ratchet 32, 132 for movement between a striker capture position, whereat the primary ratchet 32, 132 retains a striker 18, and a striker release position, whereat the primary ratchet 32, 132 releases the striker 18. The method 1000 further includes a step 1150 of arranging the primary pawl 32, 132 for movement between a closed position, whereat the primary pawl 32, 132 holds the primary ratchet 32, 132 in its striker capture position, and an open position, whereat the primary pawl 32, 132 is positioned to permit the primary ratchet 32, 132 to move to its striker release position. Further, a step 1200 includes arranging the auxiliary pawl 40, 140 for movement between a rest, also referred to as closed position, whereat the primary pawl 32, 132 is maintained in its closed position, and an open position, whereat the primary pawl 32, 132 moves to its open position. Further yet, a step 1250 includes disposing an auxiliary pawl release lever 60, 160 in coupled relation with the auxiliary pawl 40, 140 and arranging the auxiliary pawl release lever 60, 160 for movement between a rest position, whereat the auxiliary pawl 40, 140 is located in its closed position and the primary pawl 32, 132 is located in its closed position against a spring bias, and an engaged position, whereat the auxiliary pawl 40, 140 is moved to its open position and the primary pawl 32, 132 is moved to its open position under the spring bias.

In accordance with a further aspect, the method 1000 can further include a step 1300 of operably coupling an auxiliary ratchet 38 to the primary pawl 36 and arranging the auxiliary ratchet 38 for movement between an engaged position, whereat the auxiliary ratchet 38 maintains the primary pawl 36 in its closed position, and a disengaged position, whereat the auxiliary ratchet 38 allows the primary pawl 36 to move to its open position, and arranging the auxiliary ratchet 38 for movement to its disengaged position when the auxiliary pawl 40 is moved to its open position.

In accordance with a further aspect, the method 1000 can further include a step 1350 of biasing the auxiliary pawl 40 to its closed position, into engagement with the auxiliary ratchet 38, with a spring member H.

In accordance with a further aspect, the method 1000 can further include a step 1400 of arranging the auxiliary pawl release lever 60 to engage the auxiliary pawl 40 while in its rest position and arranging the auxiliary pawl 40 to engage the auxiliary ratchet 38 while in its closed position.

In accordance with a further aspect, the method 1000 can further include a step 1450 of providing an actuator 41 and an actuator release lever 58 and arranging the actuator release lever 58 for engagement with the auxiliary pawl release lever 60 while the auxiliary pawl release lever 60 is in its rest position and arranging the actuator release lever 58 for movement by the actuator 41 to move the auxiliary pawl release lever 60 to its engaged position.

In accordance with a further aspect, the method 1000 can further include a step 1500 of biasing the auxiliary pawl release lever and the actuator release lever into engagement with one another with a spring member.

In accordance with a further aspect, as shown in FIG. 21-1, the method 1000 can further include a step 2000 of biasing the auxiliary pawl 140 into engagement with the primary pawl 136 with an auxiliary pawl spring member 80.

In accordance with a further aspect, the method can further include a step 2050 of biasing the primary pawl 136 into engagement with the auxiliary pawl 140 with a primary pawl spring member 82.

In accordance with a further aspect, the method 1000 can further include a step 2100 of arranging the primary pawl spring member 82 to bias the primary pawl 136 to its open position when the auxiliary pawl 140 is moved to its open position by movement of the auxiliary pawl release lever 160 to its engaged position.

In accordance with a further aspect, the method 1000 can further include a step 2150 of providing the auxiliary pawl 140 with a first arm 84 biased into engagement with the primary pawl 136 while in its closed position and arranging the auxiliary pawl 136 to be moveable to its open position via engagement of the auxiliary pawl release lever 160 with the first arm 84 of the auxiliary pawl 140.

In accordance with a further aspect, the method 1000 can further include a step 2200 of providing the auxiliary pawl 140 with a second arm 86 spaced from the first arm 84 and arranging the primary pawl 136 in biased engagement with the second arm 86 while in its closed position.

In accordance with a further aspect, the method 1000 can further include arranging the auxiliary pawl release lever 60, 160 to only engage the auxiliary pawl 40, 140 and not the primary pawl 36, 136.

In accordance with a further aspect, the method 1000 can further include arranging the auxiliary pawl 40, 140 to remain in constant engagement with the auxiliary pawl release lever 60, 160 to minimize play within the closure latch assembly 10, 110.

Figure 22:
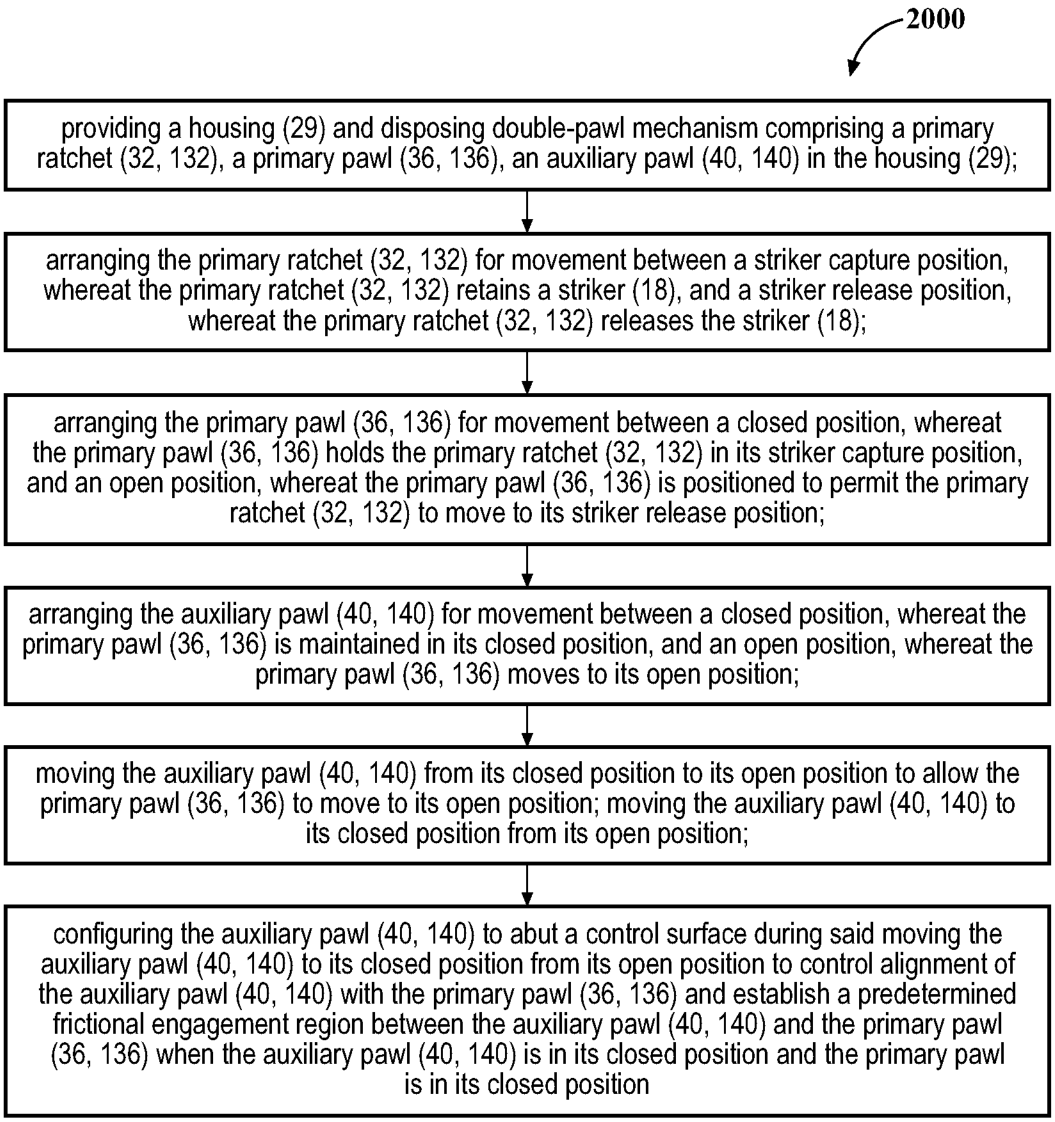
Figure 24:
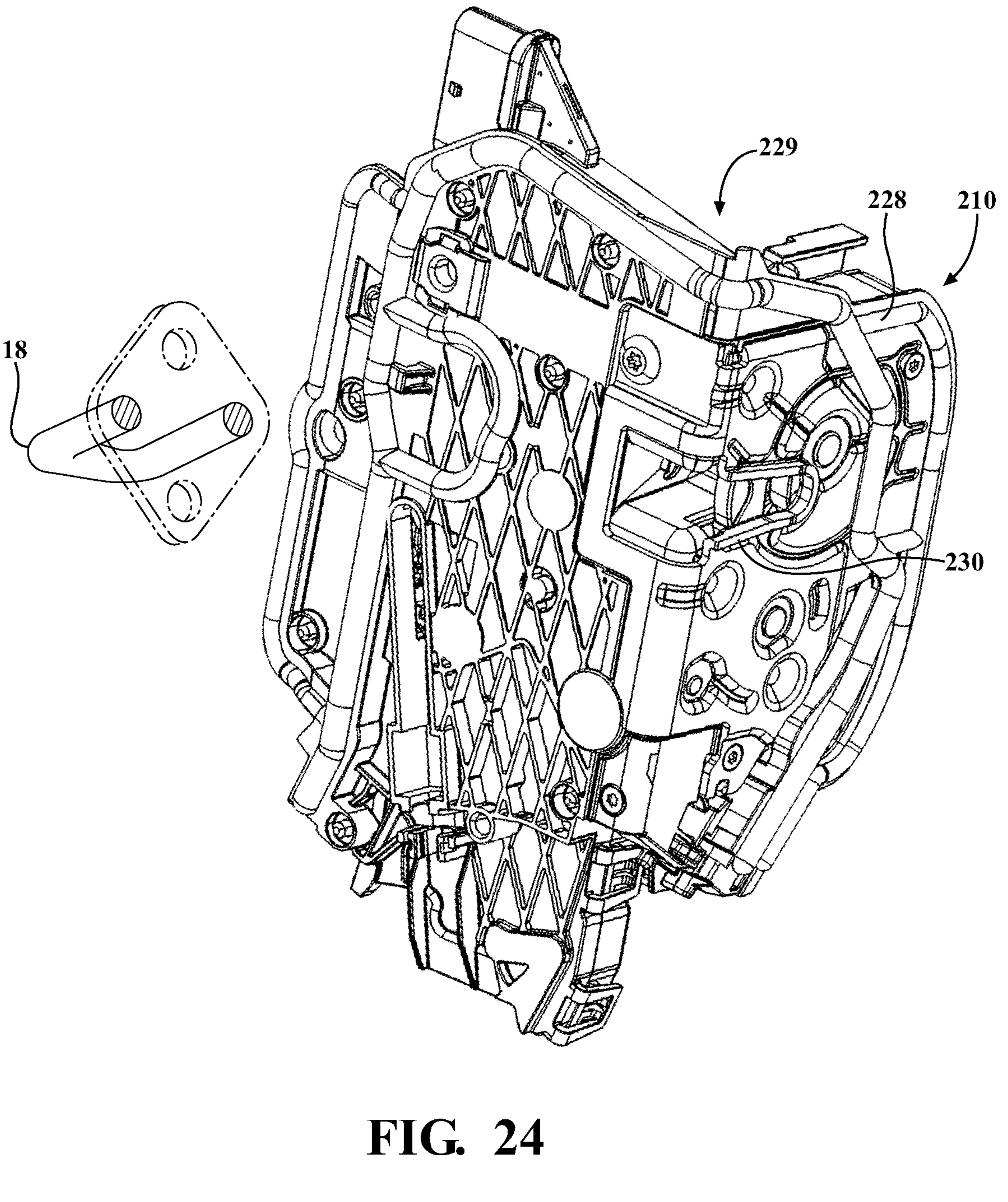
FIG. 24 is an isometric view of the closure latch assembly shown in FIG. 1 shown arranged for receipt of a striker therein.

Now referring to FIG. 22, there is illustrated a method 2000 of operating a double-pawl single ratchet mechanism for closure latch assembly 10, 110 for installation in a vehicle door 12, 13, including the steps of providing a housing 29 and disposing double-pawl mechanism comprising a primary ratchet 32, 132, a primary pawl 36, 136, an auxiliary pawl 40, 140 in the housing 29, arranging the primary ratchet 32, 132 for movement between a striker capture position, whereat the primary ratchet 32, 132 retains a striker 18, and a striker release position, whereat the primary ratchet 32, 132 releases the striker 18, arranging the primary pawl 36, 136 for movement between a closed position, whereat the primary pawl 36, 136 holds the primary ratchet 32, 132 in its striker capture position, and an open position, whereat the primary pawl 36, 136 is positioned to permit the primary ratchet 32, 132 to move to its striker release position; arranging the auxiliary pawl 40, 140 for movement between a closed position, whereat the primary pawl 36, 136 is maintained in its closed position, and an open position, whereat the primary pawl 36, 136 moves to its open position; moving the auxiliary pawl 40, 140 from its closed position to its open position to allow the primary pawl 36, 136 to move to its open position; moving the auxiliary pawl 40, 140 to its closed position from its open position; and configuring the auxiliary pawl 40, 140 to abut a control surface during said moving the auxiliary pawl 40, 140 to its closed position from its open position to control alignment of the auxiliary pawl 40, 140 with the primary pawl 36, 136 and establish a predetermined frictional engagement region between the auxiliary pawl 40, 140 and the primary pawl 36, 136 when the auxiliary pawl 40, 140 is in its closed position and the primary pawl is in its closed position.

Now referring to FIG. 23, there is provided a method 3000 of operating a double-pawl double-ratchet mechanism for closure latch assembly 10, 110 for installation in a vehicle door 12, 13, including the steps of providing a housing 29 and disposing double-pawl mechanism comprising a primary ratchet 32, 132, a primary pawl 36, 136, an auxiliary pawl 40, 140, and an auxiliary ratchet 38 in the housing 29, arranging the primary ratchet 32, 132 for movement between a striker capture position, whereat the primary ratchet 32, 132 retains a striker 18, and a striker release position, whereat the primary ratchet 32, 132 releases the striker 18, arranging the primary pawl 36, 136 for movement between a closed position, whereat the primary pawl 36, 136 holds the primary ratchet 32, 132 in its striker capture position, and an open position, whereat the primary pawl 36, 136 is positioned to permit the primary ratchet 32, 132 to move to its striker release position, arranging the auxiliary ratchet 38 operably coupled to the primary pawl 36 for movement between an engaged position, whereat the auxiliary ratchet 38 maintains the primary pawl 36 in its closed position, and a disengaged position, whereat the auxiliary ratchet 38 allows the primary pawl 36 to move to its open position, moving the auxiliary pawl 40, 140 from its closed position to its open position to allow the auxiliary ratchet 38 to move to the disengaged position, and the primary pawl 36, 136 to move to its open position; moving the auxiliary pawl 40, 140 to return to its closed position from its open position; and configuring the auxiliary pawl 40, 140 to abut a control surface during moving the auxiliary pawl 40, 140 to return to its closed position from its open position to control alignment of the auxiliary pawl 40, 140 with the primary pawl 36, 136 and establish a predetermined frictional engagement region between the auxiliary pawl 40, 140 and the primary pawl 36, 136 when the auxiliary pawl 40, 140 is in its closed position and the primary pawl is in its closed position.

Figure 26:
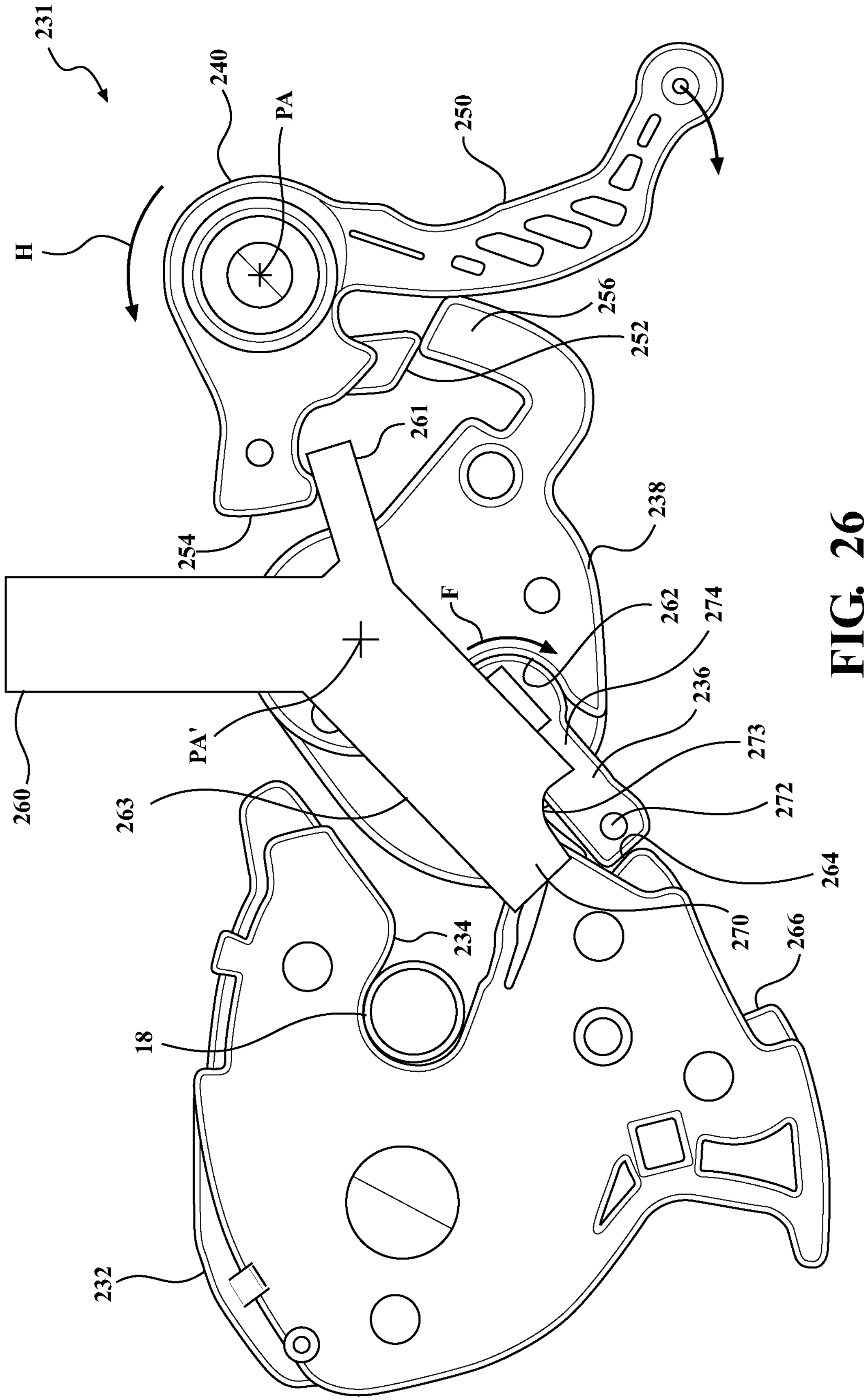
FIG. 26 is a rear-side plan view of the closure latch assembly shown in FIGS. 24-25B showing some of the internal components of the latch mechanism in the Latched mode.
Figure 27:
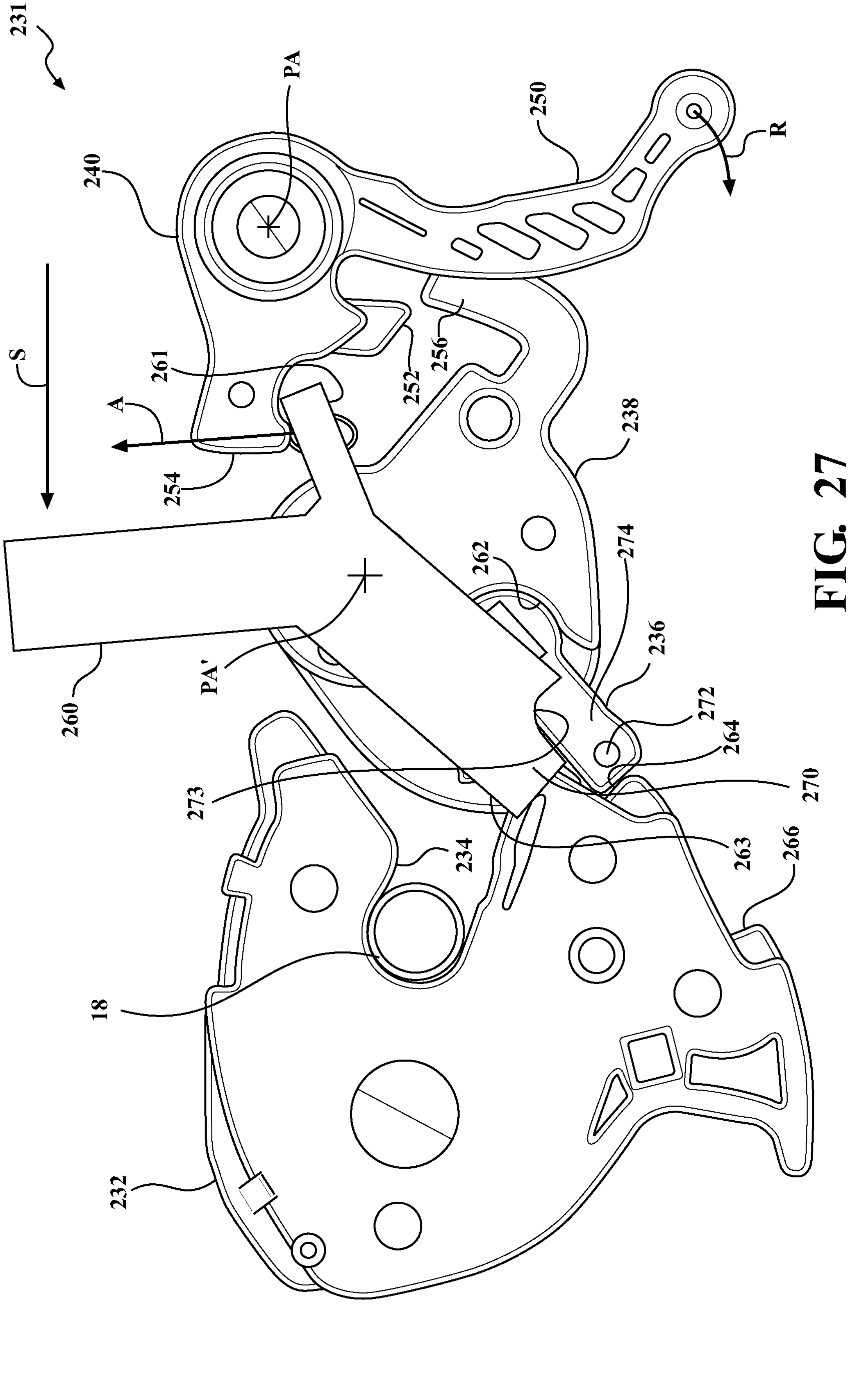
FIG. 27 is a view similar to FIG. 26 illustrating an auxiliary pawl of the latch mechanism being moved from a closed position toward an open position by an auxiliary pawl release leg of a latch release lever to initiate movement of the latch mechanism of the closure latch assembly from the Latched mode as shown in FIG. 26 to an Open mode with a lock lug segment of the auxiliary pawl being disengaged from a drive lug of an auxiliary ratchet.
Figure 28:
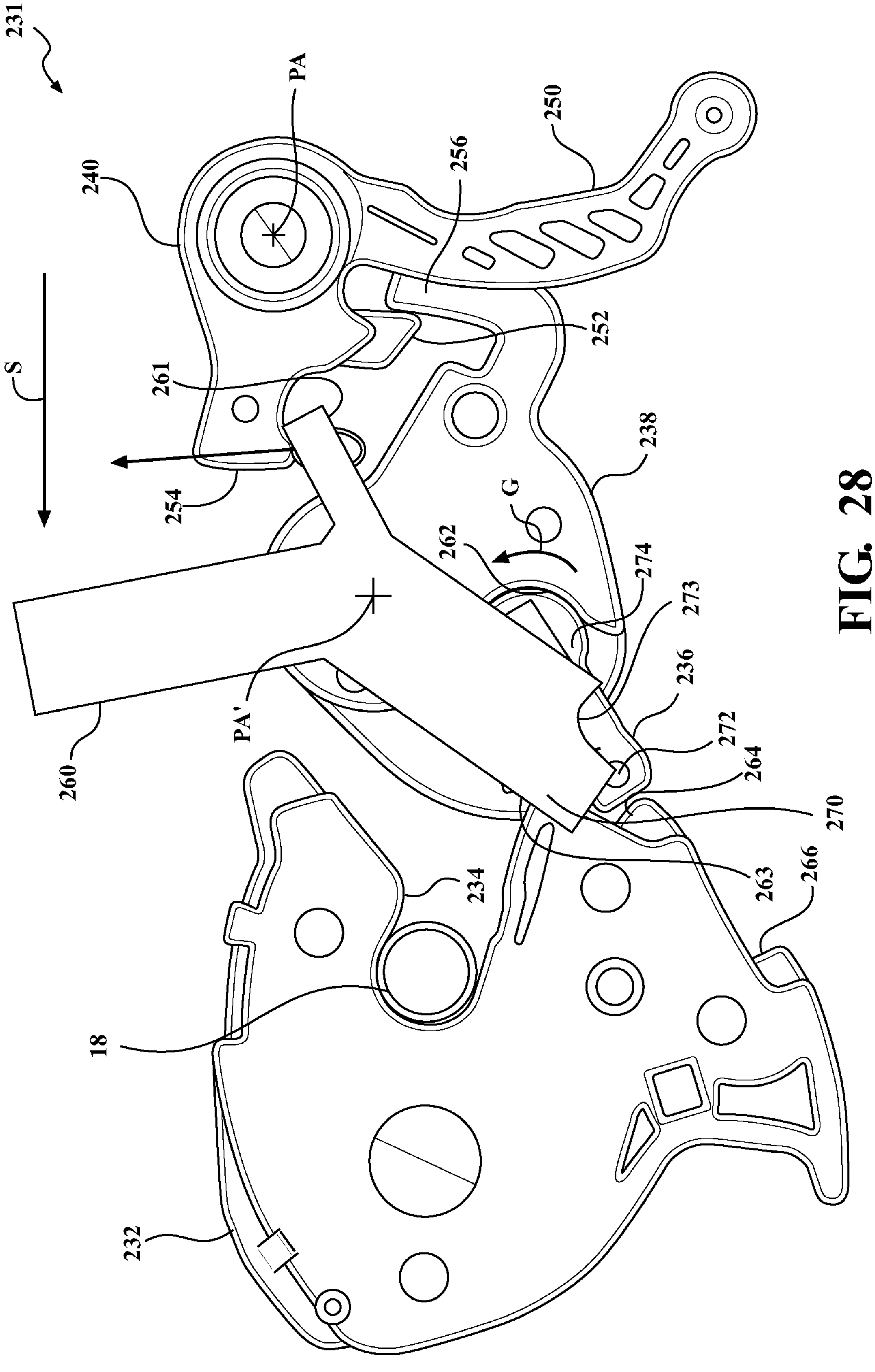
FIG. 28 is a view similar to FIG. 27 illustrating continued movement of the auxiliary pawl beyond the open position via engagement with the auxiliary pawl release leg with a drive member of a primary pawl interface leg of the latch release lever shown engaging a driven member of the primary pawl.
Figure 29:
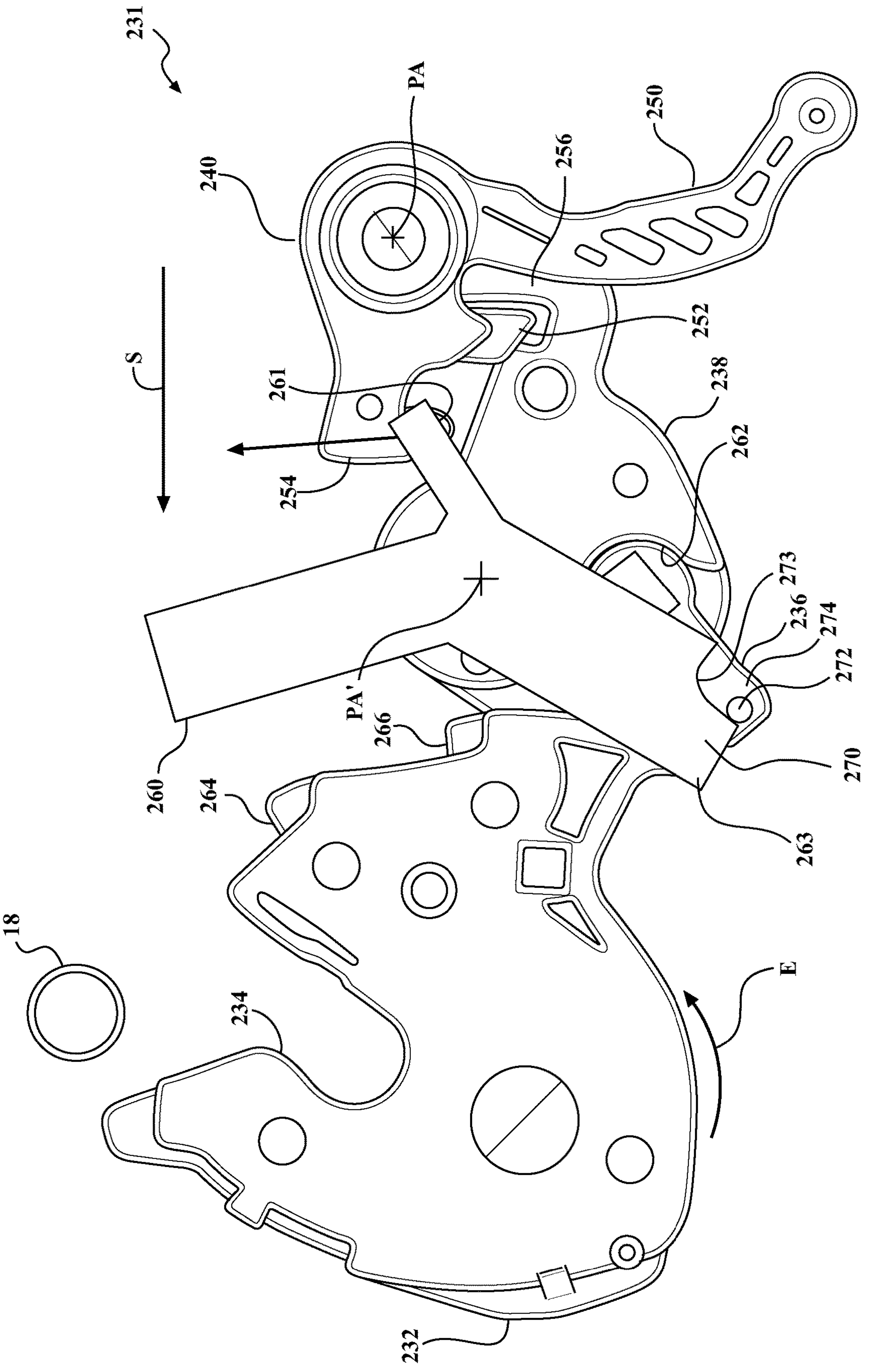
FIG. 29 is a view similar to FIG. 28 illustrating continued movement of the auxiliary pawl beyond the open position via engagement with the auxiliary pawl release leg with the drive member of the primary pawl interface leg shown forcibly driving the driven member of the primary pawl to move the primary pawl from a primary ratchet locking position to a primary ratchet release position with the internal components of the latch mechanism shown in the Open mode.

Referring now to FIGS. 24-29, a non-limiting example embodiment of closure latch assembly 210 and various internal components thereof is shown to generally include a latch mechanism 231 and a power latch release mechanism, referred to hereafter simply as latch release mechanism 233 (FIGS. 25A and 25B). Latch mechanism 231 is shown as a double pawl-double ratchet configuration, having a main ratchet, also referred to as primary ratchet 232, a main pawl, also referred to as primary pawl 236, a secondary ratchet, also referred to as auxiliary ratchet 238, and a secondary pawl, also referred to as auxiliary pawl 240. Primary ratchet 232 is mounted to a plate segment 228 (FIG. 24) of a latch housing 229 for pivotal movement thereon and has a ratchet slot 234 alignable with a fishmouth slot 230 formed in latch housing 229. Primary ratchet 232 is moveable between a primary closed or “striker capture” position (FIGS. 26-28) whereat striker 18 is held within fishmouth slot 230 by ratchet slot 234, and an open or “striker release” position (FIG. 29) whereat striker 18 is released from ratchet slot 234 and fishmouth slot 230. Primary ratchet 232 is biased by a primary ratchet spring 232' (FIGS. 25A and 25B) toward its striker release position, as indicated by arrow “E” (FIG. 29). Primary pawl 236 is carried by and supported by secondary ratchet 238 for pivotal movement between a secured or “closed” position (FIGS. 25A-27) whereat primary pawl 236 locates and holds primary ratchet 232 in its striker capture position, and an unsecured or “open” position (FIGS. 28 and 29) whereat primary pawl 236 is positioned to permit primary ratchet 232 to move to its striker release position. A primary pawl biasing spring 235 is operable to normally bias primary pawl 236 toward its open position, as indicated by arrow “F” in FIG. 26. Secondary ratchet 238 is mounted to plate segment 228 of latch housing 229 for pivotal movement between a first or “engaged” position (FIGS. 25A-27) whereat secondary ratchet 238 holds primary pawl 236 in its closed position and a second or “disengaged” position (FIGS. 28 and 29) whereat secondary ratchet 238 allows primary pawl 236 to be biased by spring member 235 to its open position. A secondary ratchet biasing member (such as a spring member, indicated by arrow “G”) is provided for normally biasing secondary ratchet 238 toward its disengaged position, as indicated in FIG. 28. Finally, secondary pawl 240 is mounted to plate segment 228 for pivotal movement about pivot axis PA between a first or “closed” position (FIGS. 25A-27), whereat secondary pawl 240 holds secondary ratchet 238 in its engaged position, and a second or “open” position (FIGS. 28 and 29) whereat secondary pawl 240 is positioned to permit secondary ratchet 238 to move under the bias of spring member G to its disengaged position. A secondary pawl biasing member, indicated by arrow “H” in FIG. 26, is provided for normally biasing secondary pawl 240 toward its closed position into engagement, or into a blocking positioning, with auxiliary ratchet 238 to releasably hold auxiliary ratchet 238 in its engaged position.

Secondary pawl 240 is shown to include a pivot segment 250, a lock lug segment 252, and an engagement segment 254. With secondary pawl 240 located in its closed position, lock lug segment 252 engages a drive lug 256 on secondary ratchet 238 and holds secondary ratchet 238 in its engaged position. In contrast, movement of secondary pawl 240 to its open position along a direction indicated by arrow “R” (FIG. 27), in a direction opposite to arrow “H”, functions to release its lock lug segment 252 from blocking engagement with drive lug 256 on secondary ratchet 238, thereby permitting secondary ratchet 238 to move automatically via bias imparted by spring member 235 to its disengaged position, under normal and intended circumstances, for example as caused by main pawl 236 being allowed to move in response to lock lug segment 252 disengagement from drive lug 256, the main pawl 236 is allowed to move due to rotation of ratchet 232 under the bias E of primary ratchet spring 232' acting on secondary ratchet 238 and/or door seal loads acting on secondary ratchet 238 imparted via striker 18, acting on main pawl 236 to rotate secondary ratchet 238 in a direction opposite arrow “G”.

Latch release mechanism 233 is best shown in FIGS. 25A and 25B to include an actuator, shown as an electric motor 241, shown as including a motor shaft with a worm gear WG fixed thereto, and a power release gear 243 driven by worm gear WG of electric motor 241 which functions to drive an actuator release lever 258, which in turn functions to drive or move a latch release lever 260 in the direction of arrow S (FIGS. 27-29, discussed in more detail hereafter), which in turn brings an auxiliary pawl release leg 261 of latch release lever 260 into forcible engagement with engagement segment 254 of secondary pawl 240, thereby moving secondary pawl 240 from its closed position to its open position to provide a power releasing function of latch mechanism 231. Rotation of power release gear 243 in a first or “releasing” direction results in release of latch mechanism 231 and rotation in an opposite or “resetting” direction results in resetting of latch mechanism 231. The actuator release lever 258 can be configured in engagement with the latch release lever 260 in a rest position and is moveable by the actuator 241 to move the latch release lever 260 as discussed above. As is well known, a key fob or actuation of a switch on door handle 25 on door 13 provides a signal to an ECU associated with closure latch assembly 210 indicating a request to release latch mechanism 231. Accordingly, the ECU controls operation of motor 241 to rotate power release gear 243.

Figure 44:
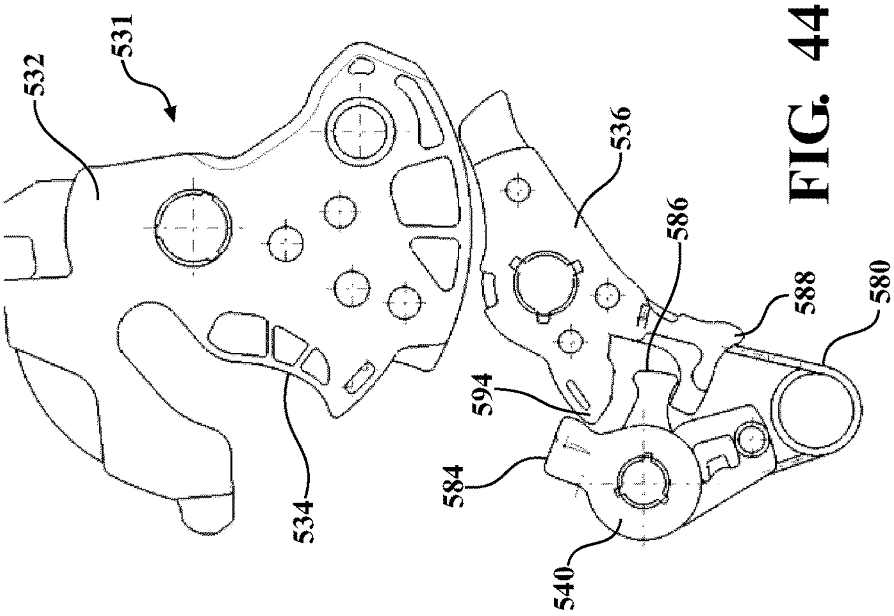
FIG. 44 is a side plan view illustrating the ratchet, primary pawl and auxiliary pawl as positioned at the final stage of power release of FIG. 43 with the primary pawl shown moved to a released position.
Figure 43:
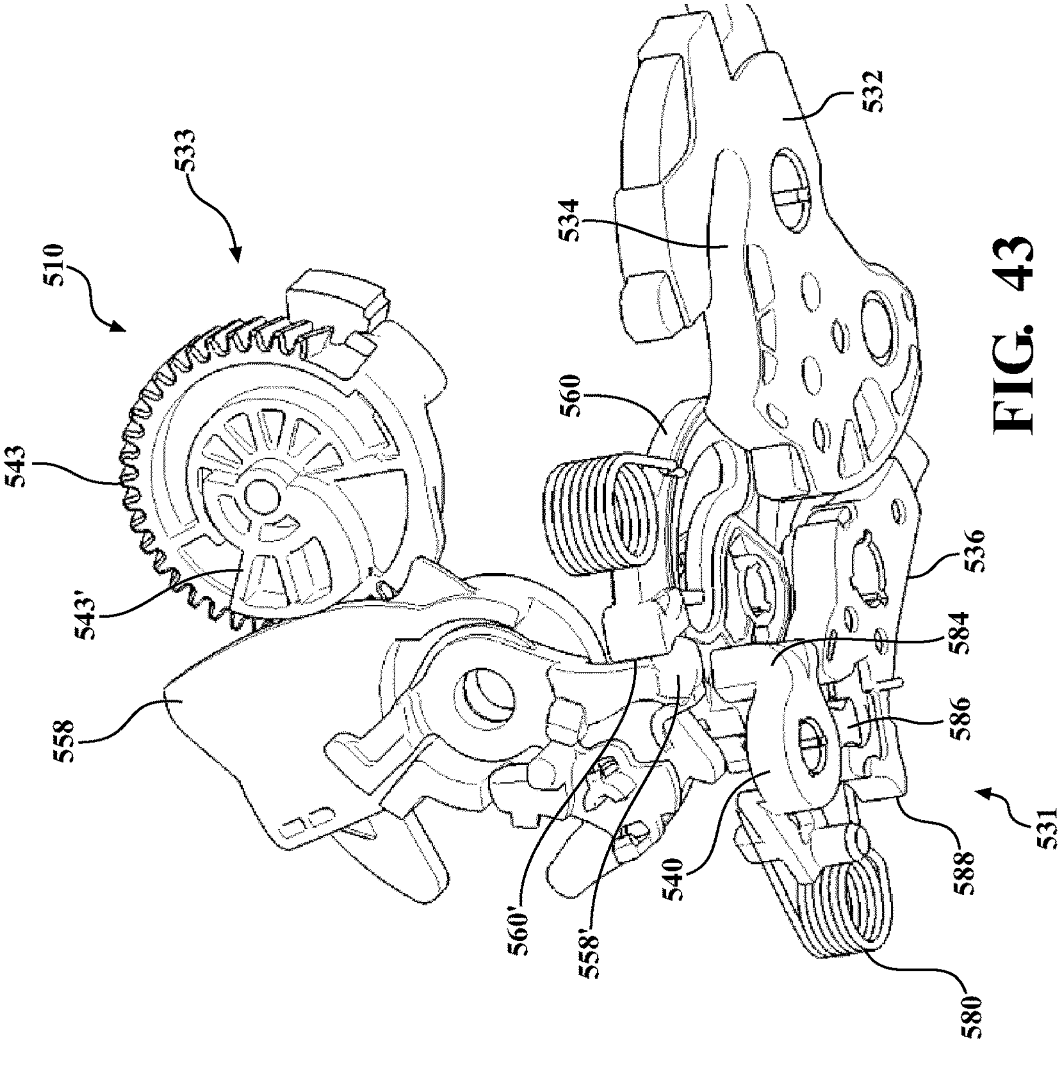
FIG. 43 is a view similar to FIG. 40 illustrating a final stage of the power release of the closure latch assembly of FIG. 34.
Figure 46:
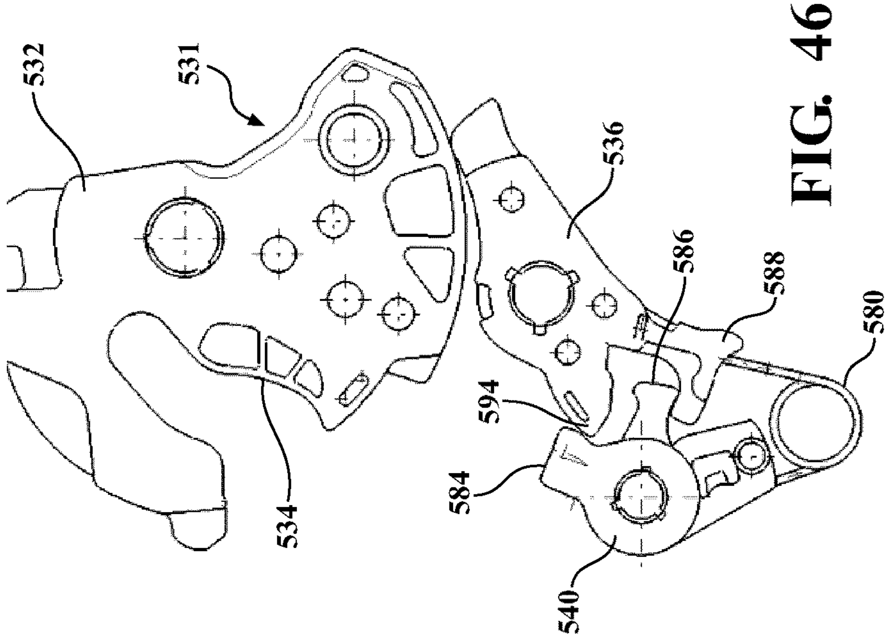
FIG. 46 is a side plan view illustrating the ratchet, primary pawl and auxiliary pawl as positioned at the power reset of FIG. 45.
Figure 45:
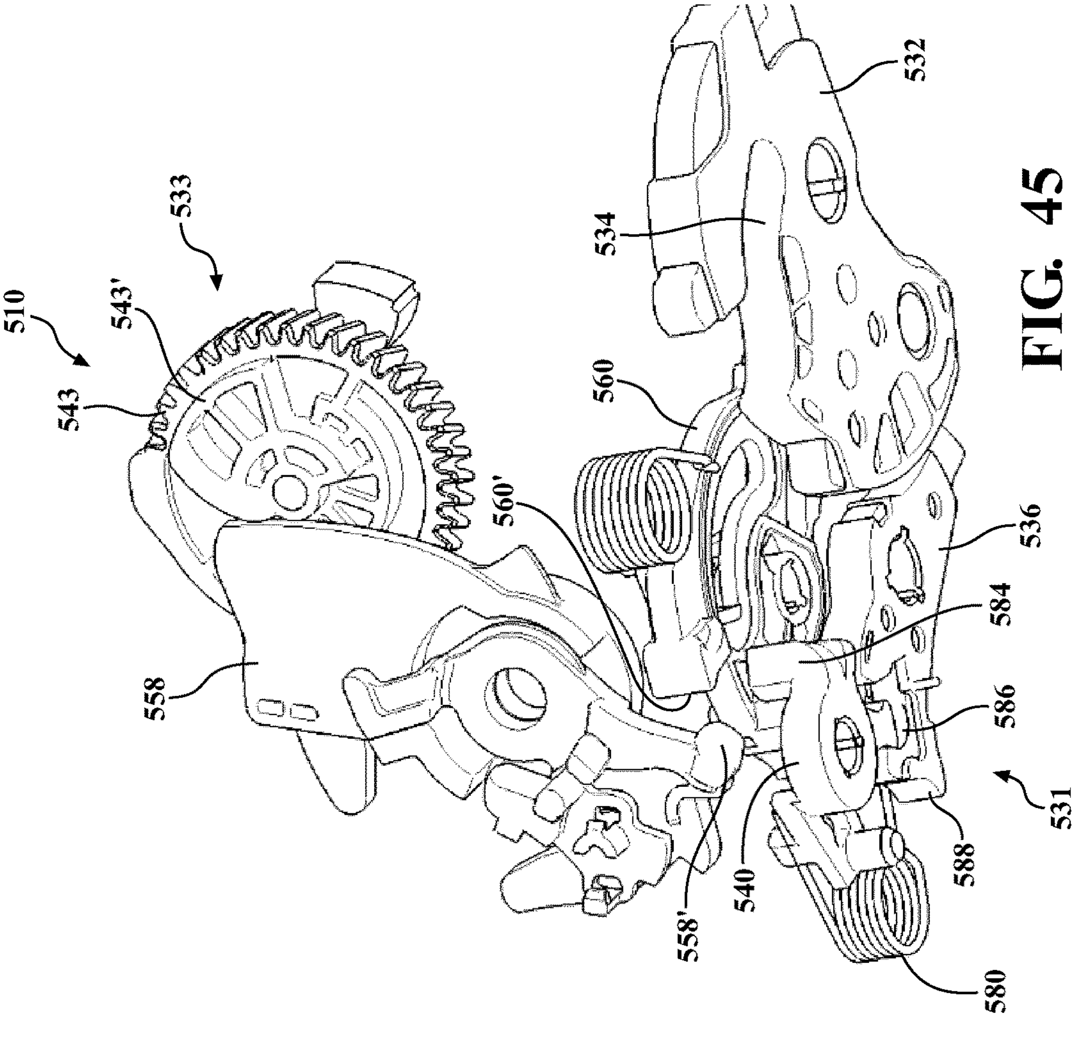
FIG. 45 is a view similar to FIG. 34 illustrating a power reset of the closure latch assembly after a power release of FIG. 43.

Latch release lever 260 is coupled with the auxiliary pawl 240, and is shown illustratively with auxiliary pawl release leg 261 as being biased into direct engagement (at contact point “X” of FIG. 26) with engagement segment 254 of auxiliary pawl 240 via counteracting biasing members. As shown in FIGS. 25A and 25B, latch release lever 260 is further biased, in addition to a bias imparted by spring member I, by the engagement of the actuator release lever 258 under bias indicated by arrow “J” of actuator release lever bias spring 259 (FIG. 25B). Latch release lever 260 is moveable, such as moveable over a first range of travel between a rest position (FIG. 26), whereat the auxiliary pawl 240 is located in an auxiliary ratchet locking position and the primary pawl 236 is located in its primary ratchet locking position, a first actuation position (FIG. 27), whereat the auxiliary pawl release leg 261 causes the auxiliary pawl 240 to move to its auxiliary ratchet release position, whereat the auxiliary ratchet 238 is ordinarily free to move to a primary pawl release position and the primary pawl 236 is ordinarily free to move to its primary ratchet release position, barring undue frictional forces, such as between primary pawl 236 and primary ratchet 232, by way of example and without limitation, and latch release lever 260 is further moveable past the first range of travel, such as moveable over a second range of travel to a second actuation position (FIG. 29), whereat an interface leg, referred to in this embodiment as a primary pawl interface leg 263, causes the primary pawl 236 to move to its primary ratchet release position during the second range of travel, regardless of any aforementioned undue frictional forces. Accordingly, closure latch assembly 210 is assured of being moved to its Open mode upon movement of the latch release lever 260 to the second actuation position, as discussed further below. Latch release lever 260 may be moveable only by a power release operation of the latch (e.g. an electric motor based actuation) over the first range of travel so as to only move the secondary pawl 240 without the latch release lever 260 contacting and moving the primary pawl 236. The latch release lever 260 may be only configured for contacting and moving the primary pawl 236 only when the latch is configured for a manual releasing operation (e.g. a non-motorized actuation of the latch release lever 260) in a manner similarly described herein with reference to FIG. 44 for example whereby the auxiliary pawl 540 is configured to contact and to move the primary pawl 536 only as a result of a manual releasing operation compared with the release lever 260 configured to contact and to move the primary pawl 236 as illustrated in FIG. 29 only during a manual operation as further described herein below. A power releasing operation based on a motor operation therefore cannot cause the latch release lever 260 to move to a position where the primary pawl 236 is contacted and moved, rather only the latch operating in a manual releasing operation (a non-motorized configuration) may cause the latch release lever 260 to move to a position where the primary pawl 236 is contacted and moved.

Auxiliary ratchet 238 is operably coupled to the primary pawl 236, wherein primary pawl 236 is shown retained and carried for pivot movement in a cylindrical pocket 262 of auxiliary ratchet 238. Auxiliary ratchet 238 is moveable between its engaged position, whereat the auxiliary ratchet 238 maintains the primary pawl 236 in its closed position, and its disengaged position, whereat the auxiliary ratchet 238 allows the primary pawl 236 to move to its open position, as discussed above. Auxiliary ratchet 238 is moved to its disengaged position under spring bias indicated by arrow G as the auxiliary pawl 240 is forcibly moved to its open position against the spring bias H under the driving influence of latch release lever 260 and actuator release lever 258, that is due to the driving influence of actuator release lever 258 moved against spring bias J and acting on latch release lever 260 when power release gear 243 is rotated to a release position.

In FIGS. 26-29, a sequence of releasing closure latch assembly 210 to its open position is shown, whereupon closure latch assembly 210 is reset to its closed position via disposing striker 18 into the primary ratchet striker capture position.

In FIG. 26, closure latch assembly 210 is shown in its Latched mode. As such, primary pawl 236 is in its closed, primary ratchet locking position to maintain primary ratchet 232 in it striker capture position. Further, latch release lever 260 is in its rest position, with auxiliary pawl 240 in its auxiliary ratchet locking position. Accordingly, lock lug segment 252 and drive lug 256 are in confronting, locked abutment with one another.

In FIG. 27, latch release mechanism 233 is shown in an initial stage of releasing closure latch assembly 210, wherein electric motor 241 is energized to drive power release gear 243, whereupon actuator release lever 258 is moved to cause concurrent movement of latch release lever 260 from its rest position to its first actuation position in engagement with auxiliary pawl 240. As shown in the first actuation position, auxiliary pawl release leg 261 engages an arm extension forming engagement segment 254 of auxiliary pawl 240, whereupon engagement segment 254 moves upwardly in the direction of arrow A such that auxiliary pawl 240 is pivoted in a clockwise direction about pivot axis PA of auxiliary pawl 240 against the bias H of biasing member. Lock lug segment 252 of auxiliary pawl 240 is pivotably moved out of engagement with a leg extension forming drive lug 256 of auxiliary ratchet 238. With lock lug segment 252 being displaced out of engagement from drive lug 256, or in other words with lock lug segment 252 being moved from a blocking relationship with drive lug 256 to an unblocking relationship with drive lug 256, auxiliary ratchet 238 is unblocked and disengaged from auxiliary pawl 240 via bias imparted by spring member G, and thus, auxiliary ratchet 238 is free to move under the urging of primary pawl 236 also now free to move under influence of rotation of ratchet 232 in a counterclockwise direction. As auxiliary ratchet 238 is pivoted counterclockwise, primary pawl 236 is allowed to rotate to thereby at least one of being pulled or being rolled from its primary locking position out of locking engagement with a primary locking notch 264 of primary ratchet 232 to allow primary ratchet 232 to move under the bias of biasing spring member 232' and/or seal loading pulling striker 18 in a counterclockwise direction to move to one of its partially open or fully open, striker release position, as shown in FIG. 29. It will be recognized that primary pawl 236 can be configured for receipt within a secondary locking notch 266 to locate primary ratchet 232 in the partially open position (not shown). However, in accordance with the disclosure, it is contemplated that primary pawl 236 may be inhibited from moving out of its primary ratchet locking position, thereby tending to be retained in primary locking notch 264. Such reasons for retention of primary pawl 236 in primary locking notch 264 can be attributed to undue friction, contamination, wear of components, or otherwise. Regardless of the source of inhibited removal of primary pawl 236 from primary locking notch 264, closure latch assembly 210, in accordance with a further aspect of the disclosure, is assured of moving from its Latched mode to its Open mode, when desired, as discussed hereafter.

In FIG. 28, electric motor 241 continues to be energized for continued driving of power release gear 243, whereupon actuator release lever 258 moves latch release lever 260 from its first actuation position to a second actuated position. During movement of the latch release lever 260 to its second actuation position (FIG. 29), primary pawl interface leg 263 of release lever 260 either operably (indirectly) or directly engages the primary pawl 236, if the primary pawl 236 remains in its primary ratchet locking position, to move the primary pawl 236 to its primary ratchet release position (FIG. 29). The rotational force imparted by primary pawl interface leg 263 on primary pawl 236 is sufficient to overcome any unintended force initially inhibiting primary pawl 236 from moving to its primary ratchet release position.

Auxiliary pawl release leg 261 and primary pawl interface leg 263 extend radially outwardly from pivot axis PA of the latch release lever 60 in spaced relation from one another, wherein auxiliary pawl release leg 261 and primary pawl interface leg 263 of latch release lever 260 are shown as extending from opposite sides of pivot axis PA away from one another. Primary pawl interface leg 263 has a drive member 270 and the primary pawl 236 has a driven member 272, wherein the drive member 270 engages the driven member 272 while the latch release lever 260 is located in the second actuation position to move the primary pawl 236 to the primary ratchet release position. With this, it is to be understood that primary pawl interface leg 263 is disengaged from the primary pawl 236 while the latch release lever 260 is located in the first actuation position, and thus, drive member 270 is spaced from the driven member 272 while the latch release lever 260 is located in the first actuation position. In the non-limiting embodiment illustrated, the driven member 272 is received in clearance relation within a recessed notch 273 of primary pawl interface leg 263, adjacent the drive member 270, while the latch release lever 260 is located in the first actuation position.

In the non-limiting embodiment illustrated, the driven member 272 extends laterally outwardly from a surface, shown as a planar side surface 274 of the primary pawl 236 in generally parallel relation with pivot axis PA of the primary pawl 236. The drive member 270 extends radially away from a pivot axis PA of the latch release lever 260 for engagement with the driven member 272 while the latch release lever 260 is located in the second actuation position.

Figure 30:
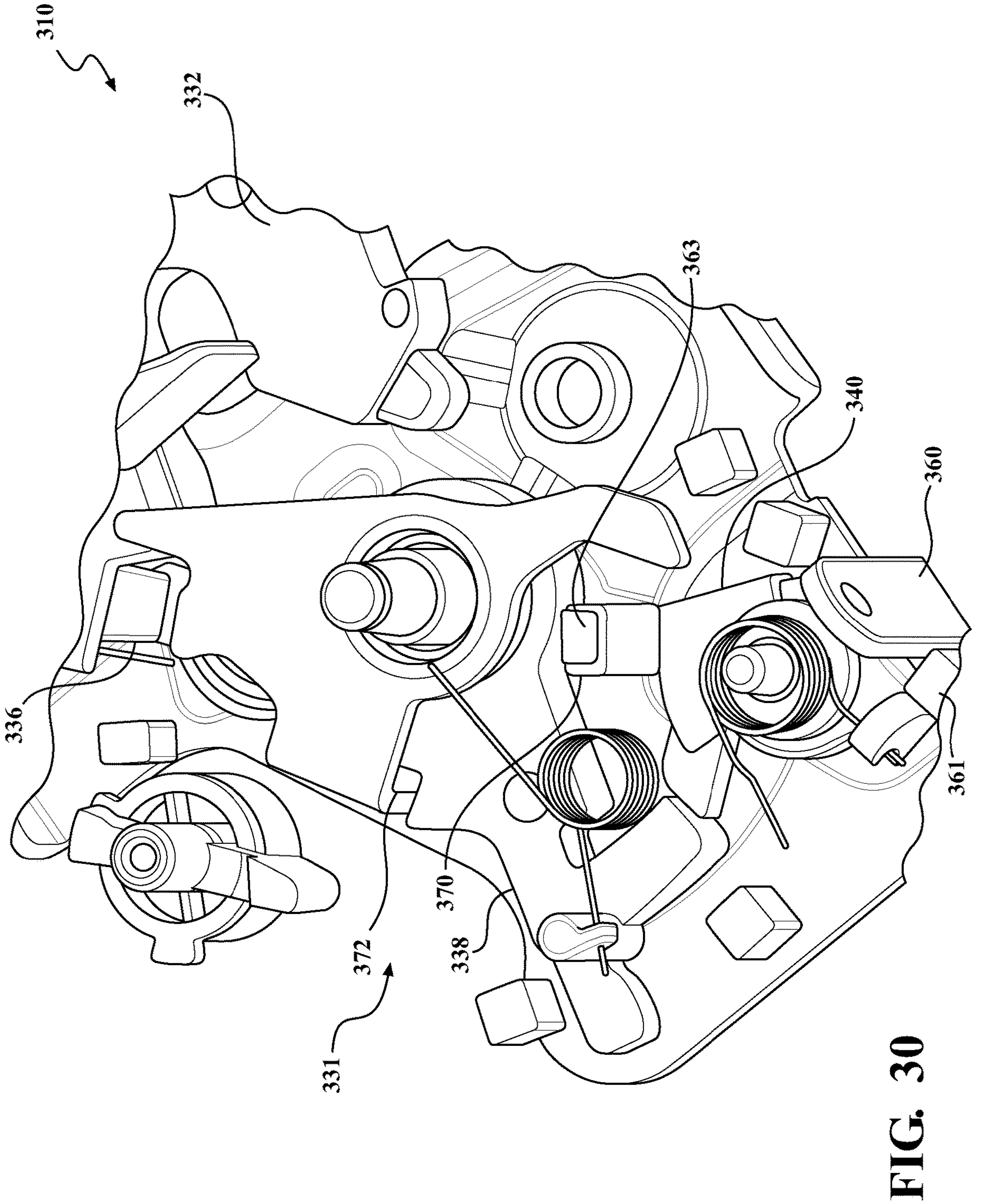
FIG. 30 is a fragmentary view of a closure latch assembly in accordance with another aspect of the disclosure.

FIG. 30 illustrates a portion of a closure latch assembly 310 constructed in accordance with another aspect of the disclosure, wherein the same reference numerals as used above, offset by a factor of 300, are used to identify like features.

Closure latch assembly 310 has a latch mechanism 331, shown as a double pawl-double ratchet configuration, having a main ratchet, also referred to as primary ratchet 332, a main pawl, also referred to as primary pawl 336, a secondary ratchet, also referred to as auxiliary ratchet 338, and a secondary pawl, also referred to as auxiliary pawl 340. A latch release lever 360 is moveable between a rest position, whereat the auxiliary pawl 340 is located in an auxiliary ratchet locking position and the primary pawl 336 is located in its primary ratchet locking position, a first actuation position, whereat the auxiliary pawl release leg 361 causes the auxiliary pawl 340 to move to its auxiliary ratchet release position, whereat the auxiliary ratchet 338 is ordinarily free to move to a primary pawl release position and the primary pawl 336 is ordinarily free to move to its primary ratchet release position, barring undue frictional forces, such as between primary pawl 336 and primary ratchet 332, by way of example and without limitation, and a second actuation position, whereat an interface leg of auxiliary pawl 340, referred to in this embodiment as an auxiliary ratchet interface leg 363, shown as being formed as a monolithic piece of material with the auxiliary pawl 340, operably engages auxiliary ratchet 338 to forcibly urge rotation of auxiliary ratchet 338 in a release direction, thereby causing the primary pawl 336 to move to its primary ratchet release position, regardless of any aforementioned undue frictional forces. The interface leg 363 has a drive member 370 and the auxiliary ratchet 338 has a driven member 372, whereat the drive member 370 engages, either operably or directly, the driven member 372 while the latch release lever 360 is located in the second actuation position to move the auxiliary ratchet 338 from an engaged position, whereat the auxiliary ratchet 338 maintains the primary pawl 336 in its closed position, to a disengaged position, whereat the auxiliary ratchet 338 allows the primary pawl 336 to move to its primary ratchet release position, and whereat the drive member 370 is spaced from the driven member 372 while the latch release lever 360 is located in the first actuation position. Accordingly, closure latch assembly 310 is assured of being moved to its Open mode upon movement of the latch release lever 360 to the second actuation position.

Figure 31:
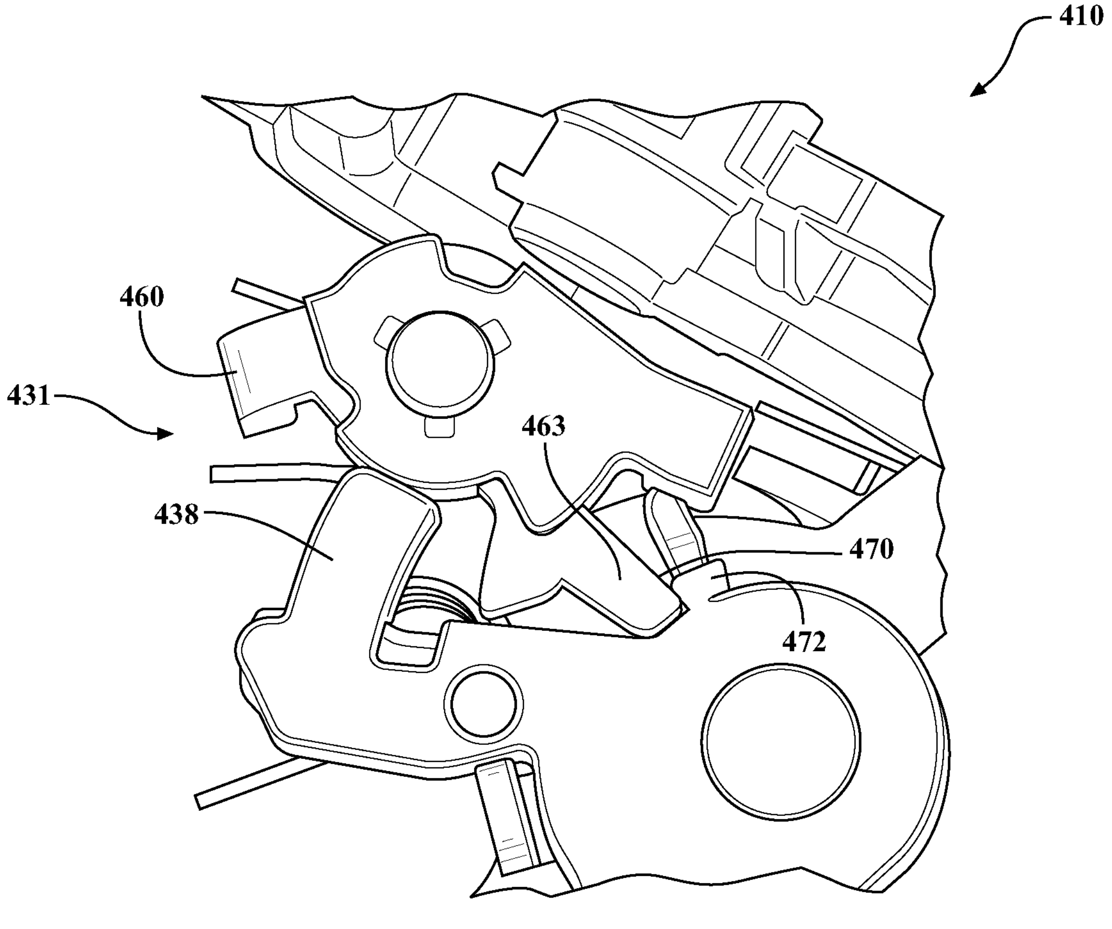
FIG. 31 is a fragmentary view of a closure latch assembly in accordance with yet another aspect of the disclosure.

FIG. 31 illustrates a portion of a closure latch assembly 410 constructed in accordance with another aspect of the disclosure, wherein the same reference numerals as used above, offset by a factor of 400, are used to identify like features.

Closure latch assembly 410 has a latch mechanism 431, shown as a double pawl-double ratchet configuration, having a main ratchet, also referred to as primary ratchet, a main pawl, also referred to as primary pawl, a secondary ratchet, also referred to as auxiliary ratchet 438, and a secondary pawl, also referred to as auxiliary pawl. A latch release lever 460 is moveable between a rest position, whereat the auxiliary pawl is located in an auxiliary ratchet locking position and the primary pawl is located in its primary ratchet locking position, a first actuation position, whereat the auxiliary pawl release leg causes the auxiliary pawl to move to its auxiliary ratchet release position, whereat the auxiliary ratchet 438 is ordinarily free to move to a primary pawl release position and the primary pawl is ordinarily free to move to its primary ratchet release position, barring undue frictional forces, such as between primary pawl and primary ratchet, by way of example and without limitation, and a second actuation position, whereat an interface leg, referred to in this embodiment as an auxiliary ratchet interface leg 463, shown as being formed as a monolithic piece of material with the latch release lever 460, directly engages auxiliary ratchet 438 to forcibly urge rotation of auxiliary ratchet 438 in a release direction, thereby causing the primary pawl to move to its primary ratchet release position, regardless of any aforementioned undue frictional forces. The interface leg 463 has a drive member 470 and the auxiliary ratchet 438 has a driven member 472, whereat the drive member 470 engages the driven member 472 while the latch release lever 460 is located in the second actuation position to move the auxiliary ratchet 438 from an engaged position, whereat the auxiliary ratchet 438 maintains the primary pawl in its closed position, to a disengaged position, whereat the auxiliary ratchet 438 allows the primary pawl to move to its primary ratchet release position, and whereat the drive member 470 is spaced from the driven member 472 while the latch release lever 460 is located in the first actuation position. Accordingly, closure latch assembly 410 is assured of being moved to its Open mode upon movement of the latch release lever 460 to the second actuation position.

Closure latch assembly 410 has a latch mechanism 431, shown as a double pawl-double ratchet configuration, having a main ratchet, also referred to as primary ratchet, a main pawl, also referred to as primary pawl, a secondary ratchet, also referred to as auxiliary ratchet 438, and a secondary pawl, also referred to as auxiliary pawl. A latch release lever 460 is moveable between a rest position, whereat the auxiliary pawl is located in an auxiliary ratchet locking position and the primary pawl is located in its primary ratchet locking position, a first actuation position, whereat the auxiliary pawl release leg causes the auxiliary pawl to move to its auxiliary ratchet release position, whereat the auxiliary ratchet 438 is ordinarily free to move to a primary pawl release position and the primary pawl is ordinarily free to move to its primary ratchet release position, barring undue frictional forces, such as between primary pawl and primary ratchet, by way of example and without limitation, and a second actuation position, whereat an interface leg, referred to in this embodiment as an auxiliary ratchet interface leg 463, shown as being formed as a monolithic piece of material with the latch release lever 460, directly engages auxiliary ratchet 438 to forcibly urge rotation of auxiliary ratchet 438 in a release direction, thereby causing the primary pawl to move to its primary ratchet release position, regardless of any aforementioned undue frictional forces. The interface leg 463 has a drive member 470 and the auxiliary ratchet 438 has a driven member 472, whereat the drive member 470 engages the driven member 472 while the latch release lever 460 is located in the second actuation position to move the auxiliary ratchet 438 from an engaged position, whereat the auxiliary ratchet 438 maintains the primary pawl in its closed position, to a disengaged position, whereat the auxiliary ratchet 438 allows the primary pawl to move to its primary ratchet release position, and whereat the drive member 470 is spaced from the driven member 472 while the latch release lever 460 is located in the first actuation position. Accordingly, closure latch assembly 410 is assured of being moved to its Open mode upon movement of the latch release lever 460 to the second actuation position.

Figure 32:
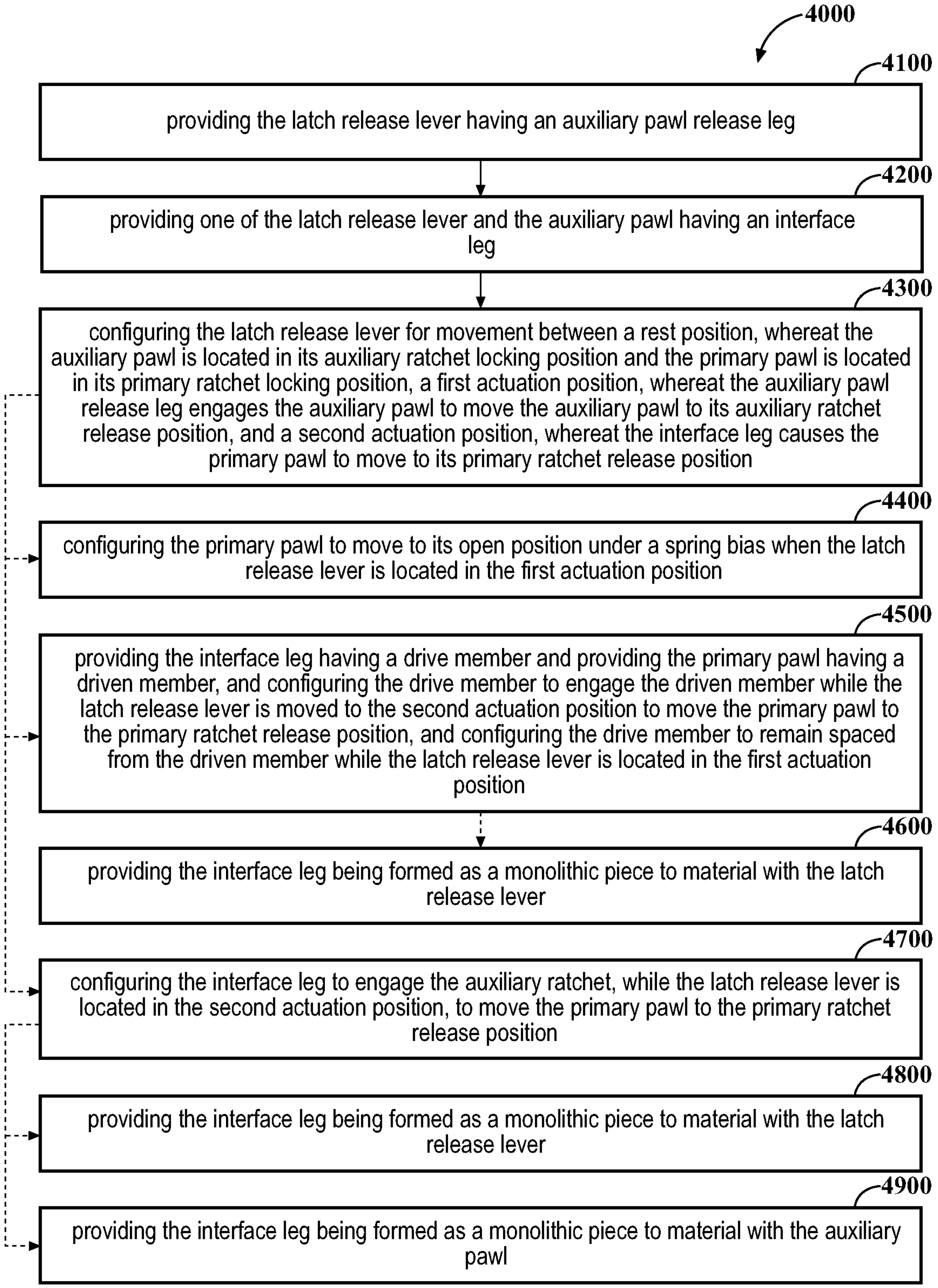
FIG. 32 is a flow diagram for a method of causing a closure latch assembly, having latch release lever, a primary ratchet, a primary pawl, an auxiliary ratchet, and an auxiliary pawl, of a vehicle closure panel to move from a Latched mode to an Open mode.

In accordance with another aspect of the disclosure, as shown in FIG. 32, a method 4000 of causing a closure latch assembly 210, 310, 410 having latch release lever 260, 360, 460, a primary ratchet 232, 332, a primary pawl 236, 336, an auxiliary ratchet 238, 338, 438, and an auxiliary pawl 240, 340, of a vehicle closure panel to move from a Latched mode to an Open mode is provided. The method 4000 includes a step 4100 of providing the latch release lever 260, 360, 460 having an auxiliary pawl release leg 261, 361. The method further includes a step 4200 of providing one of the latch release lever 260, 460 and the auxiliary pawl 240, 340 having an interface leg 263, 363, 463. The method 4000 further includes a step 4300 of configuring the latch release lever 260, 360, 460 for movement between a rest position, whereat the auxiliary pawl 240, 340 is located in its auxiliary ratchet locking position and the primary pawl 236, 336 is located in its primary ratchet locking position, a first actuation position, whereat the auxiliary pawl release leg 261, 361 causes the auxiliary pawl 240, 340 to move to its auxiliary ratchet release position, and a second actuation position, whereat the interface leg 263, 363, 463 causes the primary pawl 236, 336 to move to its primary ratchet release position.

The method 4000 can further include a step 4400 of configuring the primary pawl 236, 336 to move to its open position under a spring bias when the latch release lever 260 is located in the first actuation position.

The method 4000 can further include configuring the interface leg 263 to engage the primary pawl 236 while the latch release lever 260 is located in the second actuation position to move the primary pawl 236 to the primary ratchet release position.

The method 4000 can further include configuring the interface leg 263 to remain disengaged from the primary pawl 236 while the latch release lever 260 is located in the first actuation position.

The method 4000 can further include a step 4500 of providing the interface leg 263 having a drive member 270 and providing the primary pawl 236 having a driven member 272, and configuring the drive member 270 to engage the driven member 272 while the latch release lever 260 is located in the second actuation position to move the primary pawl 236 to the primary ratchet release position, and configuring the drive member 270 to remain spaced from the driven member 272 while the latch release lever 260 is located in the first actuation position.

The method 4000 can further include a step 4600 of providing the interface leg 263 being formed as a monolithic piece of material with the latch release lever 260.

The method 4000 can further include a step 4700 of configuring the interface leg 363, 463 to engage the auxiliary ratchet 338, 438, while the latch release lever 360, 460 is located in the second actuation position, to move the primary pawl 336 to the primary ratchet release position, and can further include a step 4800 of providing the interface leg 463 being formed as a monolithic piece of material with the latch release lever 460, or a step 4900 of providing the interface leg 363 being formed as a monolithic piece of material with the auxiliary pawl 340.

Figure 33:
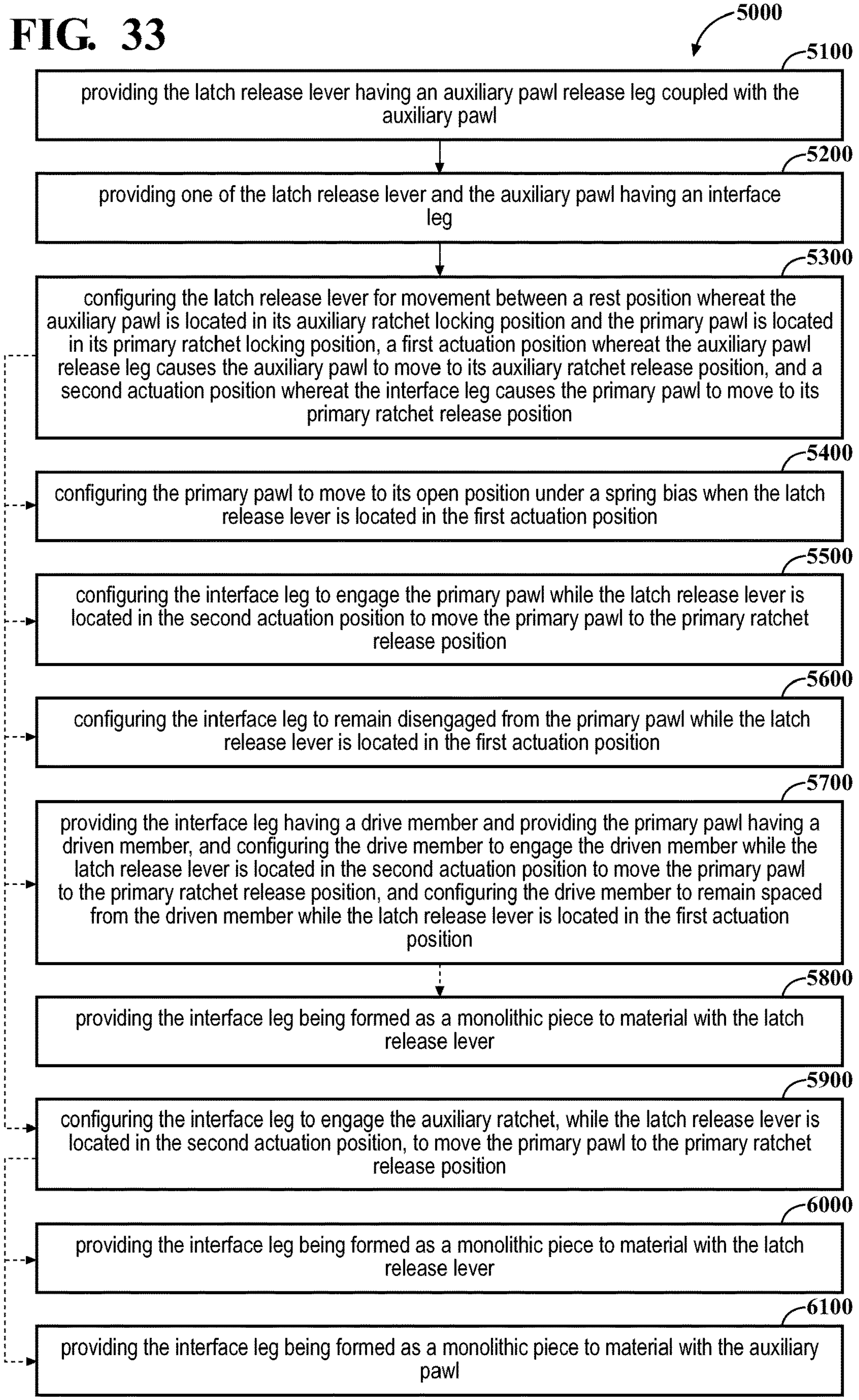
FIG. 33 is a flow diagram for a method constructing a closure latch assembly, having latch release lever, a primary ratchet, a primary pawl, an auxiliary ratchet, and an auxiliary pawl, for a vehicle closure panel.

In accordance with another aspect of the disclosure, as shown in FIG. 33, a method 5000 of constructing a closure latch assembly 210, 310, 410 having latch release lever 260, 360, 460, a primary ratchet 232, 332, a primary pawl 236, 336, an auxiliary ratchet 238, 338, 438, and an auxiliary pawl 240, 340, fora vehicle closure panel 12, 13, is provided. The method 5000 includes a step S100 of providing the latch release lever 260, 360, 460 having an auxiliary pawl release leg 261, 361 coupled with the auxiliary pawl 240, 340. The method 5000 further includes a step S200 of providing one of the latch release lever 260, 460 and the auxiliary pawl 240, 340 having an interface leg 263, 363, 463. The method 5000 further includes a step S300 of configuring the latch release lever 260, 360, 460 for movement between a rest position, whereat the auxiliary pawl 240, 340 is located in its auxiliary ratchet locking position and the primary pawl 236, 336 is located in its primary ratchet locking position, a first actuation position, whereat the auxiliary pawl release leg 261, 361 engages the auxiliary pawl 240, 340 to move the auxiliary pawl 240, 340 to its auxiliary ratchet release position, while the interface leg 263, 363 remains spaced from the primary pawl 236, 336, and a second actuation position, whereat the interface leg 263, 363, 463 causes the primary pawl 236, 336 to move to its primary ratchet release position.

The method 5000 can further include a step S400 of configuring the primary pawl 236, 336 to move to its open position under a spring bias when the latch release lever 260, 360, 460 is located in the first actuation position.

The method 5000 can further include a step S500 of configuring the interface leg 263 to engage the primary pawl 236 while the latch release lever 260 is located in the second actuation position to move the primary pawl 236 to the primary ratchet release position.

The method 5000 can further include a step S600 of configuring the interface leg 263 to remain disengaged from the primary pawl 236 while the latch release lever 260 is located in the first actuation position.

The method 5000 can further include a step S700 of providing the interface leg 263 having a drive member 270 and providing the primary pawl 236 having a driven member 272, and configuring the drive member 270 to engage the driven member 272 while the latch release lever 260 is moved to the second actuation position to move the primary pawl 236 to the primary ratchet release position, and configuring the drive member 270 to remain spaced from the driven member 272 while the latch release lever 260 is located in the first actuation position.

The method 5000 can further include a step S800 of providing the interface leg 263 being formed as a monolithic piece of material with the latch release lever 260.

The method 5000 can further include a step S900 of configuring the interface leg 363, 463 to engage the auxiliary ratchet 338, 438 while the latch release lever 360, 460 is located in the second actuation position, to move the primary pawl 336 to the primary ratchet release position.

The method 5000 can further include a step 6000 of providing the interface leg 463 being formed as a monolithic piece of material with the latch release lever 460.

The method 5000 can further include a step 6100 of providing the interface leg 363 being formed as a monolithic piece of material with the auxiliary pawl 340.

Figure 34:
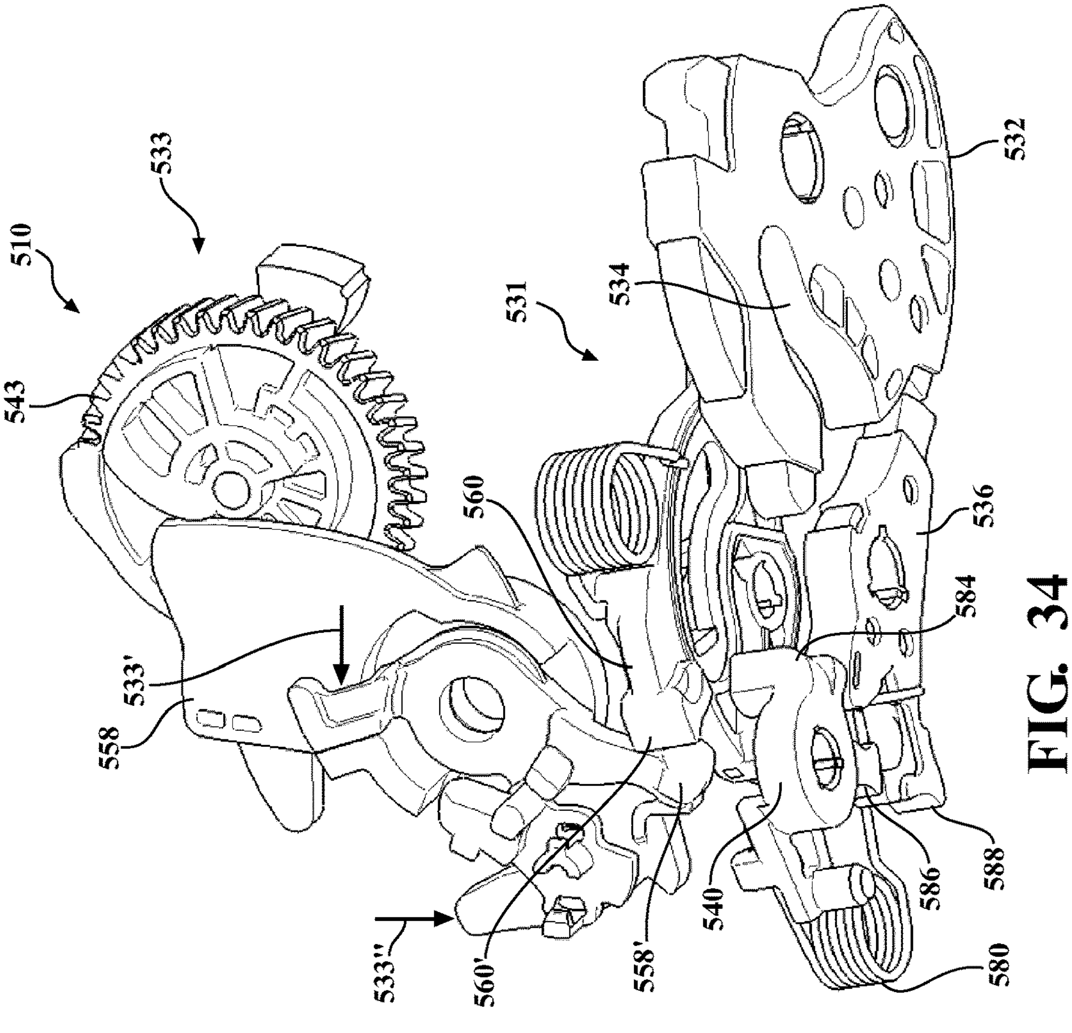
FIG. 34 is a perspective view of a closure latch assembly in accordance with yet another aspect of the disclosure shown with a cover removed, such as a cover of FIGS. 2 and 24, illustrating internal components of a latch mechanism the closure latch assembly.
Figure 35:
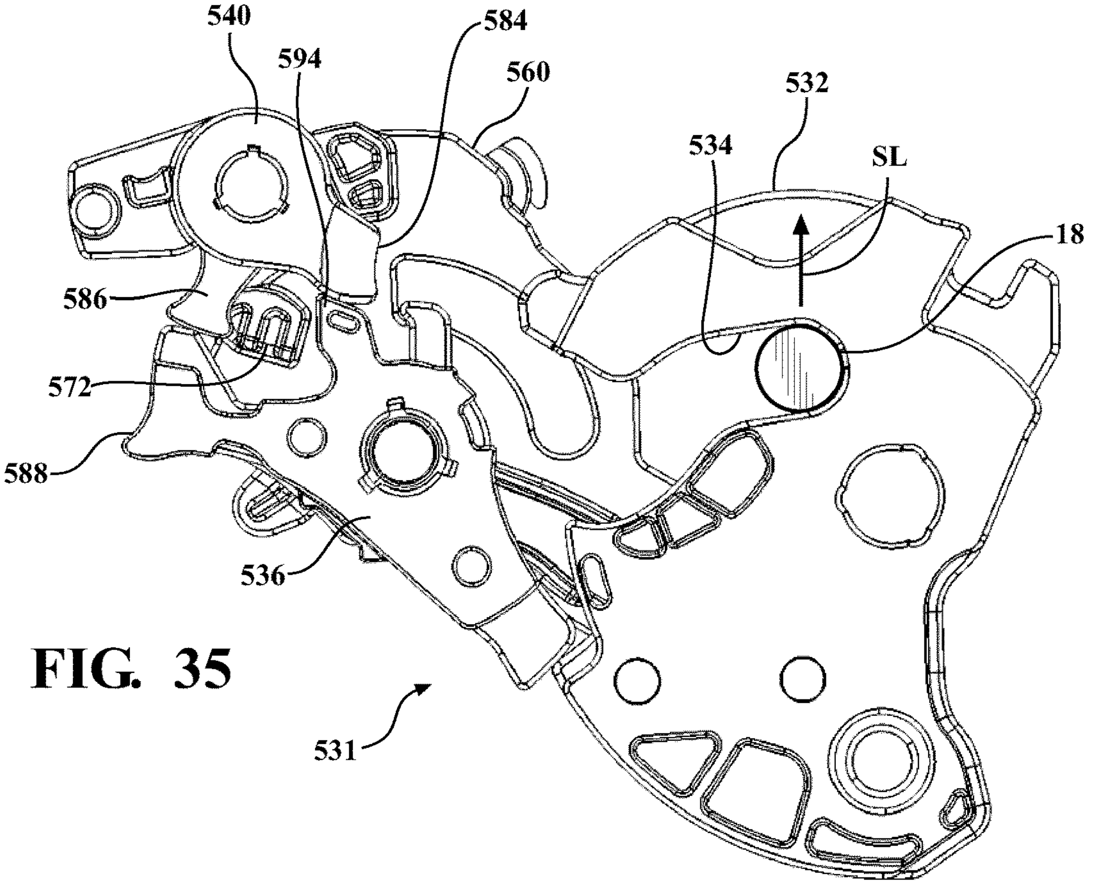
FIG. 35 is a side plan view of the closure latch assembly of FIG. 34 showing some of the internal components of the latch mechanism in the Latched mode.
Figure 36:
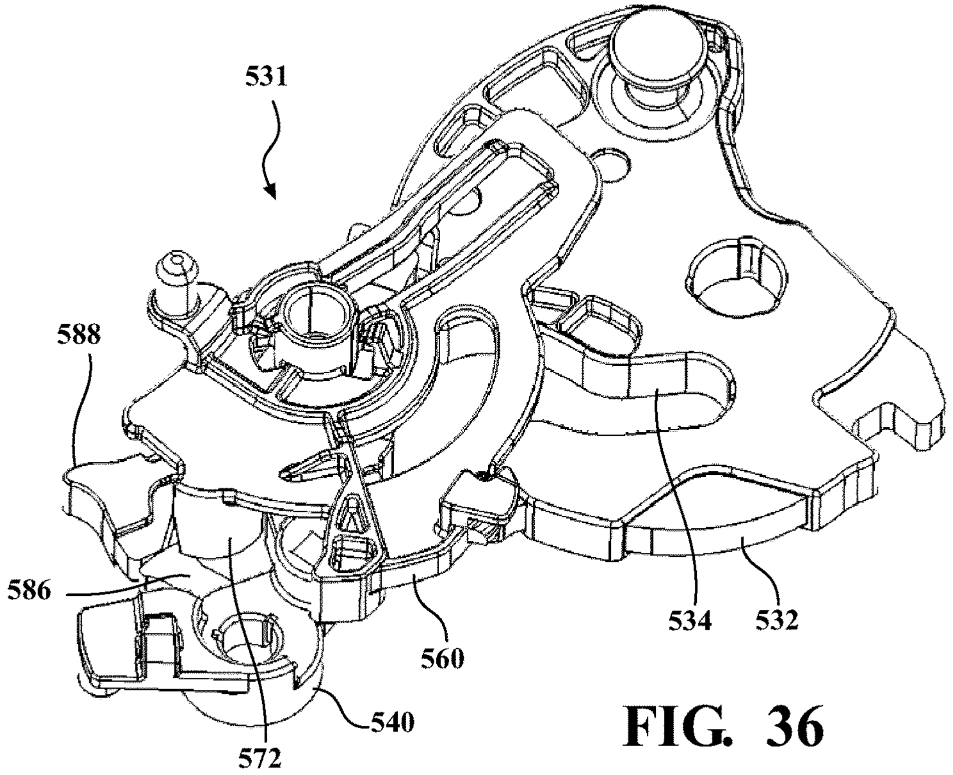
FIG. 36 is an opposite side perspective view of the closure latch assembly of FIG. 35.
Figure 37:
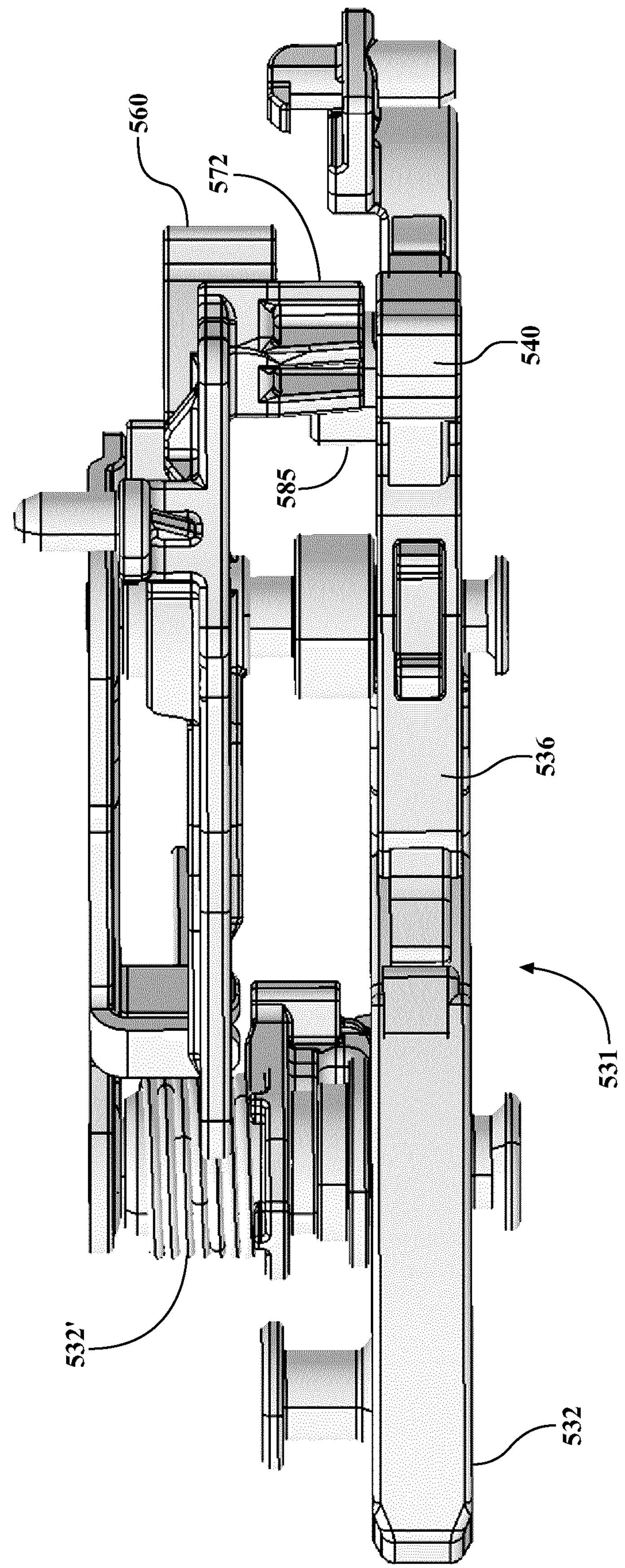
FIG. 37 is a side elevation view of a portion of a release mechanism and latch mechanism of the closure latch assembly of FIG. 34.
Figure 39:
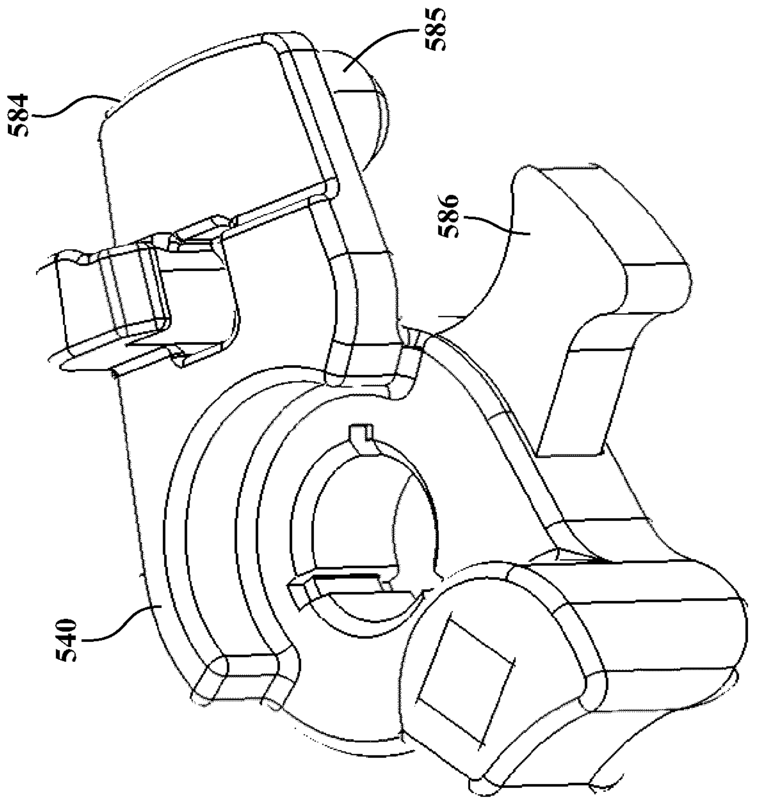
FIG. 39 is an enlarged perspective view of the auxiliary pawl of the closure latch assembly of FIG. 34.
Figure 38:
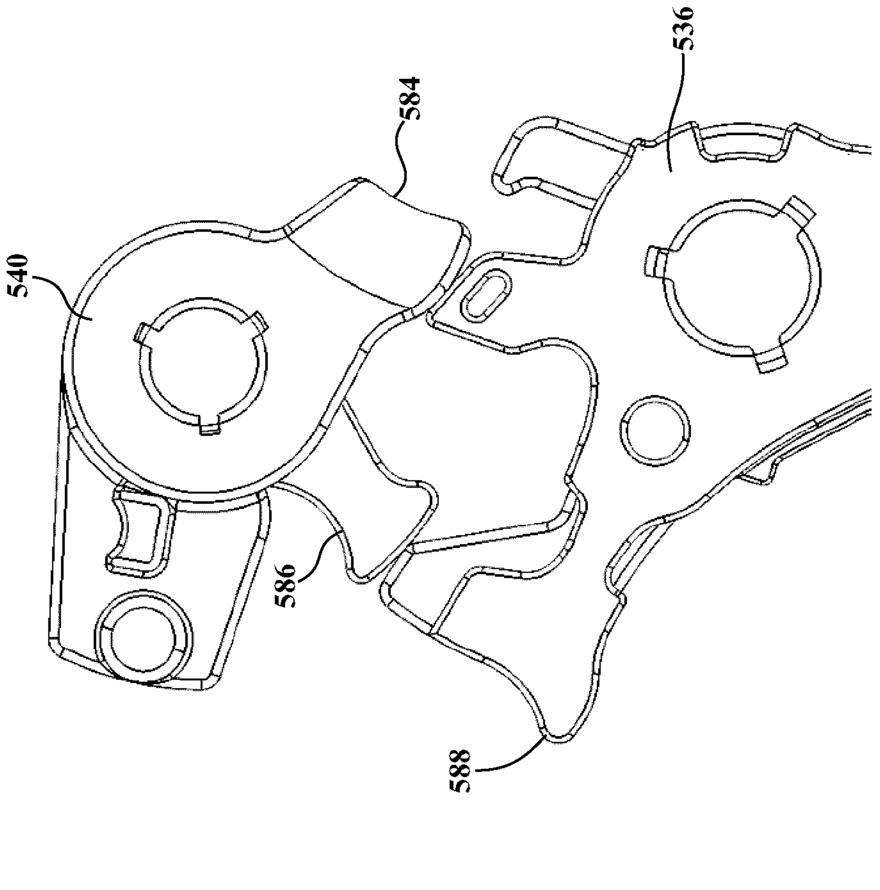
FIG. 38 is an enlarged plan view illustrating a blocking lug of the auxiliary pawl engaging a leg of the primary pawl to maintain the latch mechanism in the Latched mode, in accordance with an illustrative example.
Figure 40:
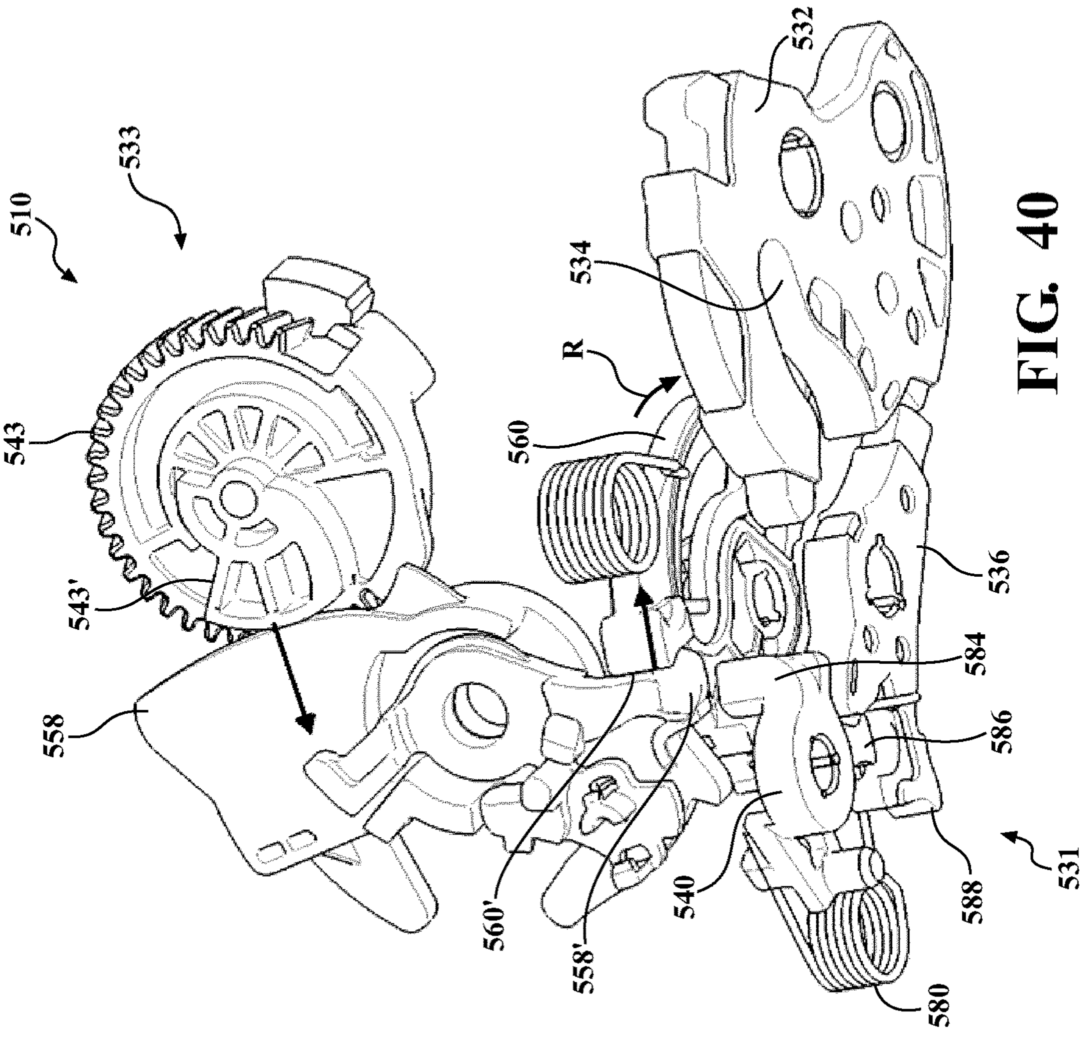
FIG. 40 is a view similar to FIG. 34 illustrating an initial stage of a power release of the closure latch assembly of FIG. 34.
Figure 41:
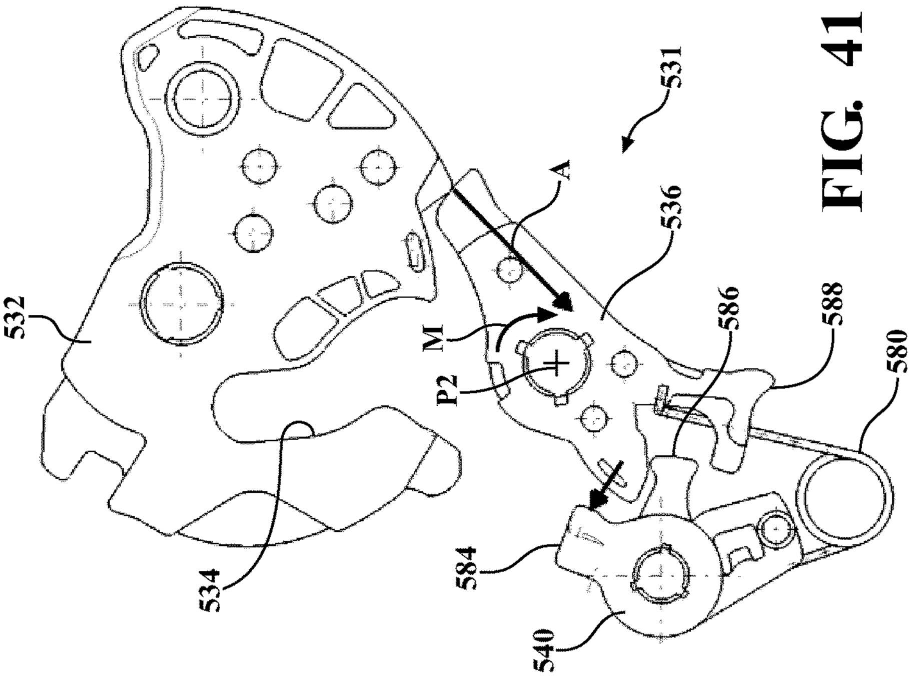
FIG. 41 is a side plan view illustrating the blocking lug of the auxiliary pawl moved out of engagement from the leg of the primary pawl and schematically illustrating bias forces imparted on the primary pawl by the ratchet and a seal load of a vehicle closure panel while in a closed position.
Figure 42:
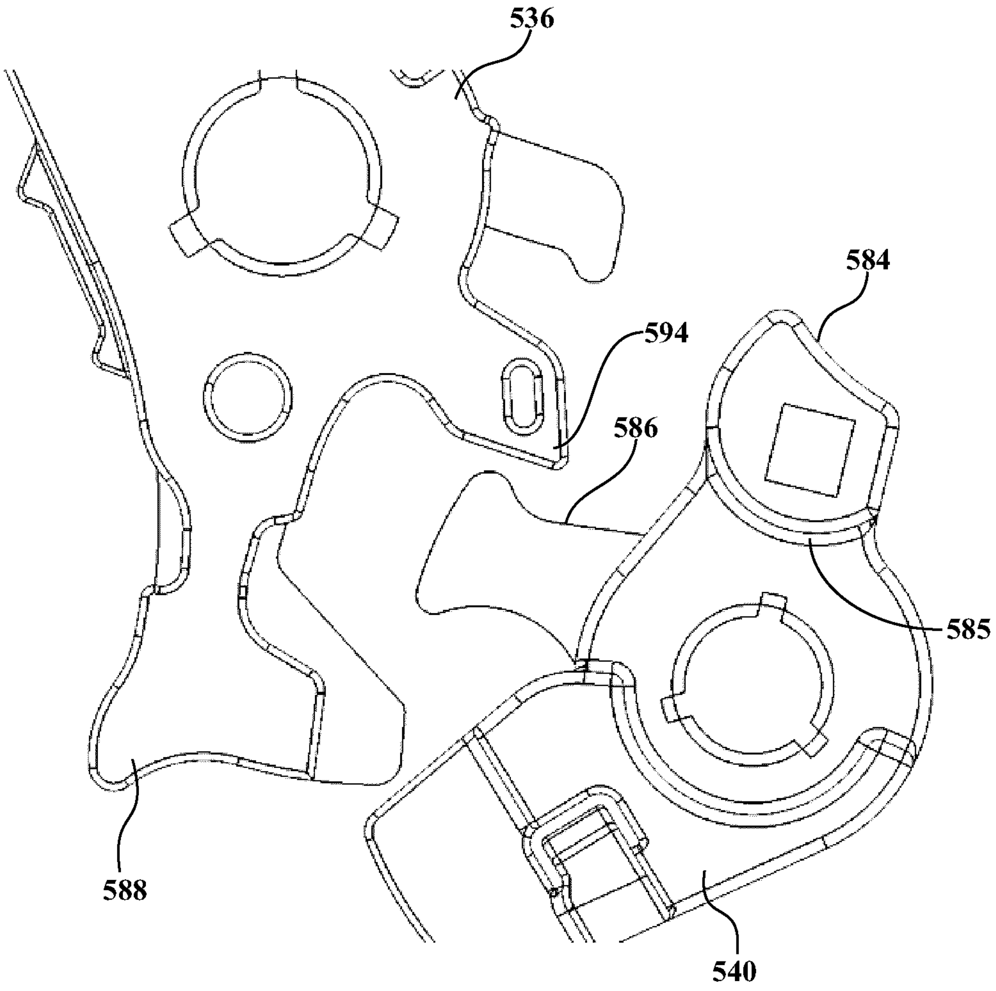
FIG. 42 is an enlarged fragmentary plan view of a the auxiliary pawl and primary pawl as shown in FIG. 41.

In FIGS. 34-57, a non-limiting embodiment of a closure latch assembly 510 in accordance with another aspect of the disclosure and internal components thereof are shown, wherein the same reference numerals as used above, offset by a factor of 500, are used to identify like features. Closure latch assembly 510 includes a latch mechanism 531, a primary latch release mechanism provided as a power latch release mechanism 533, and supplemental latch release mechanism, also referred to back-up latch release mechanism, provided as a mechanical latch release mechanism (FIGS. 34 and 52), such as an outside mechanical latch release mechanism 533' and/or an inside mechanical latch release mechanism 533". Latch mechanism 531 is shown as a double pawl-single ratchet configuration, by way of example and without limitation, having a primary ratchet, referred to hereafter as ratchet 532, a primary pawl, also referred to as main pawl 536, and a secondary pawl, also referred to as auxiliary pawl 540. Ratchet 532 is mounted for pivotal movement to a plate segment of a latch housing, such as shown at 29 in FIG. 2, and has a ratchet slot 534 configured for captured receipt of a striker 18, as discussed above for ratchet slot 34 of ratchet 32. Ratchet 532 is moveable between a primary closed or "striker capture" position (FIGS. 34-35A and 40-41) whereat striker 18 is held within fishmouth slot 30 by ratchet slot 534, and an open or "striker release" position (FIGS. 41-44) whereat striker 18 is released from ratchet slot 534 and fishmouth slot 30. Ratchet 532 is biased by a ratchet spring 532' (FIG. 37) toward its striker release position, as indicated by arrow E' (FIG. 35A).

Figure 35A:
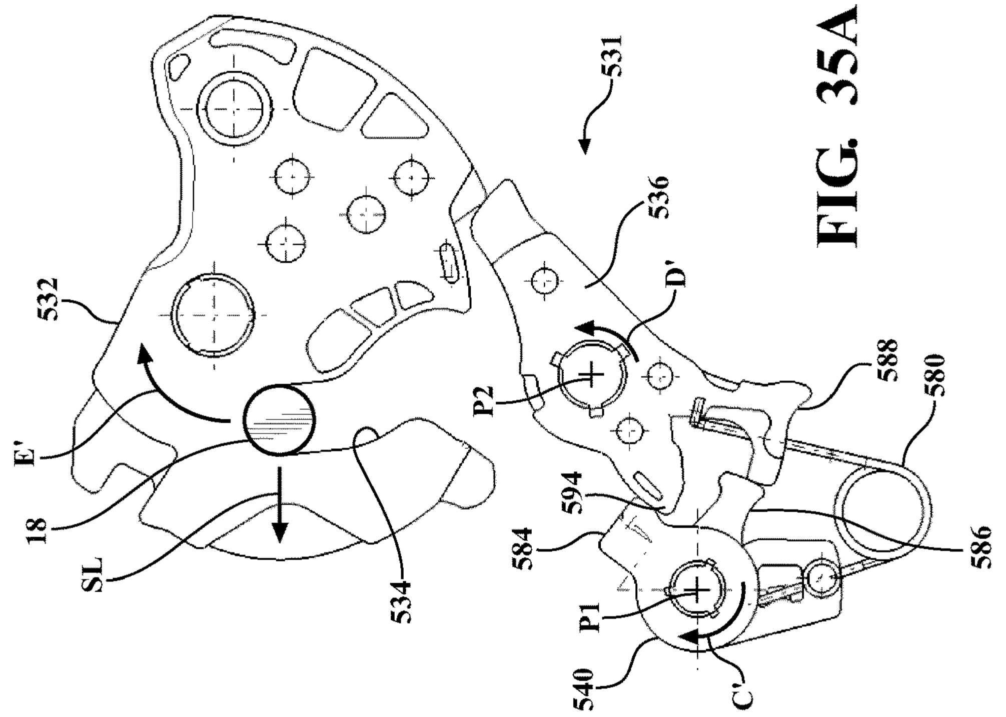
FIG. 35A is a view similar to FIG. 35 illustrating a ratchet, primary pawl and auxiliary pawl of the closure latch assembly of FIG. 34.

The auxiliary pawl 540 is biased into engagement with the primary pawl 536 by a combination primary pawl/auxiliary pawl spring member 580, such that auxiliary pawl 540 is biased in a direction of arrow C' (FIG. 35A). The primary pawl 536 is biased into engagement with the ratchet 532 by primary pawl/auxiliary pawl spring member 580, such that primary pawl 536 is biased in a direction of arrow D' (FIG. 35A). The primary pawl/auxiliary pawl spring member 580 biases the primary pawl 536 from its open position toward its at rest, closed position.

The auxiliary pawl 540 has a first arm 584 extending toward a protrusion 570 of primary pawl 536 extending outwardly from a pivot axis P2 of the primary pawl 536, while the primary pawl 536 is in its closed position. First arm 584 provides a driven lug 585 (FIG. 37) extending laterally outwardly from a plane of auxiliary pawl 540 in parallel relation with pivot axis P2 (FIG. 35A). The auxiliary pawl 540 is moveable to its open position via engagement of a drive lug 572, extending laterally outwardly from the auxiliary pawl release lever 560, with driven lug 585 of auxiliary pawl 540. Accordingly, the driven lug 585 of the first arm 584 of auxiliary pawl 540 acts as a driven surface engaged by the auxiliary pawl release lever 560 to move the auxiliary pawl 540 from its closed position to its open position.

The auxiliary pawl 540 has a second arm 586 spaced from the first arm 584, with the first arm 584 and the second arm 586 shown as extending in oblique directions from a pivot axis P1 (FIG. 35A) of auxiliary pawl 540 from one another. An end of an arm 588 of the primary pawl 536 is engaged with the second arm 586 of the auxiliary pawl 540 to maintain the primary pawl 136 in its closed position. As such, the second arm 586 of the auxiliary pawl 540, when in its closed position, as shown for example in FIG. 35, blocks rotation, and for example a clockwise rotation, with reference to FIG. 35, of the end of an arm 588 of the primary pawl 536 to prevent primary pawl 536 from moving from its closed position toward its open position, thereby maintaining the door 12, 13 in its closed position. Accordingly, the primary pawl 536 acts as a positive stop to the auxiliary pawl 540, against the bias of primary pawl/auxiliary pawl spring member 580 to locate the auxiliary pawl 540 in its rest position, while the auxiliary pawl 540 acts as a positive stop to the primary pawl 536 to maintain the primary pawl 536 in its closed position against the bias of ratchet spring 532' and against the bias of seal forces generated between the door 12, 13 and the vehicle body while the door 12, 13 is in its closed position, with it to be understood that the seal force SF tends to bias the ratchet 532 toward its striker release position via the striker 18 imparting a bias seal load SL (FIGS. 35, 35A) on the ratchet 532.

Figure 48:
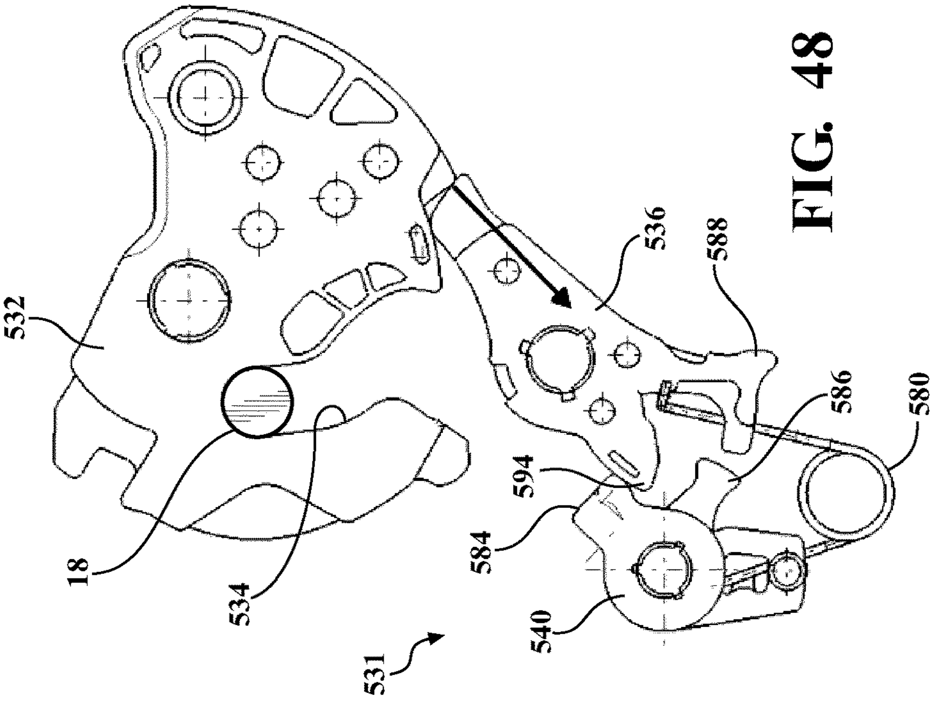
FIG. 48 is a side plan view illustrating the primary pawl being returned to a Latched mode with the ratchet upon moving the vehicle closure panel to the closed position and schematically illustrating a bias force imparted on the primary pawl via the ratchet and the seal loads of the vehicle closure panel.
Figure 47:
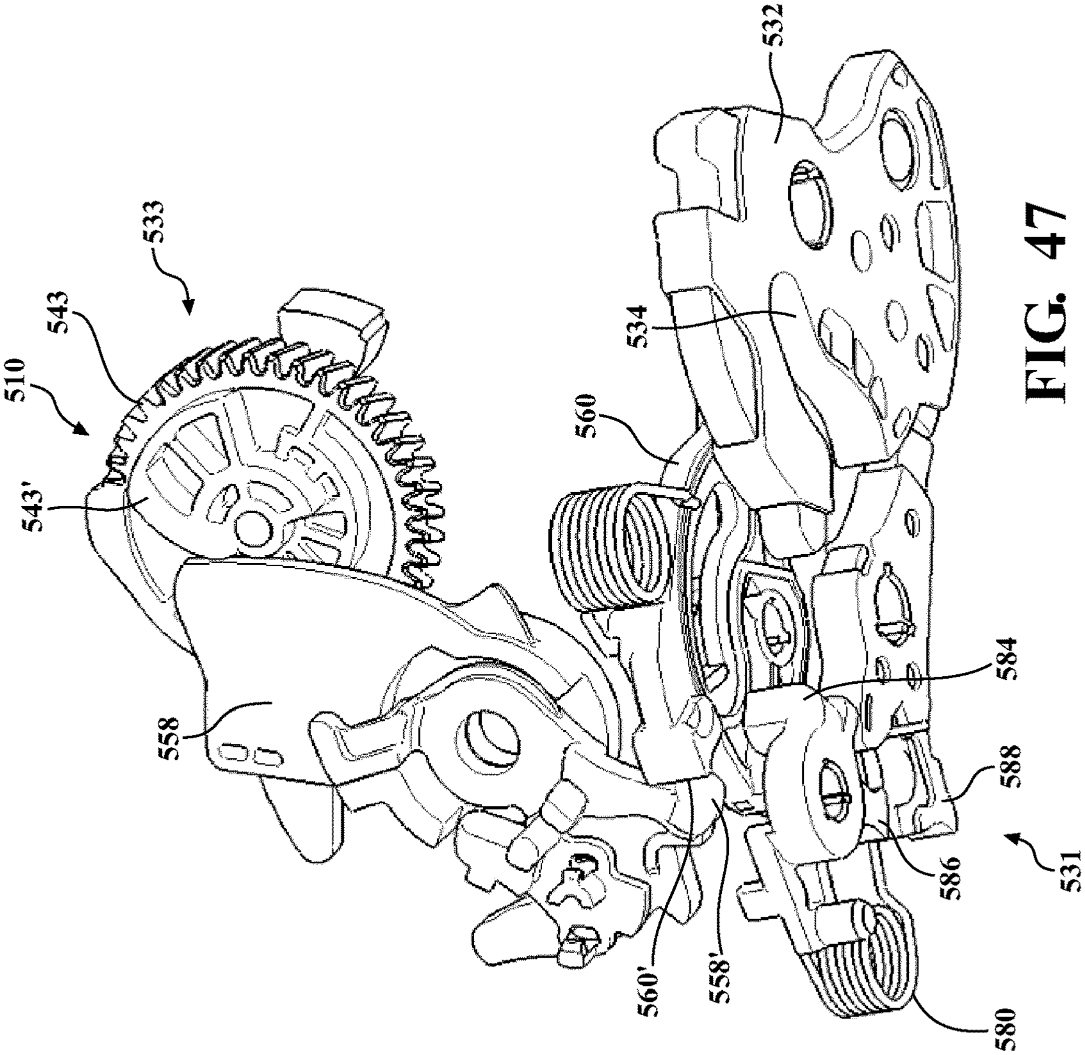
FIG. 47 is a view similar to FIG. 45 illustrating the closure latch assembly upon moving the vehicle closure panel to a closed position.
Figure 50:
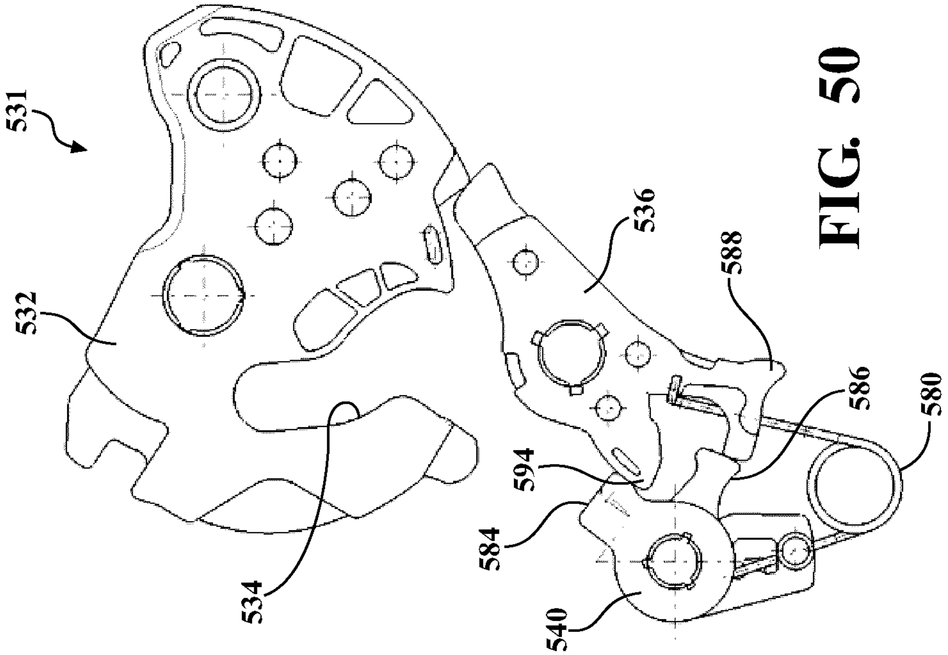
FIG. 50 is a side plan view of the closure latch assembly of FIG. 49 showing the ratchet, primary pawl and auxiliary pawl of the latch mechanism while in the Latched mode.
Figure 49:
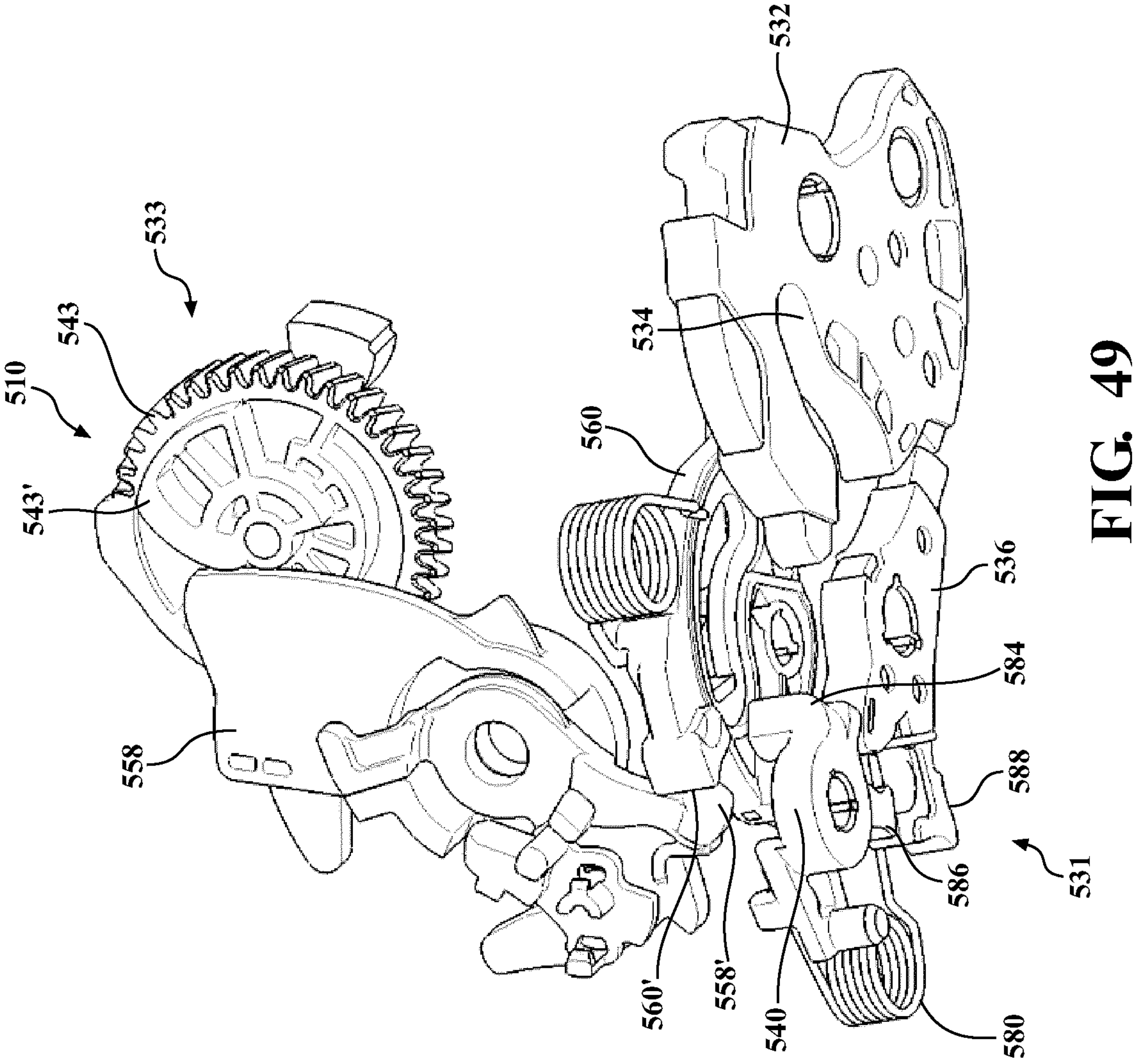
FIG. 49 is a view similar to FIG. 47 illustrating the closure latch assembly in a Latched mode while in a rest position.
Figure 51:
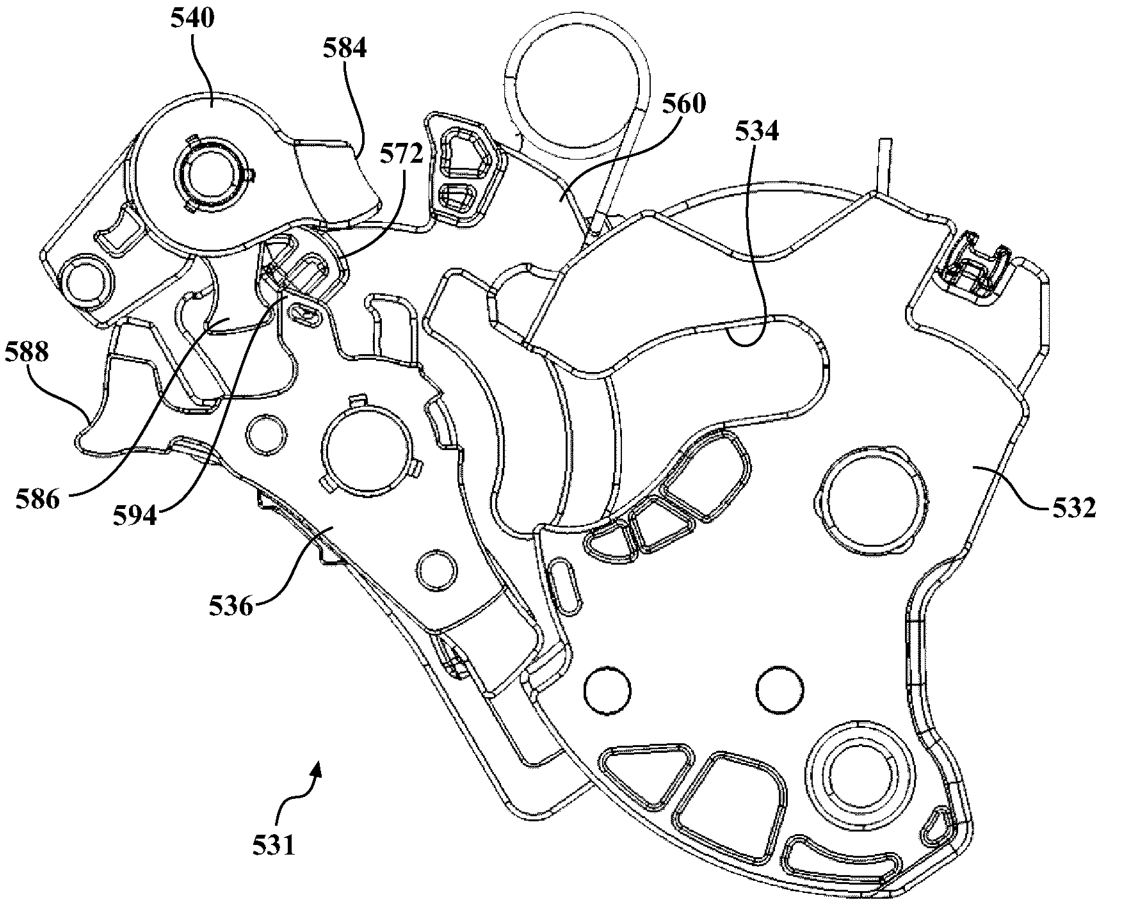
FIG. 51 is a side plan view of the closure latch assembly of FIG. 34 illustrating the blocking lug of the auxiliary pawl moved out of engagement from the leg of the primary pawl during a power release and schematically illustrating bias forces imparted on the primary pawl by the ratchet and a seal load of a vehicle closure panel being insufficient to drive the primary pawl to the released position.
Figure 53:
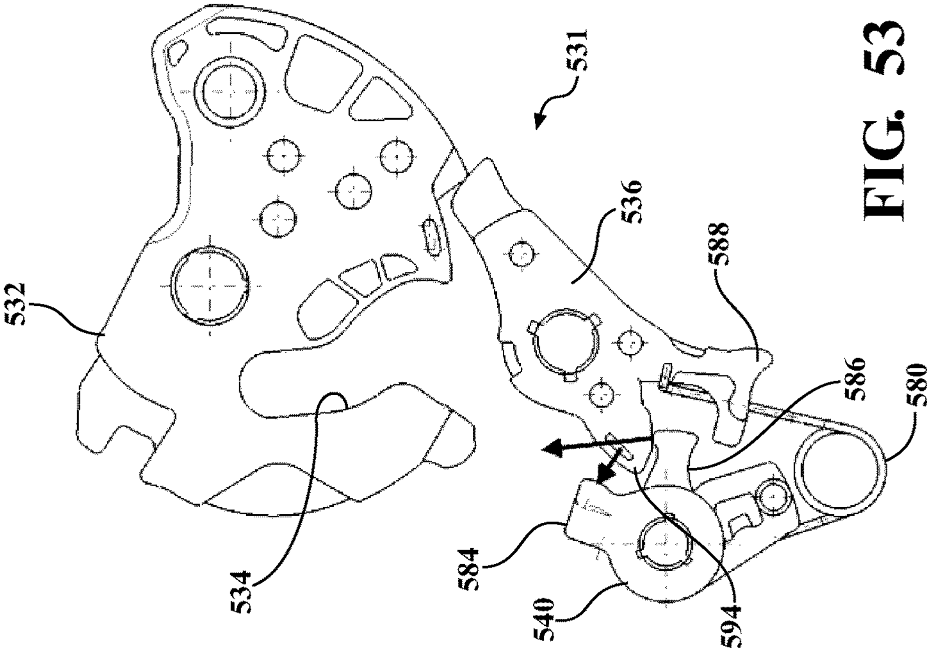
FIG. 53 is a side plan view illustrating the blocking lug of the auxiliary pawl being moved into engagement with a drive lug of the primary pawl and schematically illustrating an arrow of a bias force imparted on the drive lug of the primary pawl and an arrow illustrating direction of driven movement of the primary pawl during the mechanical release.

Latch release mechanism 533 includes an actuator, such as an electric motor (not shown) as discussed above for electric motor 41, configured to drive a power release gear 543, as discussed above for power release gear 43, having a drive cam 543' fixed thereto. During a power release of closure latch assembly 510, as is well known, a key fob or actuation of a switch on door handle 25 on door 13 provides a signal to an ECU associated with closure latch assembly 510 indicating a request to release latch mechanism 531. Accordingly, the ECU controls operation of motor to rotate power release gear 543. Motor drives power release gear 543 in a counter clockwise direction, as viewed in FIG. 40, thereby causing drive cam 543' to pivotably drive an actuator release lever 558 against a spring bias to bring a release lever lug 558' of actuator release lever 558 into forcible engagement with a driven lug 560' of auxiliary pawl release lever 560, which in turn brings drive lug 572 of auxiliary pawl release lever 560 into forcible engagement with driven lug 585 of secondary pawl 540 to pivot secondary pawl 540 about pivot axis P1 and move second arm 586 out of its blocking or closed position with arm 588 of primary pawl 536 to its open position, out of engagement with arm 588 (FIG. 41), to initiate a power releasing function of latch mechanism 531. The powered actuation, although moving second arm 586 out from blocking engagement with arm 588, does not move second arm 586 into forcible engagement with primary pawl 536 under a force sufficient to drive and cause rotation of the primary pawl 536. Accordingly, primary pawl 536 is not driven forcibly via a chain of forces resulting directly from powered actuation and under (during) power of motor. With second arm 586 moved to its open position, arm 588 of primary pawl 536 is no longer blocked by second arm 586 of auxiliary pawl 540, thereby allowing biased movement of primary pawl 536 to its ratchet release position. Under normal operating conditions, as intended, an opening bias force is applied along direction of arrow A (FIG. 41), wherein direction A is offset relative to pivot axis P2 of primary pawl 536 to impart a rotational moment M on primary pawl 536, via a combination of a bias forces imparted by ratchet biasing member 532' on ratchet 532 tending to move ratchet 532 clockwise and a bias force imparted by the seal force SF between door 12, 13 and the vehicle body tending to move striker 18 along the direction of seal load SL (FIG. 35A). This combination of bias forces normally causes primary pawl 535 to rotate clockwise about pivot axis P2 to the ratchet release position, thereby allowing ratchet 532 to move to the striker release position (FIG. 44) without generating a "popping noise," given the energy from the combined forces is utilized and channeled to move the primary pawl 536 to its open position against the bias imparted by primary pawl spring 580. Then, electric motor (not shown), during a power reset of closure latch assembly 510, drives power release gear 543 in a clockwise direction, as viewed in FIG. 45, thereby causing drive cam 543' to pivotably move away from forcible engagement with actuator release lever 558 to allow actuator release lever 558 to move under the spring bias to bring a release lever lug 558' of actuator release lever 558 out from forcible engagement with driven lug 560' of auxiliary pawl release lever 560, which in turn brings drive lug 572 of auxiliary pawl release lever 560 out from forcible engagement with driven lug 585 of secondary pawl 540. With secondary pawl 540 being unobstructed from rotating clockwise by drive lug 572, ratchet 532 is free to return to its striker capture position upon striker 18, fixed to door 12, 13, being forcibly returned into ratchet slot 534 to its closed position (FIG. 48). As ratchet 532 rotates counter clockwise, primary pawl 536, being biased counter clockwise by primary pawl/auxiliary pawl spring member 580, is returned to its ratchet locking position (FIG. 50).

If, for any reason, the bias force imparted by ratchet biasing member 532' on ratchet 532 and the bias force imparted by the seal force SF are insufficient to pivot primary pawl 536 to its ratchet release position (FIG. 51) upon completing a power actuation of motor, as discussed above, a manual actuation, such as via outside and/or inside door handles 24, 26, by way of example and without limitation, can be performed to move primary pawl 536, via a mechanically interconnected chain of forces, to its ratchet release position. The power latch release mechanism 533 is configured for not imparting a bias force on the primary pawl 536 during a power release operation of the latch 510 during which the electric motor 41 is actuated. For example, the power release chain (the components interconnecting the electric motor to the primary pawl 536) is unable to impart a bias force or moving force upon the primary pawl 536 tending to urge the primary pawl 536 towards its opening position, where such moving force originates from the electric motor 41 and does not originate from a spring bias or seal load bias acting on the primary pawl 536. For example the power latch release mechanism 533 is unable to move primary pawl 536 either directly, such as for example by imparting a moving force on the primary pawl 536, or indirectly, such as for example imparting a moving force on an auxiliary ratchet supporting the pawl 536. Such a moving force acts to move the primary pawl 536 in the opening direction, and is different than a force used to move another pawl, such as the blocking auxiliary pawl 540 to a non-blocking position. During the manual release operation of the latch 510 during which the electric motor is not actuated but rather for example the at least one mechanical latch release mechanism 533', 533" is manually (non-electrically, or non-motorized operation) moved by a user force moving one of the outside and/or inside door handles 24, 26, or by another external motive, the manual release chain (the components interconnecting for example the at least one mechanical latch release mechanism 533', 533" to the primary pawl 536) is able to impart a bias force or moving force upon the primary pawl 536 tending to urge the primary pawl 536 towards its opening position, where such moving force originates from the actuation of for example the at least one mechanical latch release mechanism 533', 533" by an outside user imparted force and not by an electric motor and not by a spring bias or seal load bias acting on the primary pawl 536. A power release configuration of the latch 510 is therefor in the exemplary configuration able to only move the release lever 588 over a range of travel to cause the auxiliary pawl 540 to travel over a corresponding range of travel without contacting and urging the primary pawl 536 towards its open position. In other words during a first range of travel of the auxiliary pawl 540 controlled by the power releasing configuration of the latch 510, the auxiliary pawl 540 is unable to move into a position where it may contact the primary pawl 536 to urge the primary pawl away from the closed position under power transmitted from the electric motor. In a possible configuration, only a manual (non-electric powered) actuation of the latch 510 is able to cause a force to be applied to the primary pawl 536 to move the primary pawl 536 towards the open position during a manual releasing operation of the latch 510. In other words during a second range of travel of the auxiliary pawl 540 controlled by the non-power releasing configuration or manual releasing operation of the latch 510, the auxiliary pawl 540 is able to move into a position where it may contact the primary pawl 536 to urge the primary pawl 536 away from the closed position under power transmitted from a user manually actuating the latch 510, and not transmitted from the electric motor. Therefore in a manual releasing configuration of the latch 510, the auxiliary pawl 540 is able to be moved a further distance than the auxiliary pawl 540 is able to be moved in the power releasing configuration of the latch 510. Illustratively, the first range of travel and the second range of travel of the auxiliary pawl 540 may be defined by the ranges of travel of the release lever 558. The first range of travel and the second range of travel illustratively have a common first stage of travel of the second range over which the auxiliary pawl 540 is moveable by either a power releasing configuration of the latch or a manual releasing configuration of the latch 510, whereas the second range of travel illustratively has a second stage of travel that is additional to the first range of travel but not part of the first stage of travel. Therefore the second range of travel is greater than the first range of travel of the release lever 558 or auxiliary pawl 540. The power releasing configuration of the latch 510 is unable to move the release lever 558 through the second stage of travel, during which the primary pawl 536 may be forcibly biased to its open position, such as for example by driving the auxiliary pawl 540 a further distance so as to contact and further urge the primary pawl 536 towards the releasing position using non-electric originated force. The power latch release mechanism 533 may therefore be configured for not imparting a bias force on the primary pawl 536, such as by the auxiliary pawl 540 acting on the primary pawl 536 in the event the primary pawl 536 does move to its open position in response to a power releasing operation of the latch 510 (for example in the event the combined bias of the seal load SL and the ratchet spring 532' fails to pivot the primary pawl 536 to its open position upon moving the auxiliary pawl 540 to its open position using the electric motor 41). Illustratively shown is the auxiliary pawl 540 forced into engagement with the primary pawl 536 during the manual releasing configuration of the latch 510 (for example during part or all of the second stage of travel of the auxiliary pawl 540), however the release lever 558 may rather be configured for driving or moving the primary pawl 536 during the second stage of travel) as another example of a manual releasing configuration of the latch 510.

Figure 52:
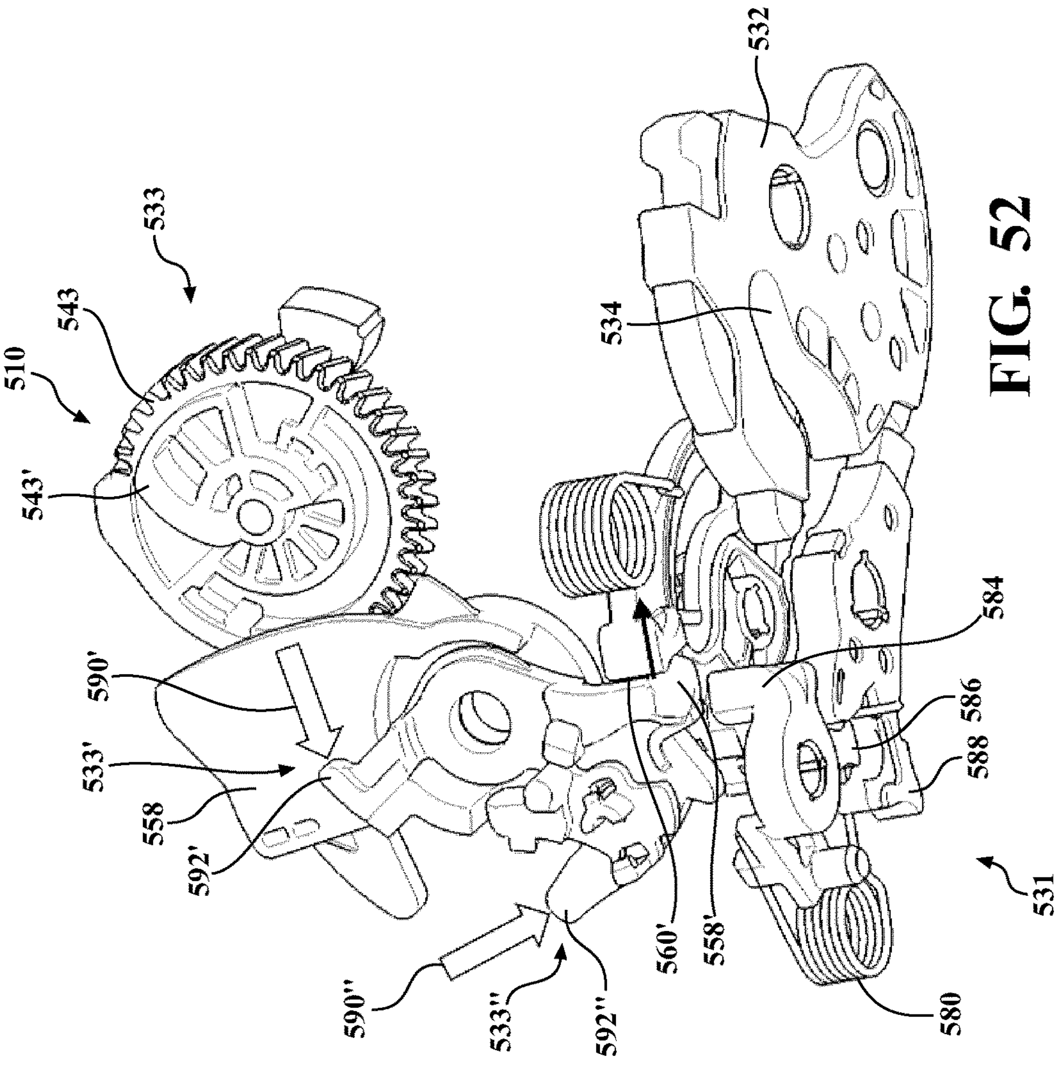
FIG. 52 is a view similar to FIG. 34 illustrating an initial stage of a mechanical release after performing the power release of the closure latch assembly of FIG. 51.
Figure 55:
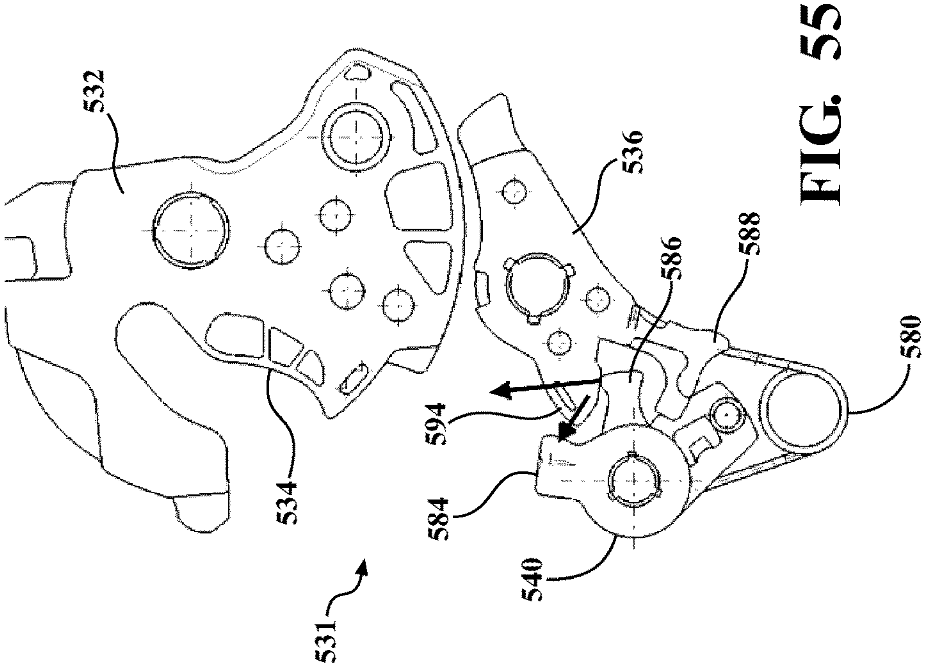
FIG. 55 is a side plan view illustrating the ratchet, primary pawl and auxiliary pawl as positioned at the final stage of mechanical release of FIG. 54 with the primary pawl shown moved to a released position.
Figure 54:
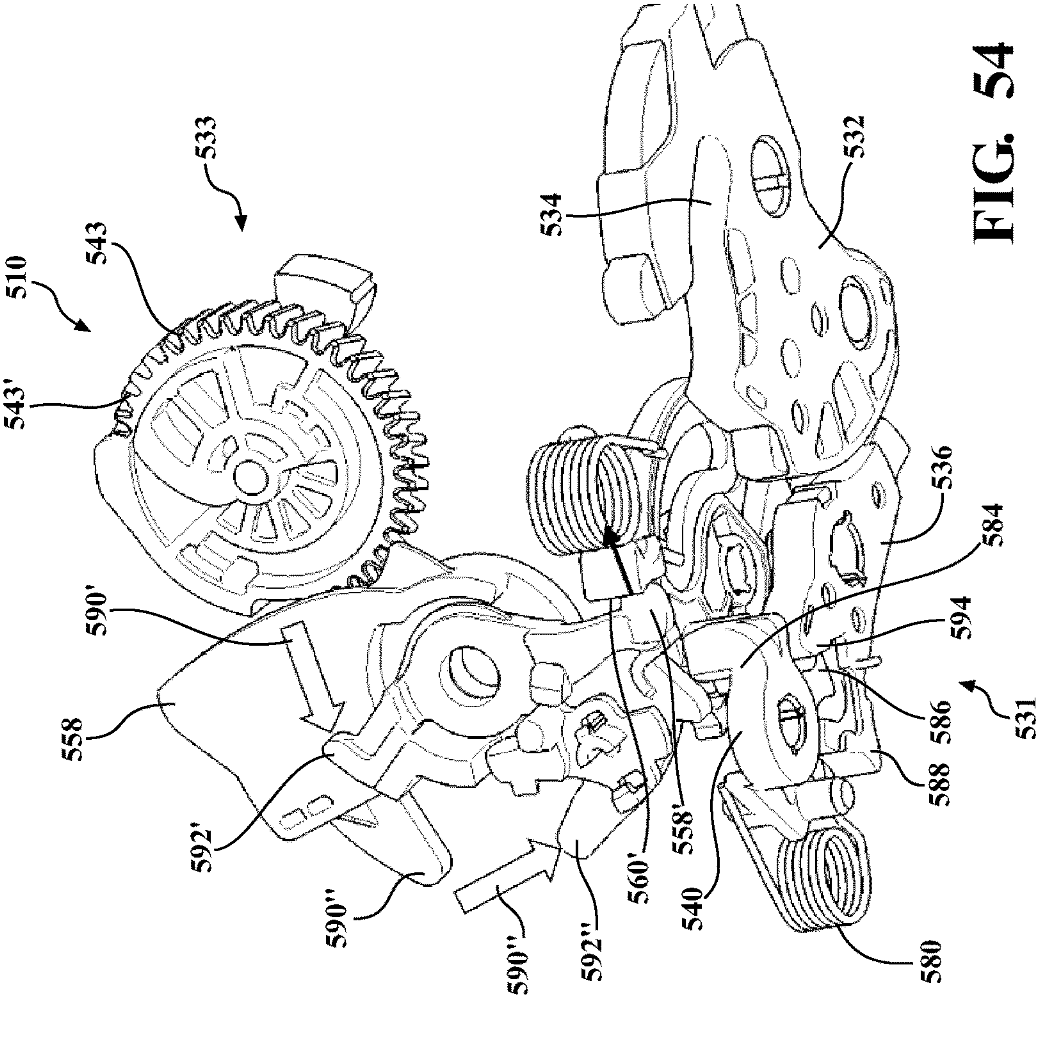
FIG. 54 is a view similar to FIG. 52 illustrating a final stage of the mechanical release of the closure latch assembly of FIG. 34.
Figure 57:
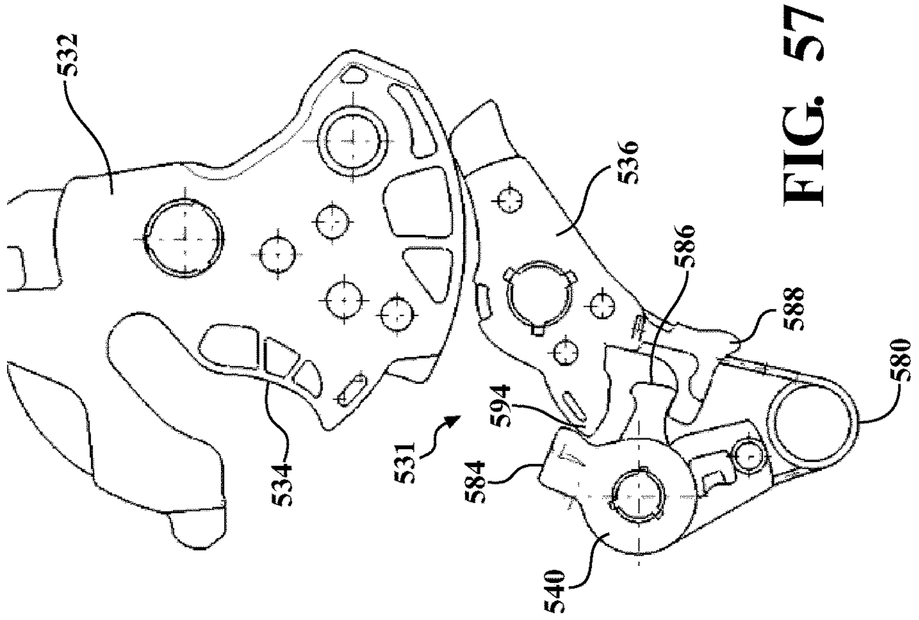
FIG. 57 is a side plan view of the ratchet, primary pawl and auxiliary pawl of FIG. 56.
Figure 56:
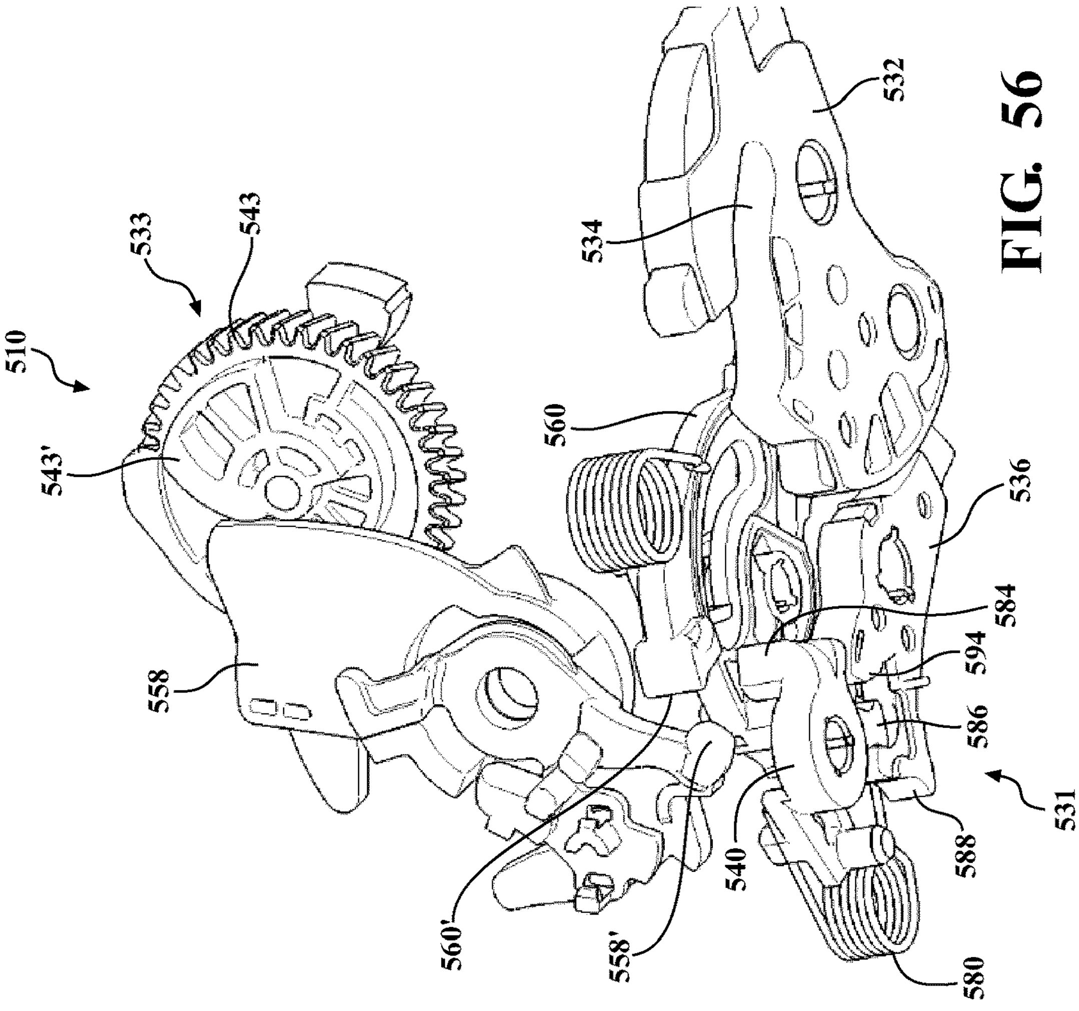
FIG. 56 is a view similar to FIG. 54 illustrating a rest stage of the closure latch assembly upon completing the mechanical release of FIG. 54.

As shown in FIG. 52, manual actuation of at least one of outside door handle 24 and inside door handle 26, after moving second arm 586 or secondary pawl 540 out from blocking engagement with let 588 of primary pawl 536 via power release, brings a respective one of an outside release lever (schematically shown at 590') of outside mechanical latch release mechanism 533' and inside release lever (schematically shown at 590") of inside mechanical latch release mechanism 533" into engagement with a respective one of an outside release lever interface, also referred to as outside drive member 592' and an inside release lever interface, also referred to as inside drive member 592", of actuator release lever 558 to rotate actuator release lever 558 in a counterclockwise direction. Driven rotation of actuator release lever 558 is of a sufficient degree, greater than that rotated during powered actuation, to cause release lever lug 558' to drive secondary pawl 540 counterclockwise sufficiently to bring second arm 586 of secondary pawl 540 into forcible engagement with a protrusion 594 of primary pawl 536 to cause primary pawl 536 to rotate clockwise out of its ratchet locking position to its ratchet release position (FIG. 55). Then, upon releasing the closure latch assembly 510 to its open state, the respective one of outside door handle 24 and inside door handle 26 is released, thereby allowing actuator release lever 558 to return under spring bias to its non-actuated, rest or home position (FIGS. 56 and 57), corresponding to the position described and shown in FIG. 43 for a power reset. Accordingly, closure latch assembly 510 is set to be returned to its closed, latched position upon closure of the door 12, 13.

Figure 58:
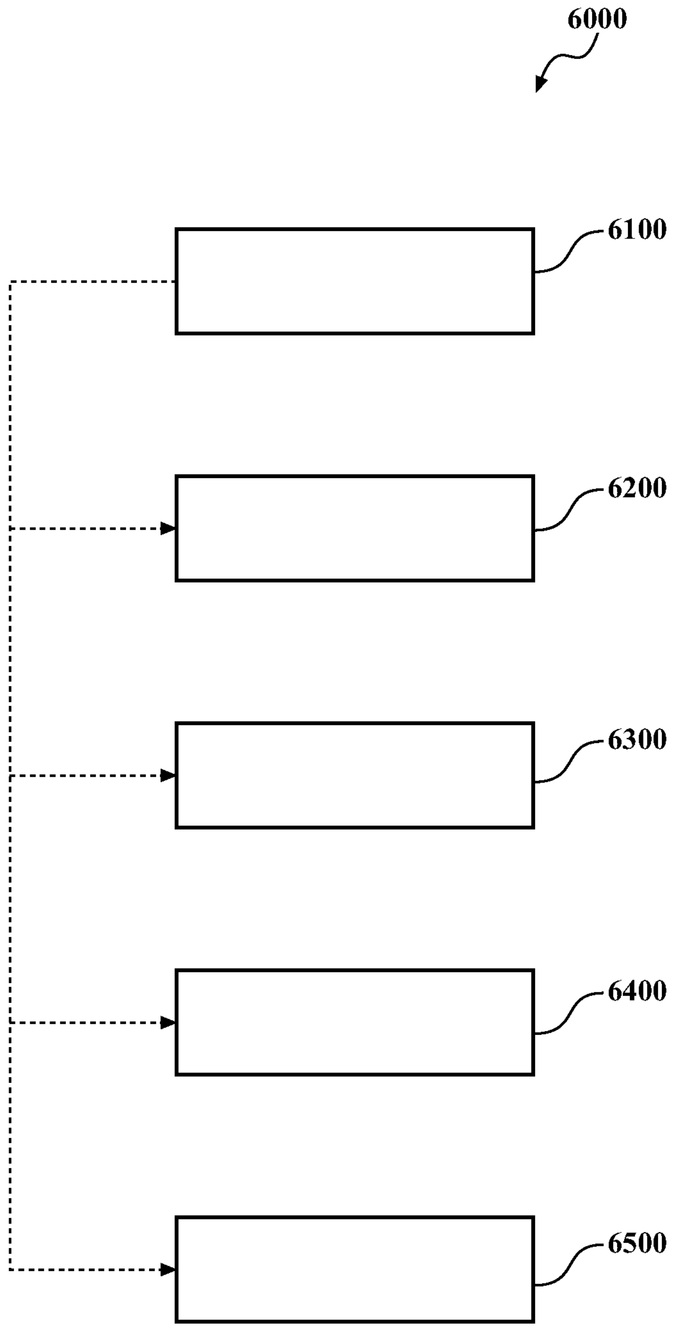
FIG. 58 is a flow diagram for another method of causing a closure latch assembly, having latch release lever, a ratchet, a primary pawl, and an auxiliary pawl, of a vehicle closure panel to move from a Latched mode to an Open mode.

In accordance with another aspect of the disclosure, as shown in FIG. 58, a method 6000 of operating a closure latch assembly 510 having double-pawl, single ratchet mechanism for opening a vehicle door 12, 13 is provided. The method 6000 includes a step 6100 of actuating an electric motor to drive a power release gear 543 having a drive cam 543' fixed thereto and moving the drive cam 543' against an actuator release lever 558 to pivot the actuator release lever 558 over a first arc length to an actuated position to move an auxiliary pawl 540 from a closed position to an open position to allow a primary pawl 536 to move to an open position against a bias of a pawl spring 580 tending to bias the primary pawl 536 toward its closed position without the auxiliary pawl 540 imparting a bias force on the primary pawl 536, thereby allowing a ratchet 532 to move under a bias of a ratchet spring 532' to a striker release position to allow the vehicle door 12, 13 to be opened when the primary pawl 536 is moved to its open position.

In accordance with another aspect, the method 6000 can further include a step 6200 of imparting a combined bias, the combined bias including a bias from a seal load SL from the vehicle door 12, 13 while in a closed position and a bias from the ratchet spring 532', on the primary pawl 536 to pivot the primary pawl 536 to its open position against the bias imparted by the pawl spring 580.

In accordance with another aspect, the method 6000 further includes a step 6300, in the event the combined bias of the seal load SL and the ratchet spring 532' fails to pivot the primary pawl 536 to its open position upon moving the auxiliary pawl 540 to its open position, of selectively actuating at least one mechanically actuatable latch release mechanism 533', 533" to pivot the actuator release lever 558 over a second arc length, greater than the first arc length, to move the auxiliary pawl 540 into forcible engagement with the primary pawl 536 to forcibly bias the primary pawl 536 from its closed position to its open position.

In accordance with another aspect, the method 6000 further includes a step 6400 of moving the actuator release lever 558 out from engagement with, and beyond the potential reach of the drive cam 543' during selective actuation of the at least one mechanical latch release mechanism 533', 533". Accordingly, mechanical actuation of the actuator release lever 558 pivots the actuator release lever 558 to a greater degree than possible via powered actuation by the electric motor 41 that drives the power release gear 543 and the drive cam 543'.

In accordance with another aspect, the method 6000 further includes a step 6500 of selectively actuating the at least one mechanical latch release mechanism 533', 533" via at least one of an outside door handle 24 and/or an inside door handle 26.

The foregoing description of the embodiments has been provided for purposes of illustration and description. It is not intended to be exhaustive or to limit the disclosure. Individual elements, assemblies and/or subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly for installation in a vehicle door movable between an open position and a closed position, wherein a seal load (SL) is normally imparted on the closure latch assembly while the vehicle door is in its closed position, comprising:

a latch mechanism having a primary ratchet, a primary pawl, and an auxiliary pawl, the primary ratchet being biased by a ratchet spring from a striker capture position, wherein the primary ratchet in the striker capture position retains a striker, toward a striker release position, wherein the primary ratchet in the striker release position releases the striker, the primary pawl being biased by a pawl spring from an open position, whereat the primary pawl is positioned to permit the primary ratchet to move to its striker release position, toward a closed position, whereat the primary pawl holds the primary ratchet in its striker capture position, the auxiliary pawl being moveable between a closed position, whereat the primary pawl is maintained in its closed position, and an open position, whereat the primary pawl moves to its open position; and a power latch release mechanism operably coupled with the auxiliary pawl to move the auxiliary pawl from its closed position to its open position to allow the primary pawl to move to its open position, wherein the power latch release mechanism is configured for not imparting a bias force on the primary pawl in the event the primary pawl does move to its open position.

2. The closure latch assembly of claim 1, wherein a combined bias imparted by the seal load (SL) and the ratchet spring is intended to overcome the bias imparted by the pawl spring in normal operation to allow the primary pawl to be moved by the combined bias to its open position upon the auxiliary pawl being moved to its open position by the power latch release mechanism.

3. The closure latch assembly of claim 2, further including at least one mechanical latch release mechanism operably coupled with the auxiliary pawl to move the auxiliary pawl into engagement with the primary pawl to forcibly bias the primary pawl from its closed position to its open position.

4. The closure latch assembly of claim 3, wherein the at least one mechanical latch release mechanism includes an outside mechanical release mechanism connected to an outside door handle and an inside mechanical release mechanism connected to an inside door handle.

5. The closure latch assembly of claim 3, wherein the power latch release mechanism includes a power release gear having a drive cam fixed thereto, the power release gear being configured for power driven movement by an electric motor to rotate the drive cam against an actuator release lever to an actuated position to pivot the actuator release lever over a first arc length to move the auxiliary pawl from its closed position to its open position to allow the primary pawl to move to its open position without the auxiliary pawl imparting a bias force on the primary pawl.

6. The closure latch assembly of claim 5, wherein selective actuation of the at least one mechanical latch release mechanism causes the actuator release lever to pivot over a second arc length greater than the first arc length to move the auxiliary pawl into engagement with the primary pawl to forcibly bias the primary pawl from its closed position to its open position.

7. The closure latch assembly of claim 6, wherein the actuator release lever moves out from engagement with the drive cam during selective actuation of the at least one mechanical latch release mechanism.

8. The closure latch assembly of claim 1, further comprising:

a release lever operably coupled to the auxiliary pawl, wherein the power latch release mechanism is configured for operably moving the release lever over a first range of travel to cause the auxiliary pawl to move from its closed position to its open position; and at least one mechanical latch release mechanism for moving the release lever over a second range of travel greater than the first range, wherein during the second range of travel the primary pawl is forcibly biased from its closed position to its open position.

9. The closure latch assembly of claim 8, wherein the release lever when moved by the at least one mechanical latch release mechanism causes the auxiliary pawl to move from its closed position to its open position during a first stage of the second range of travel and further causes the auxiliary pawl to move the primary pawl during a second stage of the second range of travel.

10. The closure latch assembly of claim 9, where the power latch release mechanism is unable to cause the auxiliary pawl to move over the second stage of the second range of travel.

11. A closure latch assembly for installation in a vehicle door movable between an open position and a closed position, comprising:

a latch mechanism having a primary ratchet, and a primary pawl, the primary ratchet having a striker capture position, wherein the primary ratchet in the striker capture position retains a striker, and a striker release position, wherein the primary ratchet in the striker capture position releases the striker, the primary pawl having an open position, wherein the primary pawl in the open position is positioned to permit the primary ratchet to move to its striker release position, and a closed position, wherein the primary pawl in the closed position holds the primary ratchet in its striker capture position, a release lever operably coupled to the primary pawl;

a power latch release mechanism for operably moving the release lever over a first range of travel to cause the primary pawl to move from its closed position to its open position; and at least one mechanical latch release mechanism for operably moving the release lever over a second range of travel greater than the first range of travel, wherein the second range of travel forcibly biases the primary pawl from its closed position to its open position.

12. The closure latch assembly of claim 11, wherein the power latch release mechanism is unable to move the release lever beyond the first range of travel to cause the forcible bias of the primary pawl from its closed position to its open position.

13. The closure latch of claim 12, further comprising an auxiliary pawl being moveable between a closed position, wherein the auxiliary pawl in the closed position maintains the primary pawl in its closed position, and an open position, wherein the auxiliary pawl in its open position allows the primary pawl to move to its open position, wherein the release lever is configured for moving the auxiliary pawl in response to the at least one mechanical latch release mechanism operably moving the release lever over the second range of travel to cause the auxiliary pawl to engage with and move the primary pawl from its closed position to its open position.

14. The closure latch of claim 13, wherein the auxiliary pawl is configured to engage with the primary pawl and move the primary pawl from its closed position to its open position in response to the at least one mechanical latch release mechanism operably moving the release lever in the event the power latch release mechanism cannot cause the primary pawl to move from its closed position to its open position.

* * * * *